(12) United States Patent
Colavincenzo et al.

(10) Patent No.: US 10,220,830 B2
(45) Date of Patent: Mar. 5, 2019

(54) FRONT END MOTOR-GENERATOR SYSTEM AND HYBRID ELECTRIC VEHICLE OPERATING METHOD

(71) Applicant: Bendix Commercial Vehicle Systems, Elyria, OH (US)

(72) Inventors: David Colavincenzo, Castalia, OH (US); Fernando Venegas Diaz, Elyria, OH (US)

(73) Assignee: Bendix Commercial Vehicle Systems, Elyria, OH (US)

( * ) Notice: Subject to any disclaimer, the term of this patent is extended or adjusted under 35 U.S.C. 154(b) by 93 days.

(21) Appl. No.: 15/378,139

(22) Filed: Dec. 14, 2016

(65) Prior Publication Data

US 2018/0162370 A1 Jun. 14, 2018

(51) Int. Cl.
*B60K 6/387* (2007.10)
*B60W 20/40* (2016.01)
(Continued)

(52) U.S. Cl.
CPC ............ *B60W 20/40* (2013.01); *B60K 6/387* (2013.01); *B60K 6/40* (2013.01); *B60K 6/442* (2013.01);
(Continued)

(58) Field of Classification Search
None
See application file for complete search history.

(56) References Cited

U.S. PATENT DOCUMENTS

| 4,426,585 | A | 1/1984 | Bigalke |
| 4,736,112 | A | 4/1988 | Yabunaka |

(Continued)

FOREIGN PATENT DOCUMENTS

| CN | 101000972 B | 5/2011 |
| CN | 203685448 U | 7/2014 |

(Continued)

OTHER PUBLICATIONS

International Search Report (PCT/ISA/210) issued in PCT Application No. PCT/US2017/062520 dated Jan. 19, 2018 (three (3) pages).

(Continued)

*Primary Examiner* — Justin Holmes
(74) *Attorney, Agent, or Firm* — Crowell & Moring LLP

(57) ABSTRACT

A system and method are provided for hybrid electric internal combustion engine applications in which a motor-generator, a narrow switchable coupling and a torque transfer unit therebetween are arranged and positioned in the constrained environment at the front of an engine in applications such as commercial vehicles, off-road vehicles and stationary engine installations. The motor-generator is preferably positioned laterally offset from the switchable coupling, which is co-axially-arranged with the front end of the engine crankshaft. The switchable coupling is an integrated unit in which a crankshaft vibration damper, an engine accessory drive pulley and a disengageable clutch overlap such that the axial depth of the clutch-pulley-damper unit is nearly the same as a conventional belt drive pulley and engine damper. The front end motor-generator system includes an electrical energy store that receives electrical energy generated by the motor-generator when the coupling is engaged. When the coupling is disengaged, the motor-generator may drive the pulley portion of the clutch-pulley-damper to drive the engine accessories using energy returned from the energy store, independent of the engine crankshaft.

23 Claims, 27 Drawing Sheets

(51) Int. Cl.
*B60W 20/13* (2016.01)
*B60L 11/14* (2006.01)
*B60L 11/18* (2006.01)
*B60L 11/12* (2006.01)
*B60K 6/442* (2007.10)
*B60K 6/40* (2007.10)

(52) U.S. Cl.
CPC ............ *B60L 11/123* (2013.01); *B60L 11/14* (2013.01); *B60L 11/1861* (2013.01); *B60W 20/13* (2016.01); *B60L 2210/10* (2013.01); *B60L 2240/423* (2013.01); *B60L 2240/443* (2013.01); *B60L 2240/54* (2013.01); *B60W 2510/244* (2013.01); *B60W 2710/0666* (2013.01); *B60W 2710/083* (2013.01); *B60W 2710/305* (2013.01); *B60Y 2300/91* (2013.01); *B60Y 2400/112* (2013.01); *B60Y 2400/421* (2013.01); *B60Y 2400/424* (2013.01); *Y10S 903/914* (2013.01); *Y10S 903/93* (2013.01); *Y10S 903/951* (2013.01)

(56) References Cited

U.S. PATENT DOCUMENTS

| | | |
|---|---|---|
| 5,035,296 A | 7/1991 | Sjostrand |
| 5,611,416 A | 3/1997 | Berger et al. |
| 5,856,709 A | 1/1999 | Ibaraki et al. |
| 5,931,380 A | 8/1999 | Aoki et al. |
| 6,018,199 A | 1/2000 | Shiroyama et al. |
| 6,026,921 A | 2/2000 | Aoyama et al. |
| 6,082,316 A | 7/2000 | Ban et al. |
| 6,254,507 B1 | 7/2001 | Downs |
| 6,306,057 B1 | 10/2001 | Morisawa et al. |
| 6,367,570 B1 | 4/2002 | Long, III et al. |
| 6,396,165 B1 | 5/2002 | Nagano et al. |
| 6,555,927 B1 | 4/2003 | Suzuki et al. |
| 6,781,252 B2 | 8/2004 | Berels |
| 7,114,585 B2 | 10/2006 | Man et al. |
| 7,419,021 B2 | 9/2008 | Morrow et al. |
| 7,462,970 B2 | 12/2008 | Hoff et al. |
| 7,558,666 B2 | 7/2009 | Digonis |
| 7,753,147 B2 | 7/2010 | Usoro |
| 7,886,709 B2 | 2/2011 | Riedel et al. |
| 7,954,580 B2 | 6/2011 | Usoro |
| 8,166,945 B2 | 5/2012 | Spicer et al. |
| 8,272,463 B2 | 9/2012 | Kovach et al. |
| 8,327,990 B2 | 12/2012 | Friedman |
| 8,408,175 B2 | 4/2013 | Schoenek et al. |
| 8,423,214 B2 | 4/2013 | Kshatriya |
| 8,480,006 B2 | 7/2013 | Sanger et al. |
| 8,500,590 B2 | 8/2013 | Showalter |
| 8,512,007 B2 | 8/2013 | Hebrard |
| 8,545,367 B2 | 10/2013 | Hartz et al. |
| 8,561,588 B2 | 10/2013 | Reynolds et al. |
| 8,596,391 B2 | 12/2013 | Kshatriya |
| 8,606,450 B2 | 12/2013 | Holmes et al. |
| 8,718,848 B2 | 5/2014 | Pfefferl et al. |
| 8,753,762 B2 | 6/2014 | Major et al. |
| 8,776,929 B2 | 7/2014 | West et al. |
| 8,807,314 B2 | 8/2014 | Hebrard |
| 8,808,124 B2 | 8/2014 | Major et al. |
| 8,821,342 B2* | 9/2014 | Andreae ................. F02B 67/04 477/5 |
| 8,833,324 B2 | 9/2014 | O'Brien et al. |
| 8,840,523 B2 | 9/2014 | Tajima |
| 8,876,656 B2* | 11/2014 | Erjawetz ................. B60K 25/00 477/8 |
| 8,939,240 B2 | 1/2015 | Wehrwein et al. |
| 9,051,911 B2 | 6/2015 | Staley |
| 9,074,656 B2* | 7/2015 | Benz ................. F02B 67/06 |
| 9,108,633 B1 | 8/2015 | Atluri et al. |
| 9,108,635 B2 | 8/2015 | Miyazaki et al. |
| 9,358,968 B2 | 6/2016 | Nedorezov et al. |
| 9,421,964 B2 | 8/2016 | Ideshio et al. |
| 9,452,672 B2 | 9/2016 | Namuduri et al. |
| 9,587,559 B2* | 3/2017 | Hemphill ................. B60K 6/38 |
| 9,873,317 B2 | 1/2018 | Ohnemus et al. |
| 9,944,271 B2 | 4/2018 | Pandit et al. |
| 10,112,603 B2 | 10/2018 | Colavincenzo et al. |
| 2002/0020875 A1 | 2/2002 | Arao et al. |
| 2002/0107101 A1 | 8/2002 | Bowen et al. |
| 2002/0108373 A1 | 8/2002 | Frey |
| 2003/0062770 A1 | 4/2003 | Sasaki et al. |
| 2003/0116368 A1 | 6/2003 | Winkelman et al. |
| 2003/0173124 A1* | 9/2003 | Okada ................. B60K 25/02 180/65.225 |
| 2006/0030450 A1 | 9/2006 | Kyle |
| 2006/0283683 A1 | 12/2006 | Miller |
| 2007/0080037 A1* | 4/2007 | Larry ................. F02B 67/06 192/21.5 |
| 2007/0103002 A1* | 5/2007 | Chiao ................. B60K 6/46 307/10.1 |
| 2007/0169970 A1 | 7/2007 | Kydd |
| 2008/0110683 A1 | 5/2008 | Serkh |
| 2008/0179119 A1 | 7/2008 | Grenn et al. |
| 2008/0217083 A1 | 9/2008 | Serkh et al. |
| 2008/0314059 A1* | 12/2008 | Harkness ................. F25B 27/00 62/236 |
| 2009/0048747 A1 | 2/2009 | Stridsberg |
| 2009/0098976 A1* | 4/2009 | Usoro ................. B60K 6/24 477/5 |
| 2009/0101465 A1 | 4/2009 | Hart et al. |
| 2009/0114463 A1 | 5/2009 | DeVault |
| 2009/0139789 A1 | 6/2009 | Yang |
| 2009/0166113 A1 | 7/2009 | Luo et al. |
| 2009/0255741 A1* | 10/2009 | Major ................. B60K 6/48 180/65.22 |
| 2009/0294191 A1 | 12/2009 | Sheidler et al. |
| 2010/0056327 A1 | 3/2010 | Hofbauer |
| 2010/0094513 A1 | 4/2010 | Mair |
| 2010/0158702 A1 | 6/2010 | Colavincenzo |
| 2010/0269920 A1 | 10/2010 | Henning |
| 2011/0015812 A1 | 1/2011 | Vogel |
| 2011/0065543 A1* | 3/2011 | Usoro ................. B60K 6/365 475/5 |
| 2011/0259189 A1 | 10/2011 | Diekmeyer et al. |
| 2011/0319214 A1 | 12/2011 | Showalter |
| 2012/0136547 A1 | 5/2012 | Miyazaki et al. |
| 2012/0225751 A1 | 9/2012 | Andreae et al. |
| 2012/0285292 A1 | 11/2012 | Barnes |
| 2012/0303196 A1 | 11/2012 | Kieser et al. |
| 2012/0316713 A1 | 12/2012 | Pfefferl et al. |
| 2013/0053199 A1 | 2/2013 | Thompson |
| 2013/0166118 A1 | 6/2013 | Kim |
| 2013/0204472 A1 | 8/2013 | Pfefferl |
| 2013/0204490 A1 | 8/2013 | Pfefferl et al. |
| 2014/0206494 A1 | 7/2014 | Geis-Esser et al. |
| 2014/0209281 A1 | 7/2014 | Kamps et al. |
| 2014/0249730 A1 | 9/2014 | Hilberer |
| 2014/0265331 A1 | 9/2014 | Creviston |
| 2015/0038288 A1 | 2/2015 | Holmes et al. |
| 2015/0060166 A1 | 3/2015 | Erjawetz et al. |
| 2015/0073675 A1 | 3/2015 | Malone et al. |
| 2015/0101789 A1 | 4/2015 | Enomoto et al. |
| 2015/0135742 A1 | 5/2015 | Rousseau et al. |
| 2015/0283997 A1 | 10/2015 | Wang et al. |
| 2015/0285312 A1 | 10/2015 | Williams et al. |
| 2015/0285317 A1 | 10/2015 | Lannutti |
| 2016/0001649 A1 | 1/2016 | Benjey |
| 2016/0052383 A1 | 2/2016 | Caron |
| 2016/0082946 A1 | 3/2016 | Kodawara |
| 2016/0091070 A1 | 3/2016 | Park et al. |
| 2016/0097328 A1 | 4/2016 | Wintgens et al. |
| 2016/0101770 A1 | 4/2016 | Yamazaki et al. |
| 2016/0107505 A1 | 4/2016 | Johnston |
| 2016/0167499 A1 | 6/2016 | Holmes et al. |
| 2016/0193991 A1 | 7/2016 | Apelsmeier |
| 2016/0244050 A1 | 8/2016 | Ouchi et al. |
| 2016/0248129 A1 | 8/2016 | Dunham et al. |
| 2016/0258409 A1 | 9/2016 | Marthaler et al. |

(56) References Cited

U.S. PATENT DOCUMENTS

| | | |
|---|---|---|
| 2016/0280212 A1 | 9/2016 | Lian et al. |
| 2016/0280213 A1 | 9/2016 | Lian et al. |
| 2016/0347164 A1 | 12/2016 | Frank et al. |

FOREIGN PATENT DOCUMENTS

| | | |
|---|---|---|
| CN | 102723535 B | 7/2015 |
| CN | 105196859 A | 12/2015 |
| CN | 105604758 A | 5/2016 |
| CN | 105752082 A | 7/2016 |
| DE | 10 2005 024 359 A1 | 11/2006 |
| DE | 10 2012 013 334 A1 | 1/2014 |
| EP | 2 221 226 B1 | 1/2012 |
| FR | 2 995 014 B1 | 9/2014 |
| GB | 2523080 A | 8/2015 |
| JP | 2007-246030 A | 9/2007 |
| JP | 2012-111267 A | 6/2012 |
| JP | 5607954 B2 | 10/2014 |
| JP | 2016-098748 A | 5/2016 |
| WO | WO 2012/085294 A1 | 6/2012 |
| WO | WO 2015/019085 A2 | 2/2015 |

OTHER PUBLICATIONS

Written Opinion (PCT/ISA/237) issued in PCT Application No. PCT/US2017/062520 dated Jan. 19, 2018 (four (4) pages).
International Search Report (PCT/ISA/210) issued in PCT Application No. PCT/US2017/061265 dated Jan. 26, 2018 (three (3) pages).
Written Opinion (PCT/ISA/237) issued in PCT Application No. PCT/US2017/061265 dated Jan. 26, 2018 (seven (7) pages).
International Search Report (PCT/ISA/210) issued in PCT Application No. PCT/US2017/062018 dated Jan. 30, 2018 (three (3) pages).
Written Opinion (PCT/ISA/237) issued in PCT Application No. PCT/US2017/062018 dated Jan. 30, 2018 (six (6) pages).
International Search Report (PCT/ISA/210) issued in PCT Application No. PCT/US17/60737 dated Feb. 1, 2018 (four (4) pages).
Written Opinion (PCT/ISA/237) issued in PCT Application No. PCT/US17/60737 dated Feb. 1, 2018 (five (5) pages).
International Search Report issued in PCT Application No. PCT/US17/62457 dated Feb. 2, 2018 (four (4) pages).
Written Opinion (PCT/ISA/237) issued in PCT Application No. PCT/US17/62457 dated Feb. 2, 2018 (five (5) pages).
International Search Report (PCT/ISA/210) issued in PCT Application No. PCT/US17/65276 dated Feb. 23, 2018 (three (3) pages).
Written Opinion (PCT/ISA/237) issued in PCT Application No. PCT/US17/65276 dated Feb. 23, 2018 (four (4) pages).
Cummins Engines, Features and Parameters, http://cumminsengines.com/powerspec-isx-fan-control-features-and-parameters, 2015, (2 pages).
Horton, Lesson 3: Fan Drive Control System, (3 pages).
Logan Front Mount PTO's for Caterpillar C6.6 and C4.4 Diesel Engines and Generator Sets, Logan Clutch Corporation, 2011 (2 pages).
R. Bao et al., "Using Pneumatic Hybrid Technology to Reduce Fuel Consumption and Eliminate Turbo-Lag", SAE International, Apr. 8, 2013 (twelve (12) pages).
International Search Report (PCT/ISA/220 & PCT/ISA/210) issued in PCT Application No. PCT/US2017/060553 dated Jan. 18, 2018 (Three (3) pages).
Written Opinion (PCT/ISA/237) issued in PCT Application No. PCT/US2017/060553 dated Jan. 18, 2018 (Ten (10) pages).
International Search Report (PCT/ISA/220 & PCT/ISA/210) issued in PCT Application No. PCT/US2017/061041 dated Jan. 5, 2018 (Six (6) pages).
Written Opinion (PCT/ISA/237) issued in PCT Application No. PCT/US2017/061041 dated Jan. 5, 2018 (Three (3) pages).
International Search Report (PCT/ISA/220 & PCT/ISA/210) issued in PCT Application No. PCT/US2017/061672 dated Jan. 23, 2018 (Three (3) pages).
Written Opinion (PCT/ISA/237) issued in PCT Application No. PCT/US2017/061672 dated Jan. 23, 2018 (Four (4) pages).
International Search Report (PCT/ISA/220 & PCT/ISA/210) issued in PCT Application No. PCT/US2017/060975 dated Jan. 23, 2018 (Three (3) pages).
Written Opinion (PCT/ISA/237) issued in PCT Application No. PCT/US2017/060975 dated Jan. 23, 2018 (Four (4) pages).
International Search Report (PCT/ISA/210) issued in PCT Application No. PCT/US18/27159 dated Aug. 24, 2018 (six (6) pages).
Written Opinion (PCT/ISA/237) issued in PCT Application No. PCT/US18/27159 dated Aug. 24, 2018 (ten (10) pages).

* cited by examiner

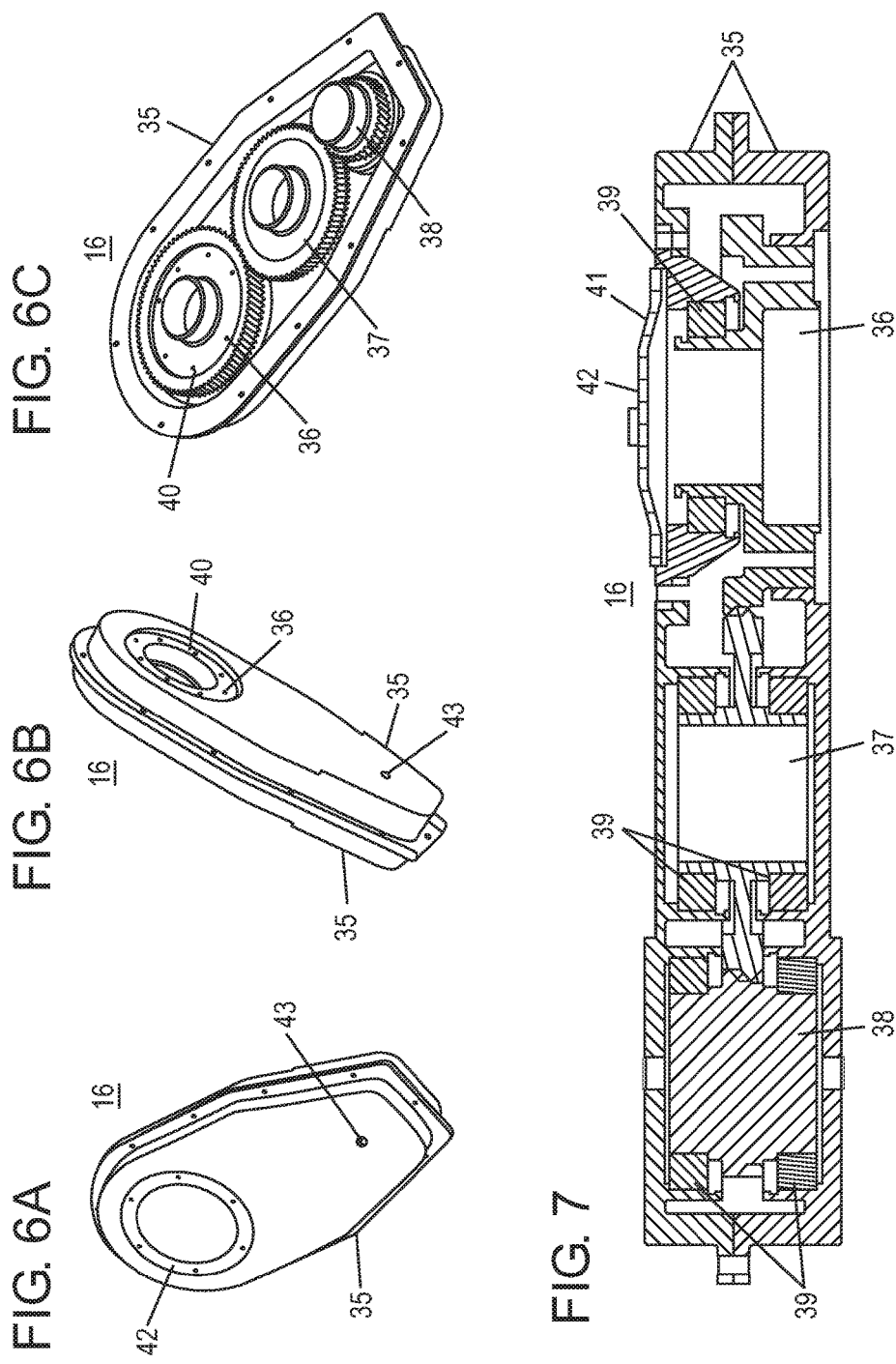

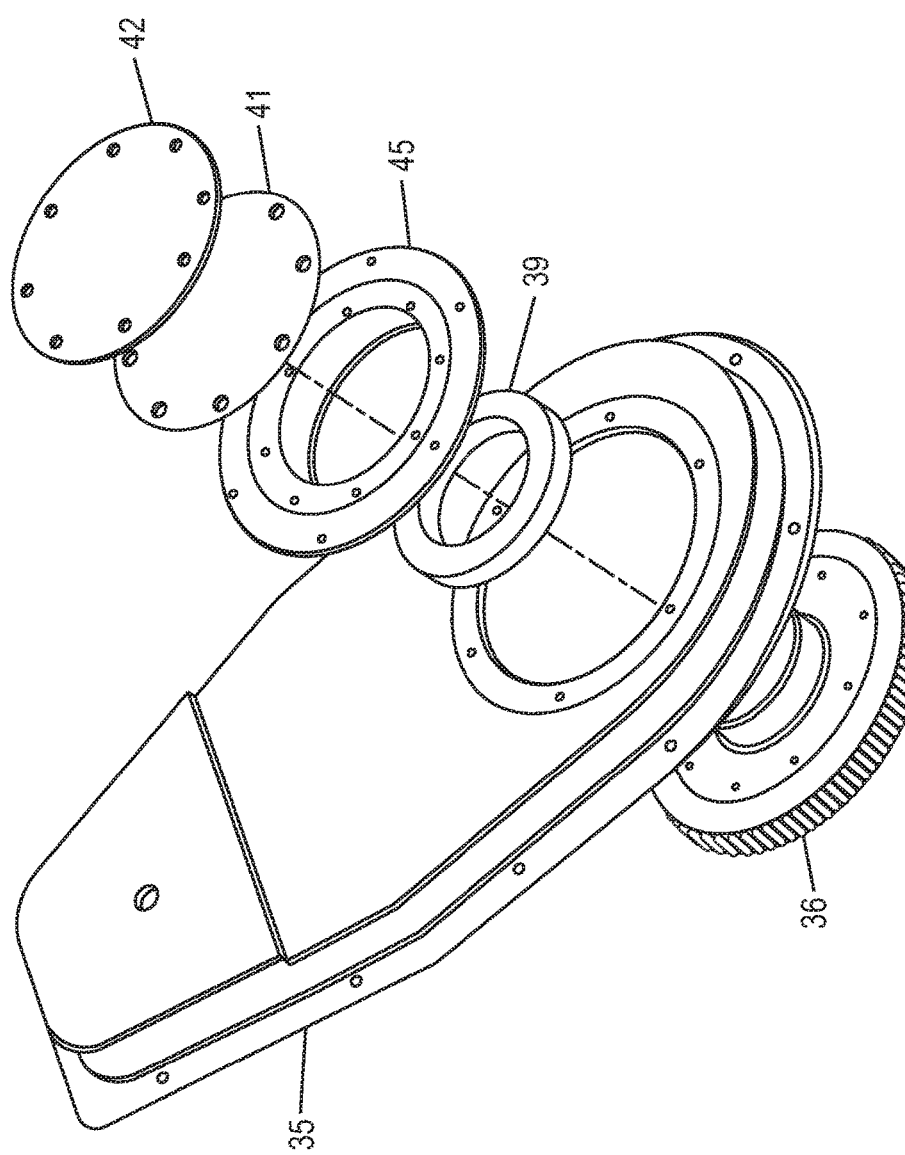

FRONT END MOTOR-GENERATOR SYSTEM AND HYBRID ELECTRIC VEHICLE OPERATING METHOD

BACKGROUND OF THE INVENTION

The present invention relates to hybrid electric vehicles, and in particular to a system for selective coupling of a hybrid electric generating and storage system with an internal combustion engine. The present invention further relates to a method of operating the system.

BACKGROUND OF THE INVENTION

Hybrid electric vehicles having an internal combustion engine combined with a motor-generator and an electrical energy storage system have been the focus of considerable attention in the automotive field, particularly in the field of passenger vehicles. Development of hybrid electric vehicle systems has only recently begun to attract significant interest in commercial and off-road vehicles, e.g., trucks and busses in Vehicle Classes 2-8, in earth-moving equipment and railroad applications, and in stationary internal combustion engine-powered installations.

Hybrid electric technologies offer numerous advantages, including improvements in fuel efficiency, reduction in internal combustion engine emissions and vehicle noise to help meet government regulatory requirements, improved vehicle performance and lower fleet operating costs. These advantages are obtained in significant part by hybrid electric systems' ability to recapture energy which would otherwise be wasted (such as mechanical energy from braking that would otherwise be dissipated as thermal energy to the environment) and return of the captured energy at another time when needed, such as powering vehicle components in lieu of using the internal combustion engine as the source of power or assisting in vehicle propulsion.

Typically, hybrid electric vehicle motor-generators have been arranged either independently of the internal combustions engine (for example, using separate electric motors to power and recover energy from front wheels while the engine provides propulsion power to the rear wheels), or have been coupled to the engine, for example being integrated into the "rear" of the engine (i.e., the end at which the engine's flywheel is located) or between the engine and the driveline to the wheels. This "behind the engine" position permits the motor-generator equipment to deliver torque directly to the vehicle's driveline and wheels, and to be directly driven by the driveline, for example, during regenerative braking events. Examples of the latter include flywheel-type motor-generators in which a conventional engine's flywheel is modified to serve as a motor-generator rotor and a concentrically-mounted stator is located around the flywheel, and separate electric motors arranged between the engine and the drive wheels, such as the so-called "two mode hybrid" transmission offered by General Motors in the 2009 GMC Silverado light-duty pickup in which the transmission accommodated two electric motors for vehicle propulsion and electric energy generation.

Another form of adding a motor-generator to an internal combustion engine is the use of so-called starter-generators. This approach directly couples an electric motor to an engine to serve both as an electric generator (a function traditionally performed by a conventional belt-driven alternator) and as an engine starter, thereby reducing the weight and cost of duplicate alternator and starter electric motors. Such starter-generator installations are particularly useful in so-called engine stop-start systems which turn off the engine during periods when the vehicle is stopped to save fuel and reduce idling emissions. Starter-generators have been located behind the engine (for example, an appropriately engineered flywheel motor-generator may also be used as a starter), as well as being mounted at the front end of an engine where the starter-generator can drive a belt directly coupled to the engine crankshaft. An example of the latter system the "belt alternator starter" system that was offered by General Motors as an option in the 2007 Saturn Vue sport-utility vehicle. These systems are very difficult to adapt to large engines, such as commercial vehicle diesel engines, because the electric motor must be larger to deal with the much higher torque demands of these heavy-duty engines, such as starting and operating various components (for example, an engine cooling fan can demand upwards of 50 KW of power, a load that requires a large amount of torque to drive the fan belt). Further, the belt drive in such an enlarged system would need to have the capacity to transfer the large levels of torque, something that may not be possible, or at least practical, because thicker and broader drive belts and pulleys sufficient to handle the torque demands may be so much larger and heavier than their automotive counterparts that they are weight, size and/or cost prohibitive.

Another approach to electrification is to use multiple individual electric motors to individually drive energy-consuming engine and vehicle accessories such as air conditioner compressors, power steering pumps, air compressors, engine cooling fans and coolant pumps, in order to reduce fuel consumption by removing the accessory loads from the engine. This approach significantly increase vehicle weight, cost, and wiring harness and control system line lengths and complexity, potentially offsetting fuel economy or emissions reduction gains provided by removing engine accessory loads from the engine.

The prior art hybrid electric vehicle systems have a number of disadvantages that have hindered their adoption in applications such as commercial vehicles. These include: engineering difficulties associated with attempting to scale up hybrid electric drive train components to handle the very high torque output of large engines (typically high-torque output diesel engines); the interdependence of the engine and motor-generator operation as a result of these components being either integral to the rear of the engine or directly in the drive line (i.e., both the engine and the motor-generator must rotate together, even when rotation of one or the other is not needed or even detrimental to overall vehicle operating efficiency); and the inability to independently meet "hotel" loads (e.g., overnight climate control and 120 volt power demands in a commercial vehicle tractor sleeper compartment) without either operating the vehicle's engine or operation of a separate vehicle-mounted auxiliary power unit ("APU"), such as a dedicated self-contained internal combustion engine package or a dedicated battery package containing multiple-conventional batteries and associated support equipment. These auxiliary power units are very costly (typically several thousand dollars), heavy and demand a considerable amount of space on an already space-constrained vehicle. They also have further disadvantages of, in the case of a fuel combusting APU, the potential hazards associated with open flames and generating carbon monoxide that could enter the sleeper compartment during driver rest periods, and in the case of a full electric APU, may not being able to return sufficient energy to supply all of the vehicle's accessory demands for extended periods with the vehicle engine shut down.

SUMMARY OF THE INVENTION

Overview of Primary Front End Motor-Generator System Components.

The present invention solves these and other problems by providing a hybrid electric vehicle system located at a front end of an engine, with a motor-generator being arranged in a manner that requires little or no extension of the length of the front of the vehicle. As used in this description, the "front end" of the engine is the end opposite the end from which engine-generated torque output is transferred to the primary torque consumers, such as a vehicle's transmission and drive axles or a stationary engine installation's load, such as a pump drive. Typically, the rear end of an engine is where the engine's flywheel is located, and the front end is where components such as engine-driven accessories are located (e.g., air conditioning and compressed air compressors, engine cooling fans, coolant pumps, power steering pumps). While the discussions that follow focus primarily on commercial vehicle embodiments in which the engine crankshaft is aligned with the longitudinal axis of the vehicle, the present invention is not limited to front-engine, longitudinally-aligned engine applications, but also may be used with transverse-mounted engines (including transverse-mounted engines located at the front or rear of a vehicle) which may also have highly space-constrained environments in the region adjacent to the end of the engine opposite the flywheel end.

Preferably, the front end motor-generator system of the present invention has the motor-generator located in the front region of the engine, laterally offset to the side of the rotation axis of the engine crankshaft. The motor-generator is preferably supported on a torque transfer segment (also referred to as a "drive unit"), for example a narrow-depth single reduction parallel shaft gearbox arranged with its input rotation axis co-axial with the engine crankshaft. The motor-generator preferably is positioned either behind the torque transfer segment in a space between the engine and an adjacent longitudinal vehicle chassis frame member, or in front of the torque transfer segment in a space below the vehicle's coolant radiator. The present invention is not limited to these locations for the motor-generator, but it instead may be located anywhere in the region near the front of the engine as long as the torque transfer segment on which it is mounted can align with the engine crankshaft rotation axis.

Preferably the torque transfer segment also provides a suitable speed ratio between its input and outputs (e.g., a 2:1 ratio) to better adapt engine and motor-generator speeds to one another, i.e., providing a speed increase from the engine to the motor-generator and speed reduction from the motor-generator output. The torque transfer segment may be a gearbox with gears or another drive arrangement, such as a chain belt, on a motor-generator side of a disengageable coupling (discussed further, below) between the engine crankshaft and the torque transfer segment that transfers torque between the motor-generator end and the engine end of the torque transfer segment. The torque transfer segment has an axially-narrow profile to permit it to be accommodated between the front of the engine crankshaft and any components in front of the engine, such as the engine's coolant radiator.

An important feature of the present invention is that the motor-generator exchanges torque with the engine crankshaft via a switchable coupling (i.e., disengageable) between the torque transfer segment and the front end of the crankshaft. The switchable coupling includes an engine-side portion coupled directly to the engine crankshaft, a drive portion engageable with the engine-side portion to transfer torque therebetween, and an engagement device, preferably an axially-actuated clutch between the drive portion and the engine-side portion. The engine-side portion of the coupling includes a crankshaft vibration damper (hereafter, a "damper"), unlike a conventional crankshaft damper that traditionally has been a separate element fixed to the crankshaft as a dedicated crankshaft vibration suppression device. This arrangement enables transfer of torque between the accessory drive, the motor-generator and the engine in a flexible manner, for example, having the accessory drive being driven by different torque sources (e.g., the engine and/or the motor-generator), having the engine the being the source of torque to drive the motor-generator as an electric generator, and/or having the motor-generator coupled to the engine and operated as a motor to act as a supplemental vehicle propulsion torque source.

Particularly preferably, the switchable coupling is an integrated clutch-pulley-damper unit having the clutch between the engine side damper portion and the drive portion. The drive side portion includes a drive flange configured to be coupled to the engine-end of the torque transfer segment, the drive flange also including one or more drive pulley sections on its outer circumference. This preferred configuration also has all three of the pulley, clutch and damper arranged concentrically, with at least two of these elements partially overlapping one another along their rotation axis. This arrangement results in a disengageable coupling with a greatly minimized axial depth to facilitate FEMG mounting in the space-constrained environment in front of an engine. The axial depth of the coupling may be further minimized by reducing the axial depth of the clutch, pulley and damper to a point at which the drive pulley extends concentrically around all or at least substantially all of the clutch and the engine-side damper portion of the coupling.

Alternatively, one or more of the three clutch, pulley and damper portions may be arranged co-axially with, but not axially overlapping the other portions as needed to suit the particular front end arrangements of engines from different engine suppliers. For example, in an engine application in which a belt drive is not aligned with the damper (i.e., the damper does not have belt-driving grooves about its outer circumference, such as in some Cummins® engine arrangements), belt-driving surface of the pulley portion of the coupling need not axially overlap the damper. In other applications having belt drive surfaces on the outer circumference of the damper and a further belt drive surface on a pulley mounted in front of the damper such as in some Detroit Diesel® engines, the coupling that would be used in place of the original damper and pulley may be arranged with both belt drive surfaces on a pulley that extends axially over the damper (i.e., the damper axially overlaps substantially all of both the damper and the clutch), or the belt drive surface on the outer circumference of the damper may be maintained (for example, to drive engine accessories that are never disconnected from the crankshaft, such as an engine coolant pump) while the other belt drive surface is located on the pulley member that extends axially over the clutch.

While in the description below reference is made to connecting the damper portion of the switchable coupling to the engine crankshaft, the switchable coupling engine connection is not limited to being connected to the crankshaft, but may be connected to any rotatable shaft of the engine accessible from the front of the engine that is capable of transferring torque between the engine and the motor-generator, such as a crankshaft-driven jackshaft or a suitably engineered camshaft having a front-accessible shaft end. Further, while in the description below reference is made to connecting a portion of the switchable coupling having the damper to the engine crankshaft, the switchable coupling's engine-side connection is not limited to a portion having a damper, but includes portions without a damper (such as a plate member) capable of being connected to a rotatable engine shaft while supporting an engine-side part of the disengageable coupling (such as holding an engine-side clutch plate of the switchable coupling opposite a pulley-side clutch plate).

The FEMG motor-generator is preferably electrically coupled to an electrical energy storage unit (also referred to herein as an "energy store"). This energy store preferably includes both batteries suitable for high-capacity, long-term energy storage, such as Lithium chemistry-based batteries capable of storing and returning large amounts of energy at moderate charge/discharge rates, and super capacitors capable of receiving and releasing electrical energy at very high charge/discharge rates that may be beyond the ability of the Lithium batteries to safely handle. This combination provides an energy store which can work with the motor-generator to absorb and/or discharge electrical current for short periods at higher-than normal levels (i.e., over a wider range of motor-generator input or output loads than could be handled by battery cells), while also providing battery-based long-term energy storage and return at lower charge and discharge rates.

While the present disclosure is primarily directed to use of the FEMG system in vehicle applications (in particular, to commercial vehicle applications), the FEMG system is also well-suited for use with stationary engine installations (for example, standby diesel generators), off-road engine applications such as self-propelled construction equipment, and other engine applications in which the available space for providing hybrid electric capability at the front of the engine is limited.

Overview of FEMG Drive of Engine Accessories

Engine accessories traditionally have been belt-driven, being directly driven by the engine crankshaft via a drive belt pulley bolted to the crankshaft. In the FEMG system the engine accessories also are driven by a pulley, but the pulley is located on the motor-generator side of the clutch-pulley-damper (the "drive portion" identified above). The pulley of the clutch-pulley-damper unit is driven either by the engine when the coupling is engaged, or by the motor-generator when the coupling is disengaged. When the pulley-clutch-damper is disengaged, all of the engine accessories driven by the pulley are disconnected from the engine, removing their respective power demands from the engine. This isolation of the accessories from the engine reduces fuel consumption when the engine is running. In addition, because the accessories may be independently driven by the FEMG motor-generator via the torque transfer segment while the coupling is disengaged, the engine may be shut off or operated at idle with few or no parasitic loads while the vehicle is at a standstill to save fuel and reduce emissions.

Further system efficiency gains may be obtained when the clutch-pulley-damper is disengaged, as the motor-generator's operating speed may be varied as desired to operate one or more of the engine accessories at a speed providing increased operating efficiency, while other engine accessories are operated at sub-optimum efficiency speeds if doing so decreases overall energy consumption.

Preferably, to increase system efficiency some or all of the engine accessories may be provided with individual drive clutches (either on/off or variable slip engagement) to enable selective engine accessory operation while other engine accessories are shut down or operated at reduced speed. The combination of the ability to operate the motor-generator at variable speeds and the ability to selectively engage, partially engage and disengage individual accessory clutches provides the opportunity to tailor accessory energy consumption to only that needed for the current operating conditions, further increasing overall system efficiency.

Alternatively, when one engine accessory has a high power input demand that must be met in the current vehicle operating state, the motor-generator may be driven at a speed that ensures the engine accessory with the highest demand can perform as needed, while other accessories are operated at lower-than-optimum efficiency, or are disconnected from the motor-generator drive by their respective clutches (if so equipped).

Preferably an FEMG controller, discussed further below, executes an algorithm which evaluates factors such as engine accessory operating efficiency data and current vehicle operating state information (e.g., energy store state of charge ("SOC"), engine torque output demand, coolant temperature) to select a combination of vehicle operating parameters (e.g., individual engine accessory clutch engagements, accessory operating speeds, clutch-pulley-damper pulley speed and engagement state, motor-generator speed and torque output) to determine a compromise configuration of coupling and clutch engagement states and component operating speeds that meets vehicle's operational needs while reducing fuel and energy use. For example, while providing superior overall system efficiency might be achieved by operating the motor-generator at a speed and torque output that places as many engine accessories as possible at or near their peak operating efficiency states, a particular vehicle need (such as the need to operate the high-torque demand engine cooling fan to control engine coolant temperature) may result in the FEMG controlling the motor-generator speed and/or torque output to ensure that the particular demand is met, and then operating the other individual engine accessories driven by the clutch-pulley-damper in as efficient a manner as is possible under the present vehicle operating circumstances.

Similarly, if the current demand for vehicle propulsion torque from the engine is high (and the charge state of the energy store allows), the FEMG controller may control the clutch-pulley-damper to be switched to an engaged state and command the motor-generator to supply supplemental torque to the engine crankshaft to increase the total output of propulsion torque, even if this results in the engine accessories being driven at less than optimum efficiency because their speeds are tied to the crankshaft speed.

Overview of Motor-Generator Uses

When operating conditions allow, the clutch-pulley-damper may be engaged such that mechanical energy can be recovered by the motor-generator from the engine crankshaft (i.e., recovering mechanical energy from the wheels that is transferred to the motor-generator through the drive line to the engine crankshaft). For example, the clutch may be engaged during deceleration events to allow the motor-generator to serve as a generator in a regenerative braking mode, a mode that also generates cost savings in reduced brake pad or brake shoe wear and fuel consumption savings by minimizing brake air use and the associated compressed air consumption, which in turn reduces air compressor use and energy consumption. The clutch also may be engaged when there is any other "negative torque" demand, such as when there is a need to provide a retarding force to minimize undesired vehicle acceleration due to gravity when the vehicle is travelling down a hill.

When the disengageable pulley-clutch-damper is engaged and operating conditions allow, the motor-generator may be operated as a torque-producing motor to supply supplemental torque to the engine crankshaft, thereby increasing the total torque output supplied to the vehicle driveline to improve vehicle acceleration.

Another use of the motor-generator is as the primary engine starter, eliminating the need for a heavy, dedicated starter motor. In this mode of operation the clutch-pulley-damper is engaged to permit motor-generator torque to be transferred directly to the engine crankshaft. This use of the motor-generator is very well suited to the motor-generator's operating characteristics, as it is capable of producing very high torque output starting at zero rpm, and do so nearly instantaneously. The very quick reaction time of the motor-generator and ability to do so multiple times without overheating makes an FEMG system an excellent choice for use as the primary engine starting motor in a fuel-conserving engine "stop/start" system in which the engine is started and stopped multiple times a day. The short re-start reaction time capability is highly desired in stop/start system applications, where it is well known that drivers express dissatisfaction with any substantial delay in automatic engine re-starting in response to the driver's demand to begin moving again (typically, a demand generated by releasing the vehicle's brake pedal following a traffic signal turning green). For example, drivers typically find a delay of one second or more before the engine starts and the vehicle begins to move to be at a minimum annoying, if not outright unacceptable.

Alternatively, the FEMG system's motor-generator may be operated as an engine starter in cooperation with a pneumatic starter motor that converts stored compressed air pressure to a mechanical torque output (a pneumatic starter typically being lighter and lower cost than a conventional electric starter motor). The FEMG system weight and cost may be improved with a combined FEMG/pneumatic starting arrangement, as the supplemental torque output of the pneumatic starter may permit the FEMG motor-generator size to be reduced in the case where the highest anticipated torque demand on the FEMG motor-generator is associated with engine starting (in particular, cold engine starting). In such a case, the FEMG motor-generator may be sized to meet the torque demand of the next-lower demand (for example, the highest expected torque demand from the most demanding combination of engine accessories), with the pneumatic starter being available to provide the additional engine starting torque needed above that provided by the smaller FEMG motor-generator.

The motor-generator also may be driven by the engine through the engaged clutch-pulley-damper clutch in a manner that eliminates the need to equip the engine with a heavy, dedicated alternator to supply operating voltage for a typical vehicle's 12 volt direct current electrical circuits, such as vehicle lighting circuits, power supplies to electronics modules and 12 V-powered driver-comfort features (heated seats, sleeper compartment electrics, etc.). In an FEMG system the needed 12 V power supply may be provided readily by a voltage converter that reduces the energy store's operating voltage (on the order of 300-400 volts) to the 12 volts required by the vehicle electrical circuits. Thus, the motor-generator's generation of electrical energy to charge the energy store provides a source of 12 V electrical energy that permits elimination of a conventional engine-driven alternator. The storage of large amounts of energy in the energy store also creates the opportunity to remove additional weight and cost from the vehicle by reducing the number of 12 V batteries carried needed to meet the vehicle's various needs. For example, a vehicle which conventionally may have four separate 12 V batteries may only need a single 12 V battery along with the energy store.

Similarly, a voltage converter may be used to directly supply 120 volt alternating current power to the vehicle, for example to the sleeper compartment for appliance or air conditioner use or to an attached trailer to operate trailer devices such as refrigeration units (the latter preferably with a trailer connection to the vehicle's CAN system for tractor-centric monitoring and control of the trailer accessories). If the energy store is designed to provide sufficient storage capacity, the FEMG system also may eliminate the need to equip a vehicle with a costly and heavy internal combustion engine-powered auxiliary power unit to support vehicle operation when the engine is shut down for long periods. For example, an APU would no longer be needed to provide power to a sleeper compartment air conditioning unit during overnight driver rest periods.

The FEMG also potentially may be used as an active damper to counter rapid torque reversal impulses ("torque ripples") sometimes encountered during various load, speed and environmental conditions. In this application the FEMG control module would receive signals from vehicle sensors indicating the presence of torque ripples and output commands to the motor-generator to generate counter-torque pulses timed to cancel the driveline torque reversal pulses. This FEMG motor-generator-based active damping would help protect the driveline from mechanical damage from the high stresses induced by the rapid change in torque loads, as well as improve driver comfort by removing the rapid accelerations/decelerations transmitted through the vehicle chassis to the driver's compartment.

Overview of FEMG Controller Programming and Operating Methods

In a preferred embodiment, an FEMG controller, preferably in the form of an electronic control module, monitors multiple vehicle signals, including signals available on the vehicle's CAN and/or SAE J1939 bus network if the vehicle is so equipped. One of the signals may be a state of charge (SOC) indication from a battery monitoring system that monitors, among other parameters, a charge state of the energy store. The control module may be programmed, for example, to recognize three levels of charge state, minimum charge level (for example, a 20% state of charge), intermediate charge level (for example, a 40% state of charge) and maximum charge level (for example, an 80% state of charge). The control module further may be programmed to include the state of charge as a factor in determining when to engage and disengage the clutch of the clutch-pulley-damper, at what speed the motor-generator should be operated, the operating speeds of some or all of the engine accessories being driven from the pulley of the clutch-pulley-damper, and what combination of vehicle component operation and operating parameters will increase overall vehicle operating efficiency while meeting the vehicle's current operating needs and meeting requirements for safe vehicle operation (e.g., maintaining at least a minimum required amount of air pressure in the vehicle's pneumatic system compressed air storage tanks by operating the air compressor, even if doing so decreases the overall energy efficiency of the vehicle).

In one embodiment, when the state of charge of the energy store is below the minimum charge level, the clutch of the clutch-pulley-damper may be engaged and the motor-generator controlled by the control module to cause the motor-generator to produce electrical energy for storage. In this operating mode the motor-generator is powered by the engine or by the wheels via the driveline through the engine. Once the state of charge is above the minimum charge level, the clutch-pulley-damper's clutch may remain engaged until the intermediate charge level is reached, and the motor-generator controlled to generate electrical energy only during a braking, deceleration or negative torque event. This mode permits non-engine-provided mechanical energy to be used by the motor-generator on an as-available basis to continue to charge the energy store, while minimizing the amount of energy the engine must provide to the motor-generator and thereby reducing fuel consumption.

In another operating mode, once the intermediate charge level is reached, the control module may determine the clutch of the clutch-pulley-damper can be disengaged and the motor-generator used as a motor to generate torque to drive the engine accessories without assistance from the engine, i.e., the motor-generator becomes the sole source of drive energy for the engine accessories. In this mode, the motor-generator draws stored electrical energy from the energy store to generate torque for delivery, via the drive unit gearbox, to the pulley of the clutch-pulley-damper to drive engine accessories such as the engine cooling fan and the pneumatic supply system's air compressor. By disengaging the engine from the torque demands of the engine accessories, the engine may be operated with a lower parasitic torque load to reduce the engine's fuel consumption or to make more engine torque output available to propel the vehicle. Alternatively, when the motor-generator can be operated in the motor mode to drive the engine accessories, the engine may be shut down entirely, such as when in stop-and-go traffic in a vehicle equipped with a start/stop system.

Between the intermediate charge level and the maximum charge level, the front end motor-generator control module continues to monitor the vehicle operating state, and during a braking, deceleration or negative torque event can take advantage of the opportunity to further charge the energy store without using engine fuel by engaging the clutch of the clutch-pulley-damper and controlling the motor-generator to generate electrical energy. While charging during a braking, deceleration or negative torque event can occur at any time the energy store is below the maximum charge level; in this embodiment avoiding use of engine fuel for charging above the intermediate charge level reduces fuel consumption and improves overall efficiency.

At any point above the minimum charge level the motor-generator may be operated as a motor to generate torque to be delivered to the engine crankshaft to supplement the engine's torque output, thereby increasing the amount of torque available to propel the vehicle. The increased torque output to the driveline enables improved vehicle acceleration and provides additional benefits, such as improved fuel economy from fewer transmission gearshifts and more rapid acceleration to cruising speed (e.g., "skip-shifting," where the motor-generator adds sufficient engine torque to permit one or more gear ratios to be passed over as the vehicle accelerates, reducing vehicle time to speed and fuel consumption). Moreover, in vehicles equipped with pneumatic boost systems ("PBS", systems which inject compressed air into the engine intake to very quickly provide additional engine torque output), use of the virtually "instant on" torque assist from the motor-generator whenever possible in lieu of using compressed air injection from the PBS system to generate additional engine torque output can reduce compressed air use, in turn further reducing fuel consumption and component wear (the consumption and wear associated with additional air compressor operation to replenish the compressed air supply).

Once the FEMG control module determines the maximum charge level has been reached and therefore no further input of electrical energy into the energy store is desired, the control module will prevent operation of the motor-generator as a generator in order to protect the energy store from damage due to over-charging. In this mode the motor-generator may be used only as an electric motor to drive the engine accessories and/or to provide supplemental drive torque to the engine, or allowed to rotate in a non-power-producing idle state if there is no current engine accessory demand.

The FEMG controller preferably communicates with several vehicle controllers, such as the vehicle's brake controller (which may be controlling different types of brakes, such as pneumatic or hydraulic brakes), the engine and/or transmission controllers and the one or more controllers managing the energy store. These communications permit coordinate operation of the vehicle systems. For example, in the case of a braking demand that is sufficiently low to only require use of an engine retarder, the brake controller and FEMG control module may signal one another to give the motor-generator priority over use of the retarder, such that the motor-generator provides regenerative braking if the energy charge state will allow storage of additional electrical energy (i.e., energy store charge state below the maximum allowed charge state). Conversely, if the operating conditions are not such that generation of additional electrical energy by the motor-generator is desired, the FEMG control module may signal such to the brake controller so that the brake controller activates the retarder to provide the desired amount of braking. The communications between the controllers preferably is on-going, providing the ability for rapid updating of status. For example, the brake controller would be able to signal the FEMG control module to reduce the amount of regenerative braking if the driver lowers the amount of braking demand during the braking event.

Another example of possible inter-controller communications is coordination of air compressor operations with energy store management. For example, the air compressor controller may signal the FEMG control module to operate the motor-generator with the clutch-pulley-damper clutch disengaged (engine running or shut down) to drive the air compressor at a desired speed to replenish compressed air storage resulting from a large air consumption demand (such as a tire inflation system trying to counter a large tire pressure leak, a large air leak in tractor or trailer air lines, use of a trailer's air-landing gear, high air release during ABS system brake pressure modulation or trailer stability system activation on low-friction road surfaces, operating a king pin air-operated lock/unlock device, or actuation of an air-operated lift-axle).

Additional Operational Improvements Provided by the FEMG System

In addition to the already mentioned features, capabilities and advantages, the present invention's front end motor-generator approach has the important advantage of not requiring substantial modifications to the front of a vehicle, such as lengthening of the nose of a commercial vehicle tractor or increasing the size of an engine compartment of a diesel-powered municipal bus. This is directly the result of the FEMG system being readily accommodated between the front of the engine and the engine's coolant radiator by use of the integrated clutch-pulley damper unit and associated axially-narrow drive unit to laterally transfer torque to/from the motor-generator. As a result, the FEMG system is exceptionally well suited for incorporation into existing vehicle designs, both during the course of new vehicle assembly and by retro-fitting existing internal combustion engines to upgrade older vehicles (particularly commercial vehicles) and stationary engine installations with hybrid-electric technology.

Another operational advantage provided by the FEMG system is its ability for the motor-generator to assist the engine to provide short duration "over-speed" vehicle operation. In such an application, the vehicle's controllers coordinate the addition of supplemental torque from the motor-generator with a temporary override of the vehicle's speed governor to allow for brief "bursts" of speed, for example to permit rapid completion of overtaking of a similar speed vehicle such as another large truck. While use of such an operating mode should be limited to brief, infrequent periods to minimize excessive loading of the engine and driveline components, the FEMG system could be programmed to provide a driver-actuated "over-speed" mode, i.e., a driver-switchable option (e.g., a "push-to-pass" button) to briefly increase speed on an as-needed basis. Preferably such a push-to-pass mode could be coordinated with a vehicle's blind-spot monitoring controller via the CAN network, enabling, for example, the over-speed operation to be automatically terminated once the blind-spot monitoring system indicates the vehicle being passed is no longer alongside. This coordination would include as part of the termination of this mode the FEMG control module terminating the motor-generator's supply of supplemental torque to the engine crankshaft.

Motor-generator supplemental torque has further applications, such as reducing driver fatigue in a driver assistance system by automatically adding torque when doing so would minimize the need for the driver to manually shift the transmission, particularly when climbing hills (and when associated safety requirements are satisfied, such as there being nothing in the view of the vehicle's adaptive cruise-control camera and/or radar systems).

Supplemental motor-generator torque may also be used in a trailer weight-determination system in which a known amount of additional torque is added and a measurement of the resulting vehicle acceleration during the supplemental torque application is used in a vehicle mass calculation.

The addition of supplemental drive torque from the motor-generator should be constrained in cases where safety concerns are present. For example, the commanding of supplemental torque delivery should be inhibited when a low friction signal indicative of the trailer wheels encountering a low friction surface is received from the trailer.

The application of the FEMG system is not limited to applications in which the motor-generator is the sole electric generator. Synergies may be realized by the addition of an FEMG front end installation to an engine and/or drivetrain that also includes a motor-generator unit to the rear of the crankshaft-side of the FEMG clutch, for example, at the rear of the engine (such as a flywheel motor-generator), in the downstream driveline (such as a motor-generator incorporated into a transmission) or at the front end of the crankshaft, i.e., on the constantly-engaged side of the FEMG clutch-pulley-damper unit.

The combination of an FEMG system and a "back end" hybrid electric arrangement presents opportunities for overall vehicle operational improvements. For example, the presence of both front and back-end systems may enable one or both of the motor-generators to be reduced in size and weight while still meeting vehicle demands, because neither motor-generator needs to be sized to handle all of the vehicle's electrical demands where there is no longer a need for all of the vehicle's electric generation and power supply demands to be met by only one motor-generator. Further, operational flexibility may be increased by the presence of two motor-generators if each is be able to meet at least essential vehicle demands in the event of failure of the other motor-generator, thereby permitting the vehicle to continue in operation, perhaps at reduced performance, until reaching a time or place where repairs may be performed.

The operation of an FEMG system and a back-end motor-generator may also be coordinated to split and/or share loads on an as-needed basis to optimize vehicle operation. For example, loads may be split between the motor-generators in a case where the FEMG system assumes engine accessory drive and energy storage charging demands while the back-end motor-generator helps propel the vehicle by providing supplemental torque output to the vehicle driveline to assist the engine. An example of a sharing synergy would be using the back-end motor-generator to receive and store energy from regenerative braking from the driveline while keeping the FEMG decoupled from the crankshaft to improve engine accessory efficiency (i.e., allowing capture of regenerative braking energy by the back-end motor-generator even when the FEMG system is decoupled from the crankshaft and thus not able to capture otherwise wasted braking energy). The flexibility of the combination of an FEMG system with another partial hybrid system is limitless, e.g., operating both motor-generators together with the FEMG clutch engaged to have both motor-generators provide supplemental drive torque or to use both to capture regenerative braking energy for storage, etc.

The FEMG components and controllers also may be adapted for use in applications benefiting from the capability to disengage engine accessories from the engine crankshaft, but do not have a need for the electricity generation capacity a full FEMG system installation would provide. Such "motor-only" applications may include vehicles having operating needs which do not require the additional expense and complication of a high-voltage electrical energy storage and distribution system, but which may still benefit from efficiency improvements using the FEMG system's ability to decouple the engine crankshaft from the accessory drive and use an FEMG motor to drive the accessories. Such motor-only operation may be supplied from a smaller, simpler battery pack whose charge state could be maintained by the vehicle engine's alternator.

For example, an engine in a container transporter used at a container ship port loading/unloading yard would not need the ability to supply power for long periods when the engine is shutdown, such as providing overnight power for an over-the-road truck's sleeper compartment. Yet the container transporter efficiency and/or torque output may be improved with an FEMG system's crankshaft decoupling components and its associated control of accessory drive by the FEMG motor. For example, efficiency improvements may be realized by decoupling the crankshaft from the accessory drive in various operating conditions, such as at idle times to remove accessory loads from the engine; to permit operation of the transporter systems for short periods while the engine is shutdown, to enable fuel-saving engine stop-start operations; and to devote full engine torque output to the transporter drive when needed by removing the accessory drive torque demand from the engine). Similarly, a motor-only FEMG system may be coupled to the engine crankshaft when it is desired to have the FEMG motor supplement the engine's propulsion torque output. This latter feature may enable further improvements by allowing the engine to be smaller, lighter and less costly by being sized to meet an "average" torque demand, with the FEMG motor providing supplemental torque as needed to meet the vehicle's design total propulsion torque demand.

In sum, the front end motor-generator system of the present invention is uniquely suited to provide both new and retro-fitted commercial vehicles, off-road vehicles and stationary engine installations with a hybrid electric system having mechanically simplified, space-efficient and cost-effective common electric drive that permits variable speed control of engine accessories, the ability to drive engine accessories independently of engine crankshaft speed, and the ability to store and return energy to operate electrically-powered systems over extended periods when the engine is not running, thereby providing significant overall fuel and cost efficiency improvements by:

- minimizing engine accessory energy consumption, thereby increasing fuel economy (i.e., removing accessory torque demands on the internal combustion engine when the clutch-pulley-damper unit is disengaged from the engine crankshaft),
- recovering otherwise wasted energy (e.g., generating electrical energy for storage rather than applying wheel brakes to convert vehicle kinetic energy into waste heat), and
- extending component life (e.g., only operating accessories such as an engine cooling fan, air conditioning compressor and air compressor as needed and at accessory speeds and/or duty cycles that correspond to actual vehicle demands, rather than all accessories being forced to run as a speed dictated by the engine crankshaft speed; minimizing brake wear and compressed air use that would otherwise require engine-driven air compressor operation).

Other objects, advantages and novel features of the present invention will become apparent from the following detailed description of the invention when considered in conjunction with the accompanying drawings.

BRIEF DESCRIPTION OF THE DRAWINGS

FIGS. 6A-6C are oblique views of an FEMG drive unit in the form of a gearbox in accordance with an embodiment of the present invention.

FIG. 7 is a cross-section view of the FEMG gearbox of FIGS. 6A-6C.

FIG. 8 is exploded view of an FEMG clutch pneumatic actuator diaphragm arrangements in accordance with an embodiment of the present invention.

DETAILED DESCRIPTION OF THE DRAWINGS

A Front End Motor-Generator System Embodiment.

Figure 1A:
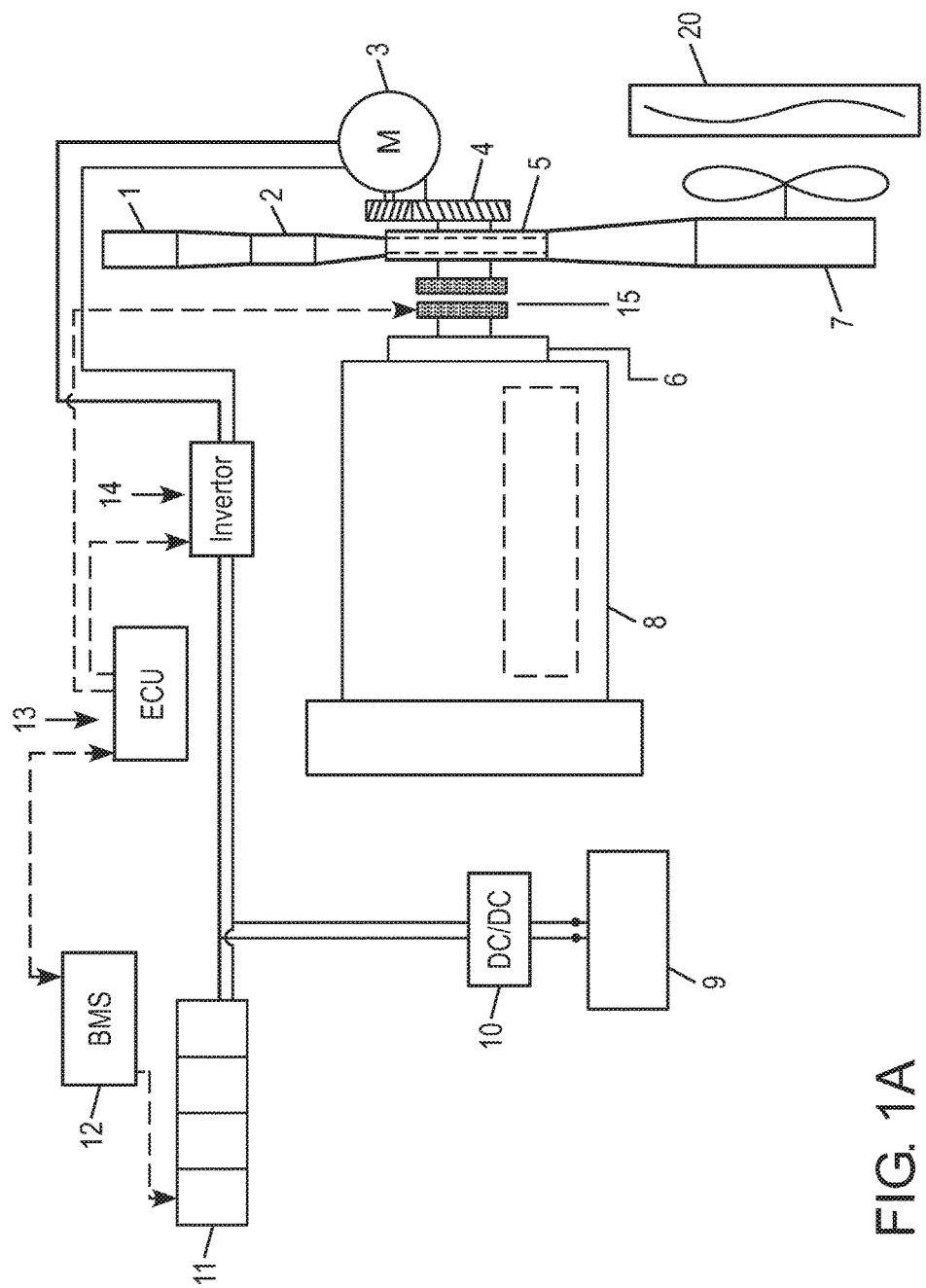
FIGS. 1A and 1B are schematic illustrations of an overall view of the arrangements of an FEMG system in accordance with an embodiment of the present invention.
Figure 1B:
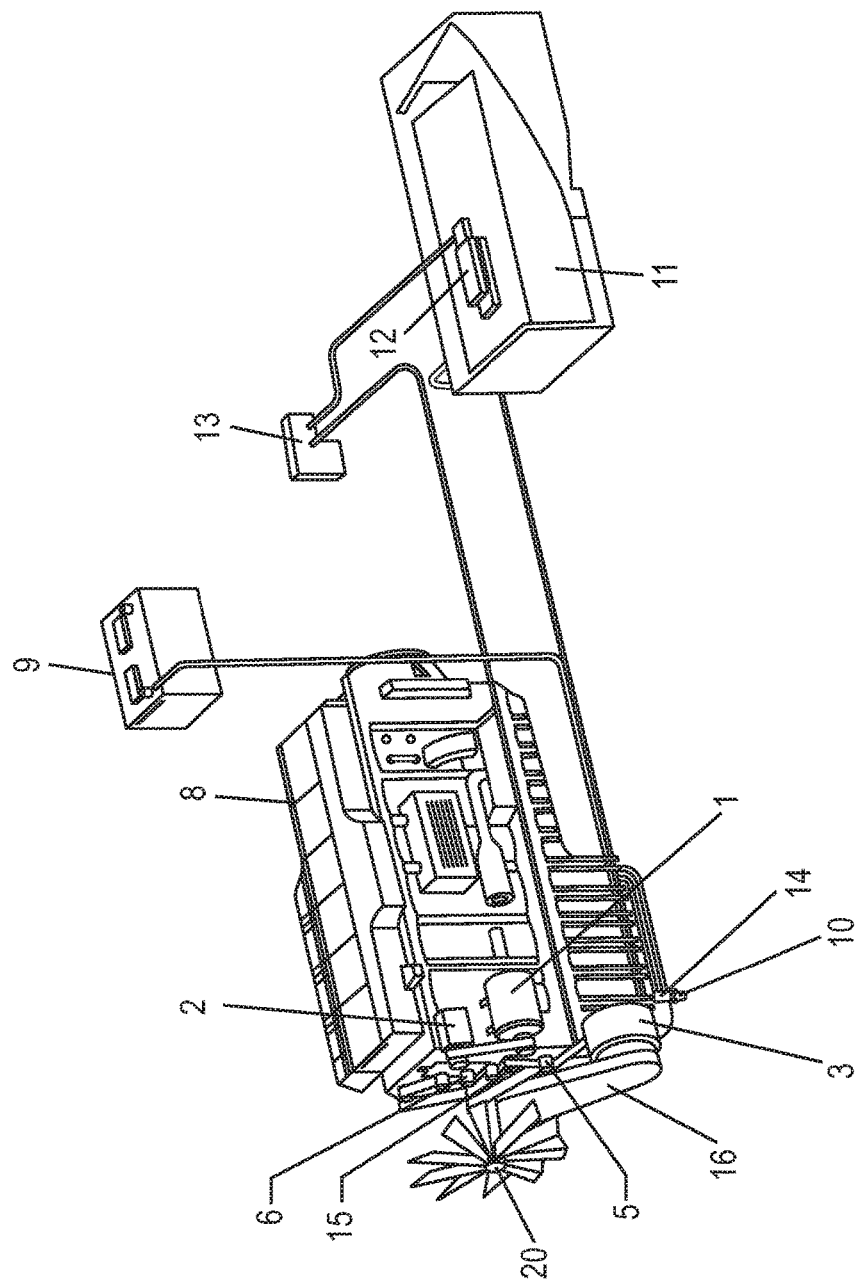

FIG. 1A is a schematic illustration showing components of an embodiment of an FEMG system in accordance with the present invention. FIG. 1B is a schematic illustration of several of the FEMG system components in the chassis of a commercial vehicle. In this arrangement, the engine accessories (including air compressor 1, air conditioning compressor 2 and engine cooling fan 7 arranged to pull cooling air through engine coolant radiator 20) are belt-driven from a pulley 5. The pulley 5 is located co-axially with a damper 6 coupled directly to the crankshaft of the internal combustion engine 8. The accessories may be directly driven by the drive belt or provided with their own on/off or variable-speed clutches (not illustrated) which permit partial or total disengagement of an individually clutch-equipped accessory from the belt drive.

In addition to driving the accessory drive belt, the pulley 5 is coupled a drive unit having reduction gears 4 to transfer torque between a crankshaft end of the drive unit and an opposite end which is coupled to a motor-generator 3 (the drive unit housing is not illustrated in this figure for clarity). A disengageable coupling in the form of a clutch 15 is arranged between the crankshaft damper 6 and the pulley 5 (and hence the drive unit and the motor-generator 3). Although schematically illustrated as axially-separate components for clarity in FIG. 1A, in this embodiment the crankshaft 6, clutch 15 and pulley 5 axially overlap one another at least partially, thereby minimizing an axial depth of the combined pulley-clutch-damper unit in front of the engine. Actuation of the pulley-clutch-damper clutch 15 between its engaged and disengaged states is controlled by an electronic control unit (ECU) 13.

On the electrical side of the motor-generator 3, the motor-generator is electrically connected to a power inverter 14 which converts alternating current (AC) generated by the motor-generator output to direct current (DC) useable in an energy storage and distribution system. The power inverter 14 likewise in the reverse direction converts direct current from the energy storage and distribution system to alternating current input to power the motor-generator 3 as a torque-producing electric motor. The inverter 14 is electrically connected to an energy storage unit 11 (hereafter, an "energy store"), which can both receive energy for storage and output energy on an on-demand basis.

In this embodiment, the energy store 11 contains Lithium-based storage cells having a nominal charged voltage of approximately 3.7 V per cell (operating range of 2.1 V to 4.1 V), connected in series to provide a nominal energy store voltage of 400 volts (operating voltage range of approximately 300 V to 400 volts) with a storage capacity of between approximately 12 and 17 kilowatt-hours of electrical energy. Alternatively, the cells may be connected in series and parallel as needed to suit the application. For example, 28 modules with four series-connected cells per module could be connected in series and in parallel to provide an energy store with the same 17 kilowatt hours of stored energy as the first example above, but with a nominal operating voltage of 200 V volts and twice the current output of the first example.

In addition to the relatively high-capacity, low charge-discharge rate Lithium-based storage cells, the energy store 11 in this embodiment includes a number of relatively low-capacity, high charge-discharge rate of super capacitors to provide the energy store the ability over short periods to receive and/or discharge very large electrical currents that could not be handled by the Lithium-based storage cells (such cells being typically limited to charge/discharge rates of less than 1 C to only a few C).

FEMG System Hardware Assembly Embodiment.

Figure 2A:
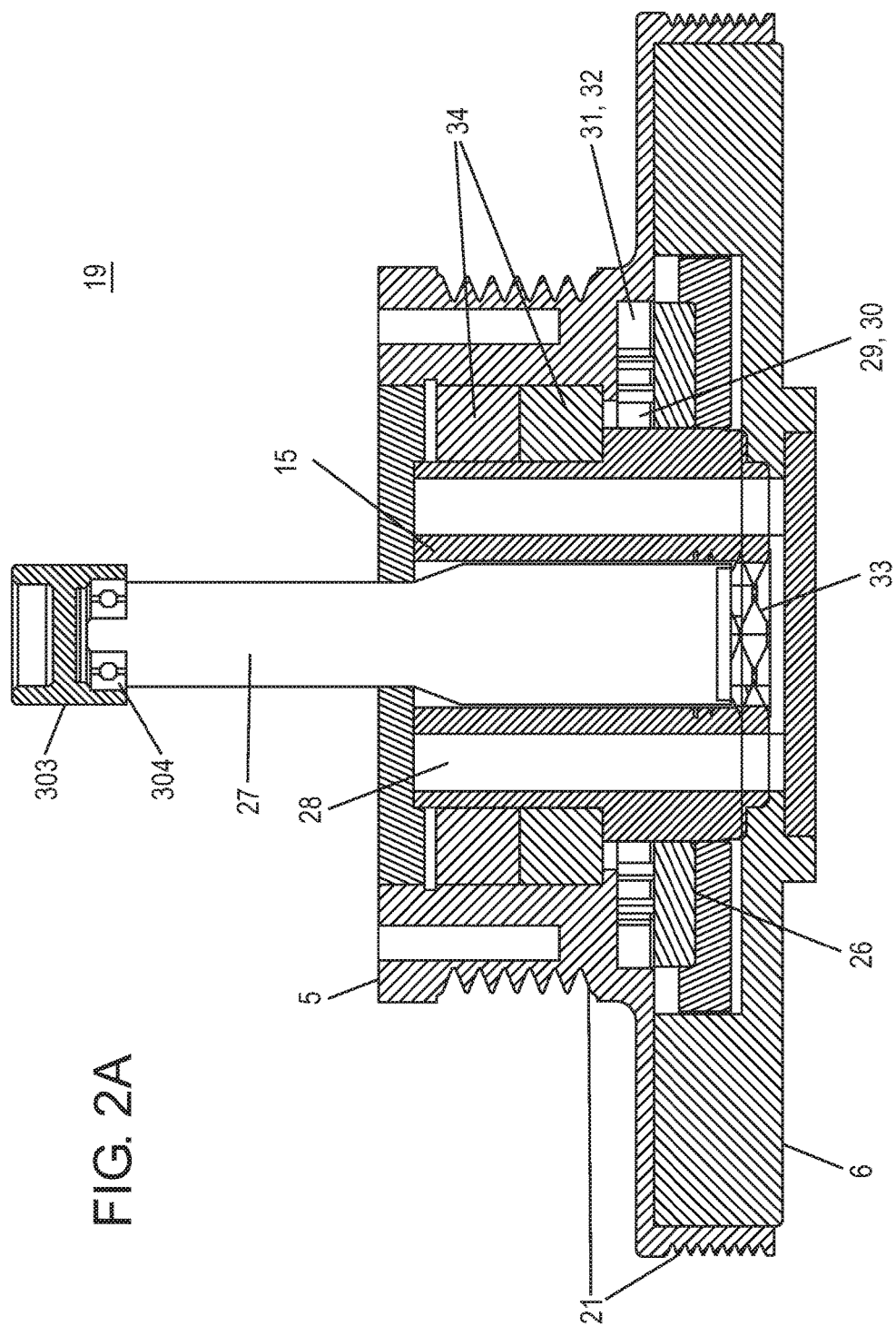
FIGS. 2A-2C are cross-section views of an embodiment of a clutch-pulley-damper and assembled FEMG components in accordance with the present invention.
Figure 2B:
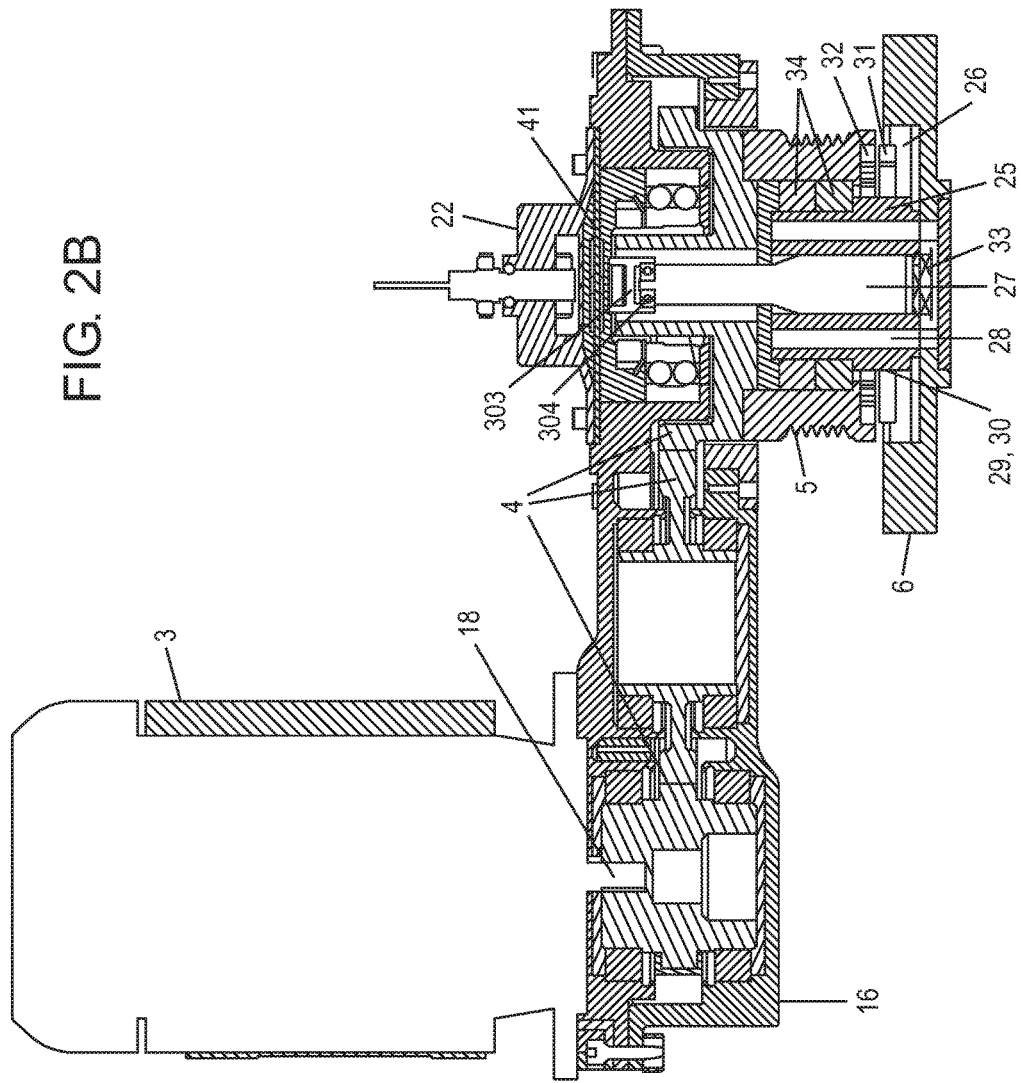
Figure 2C:
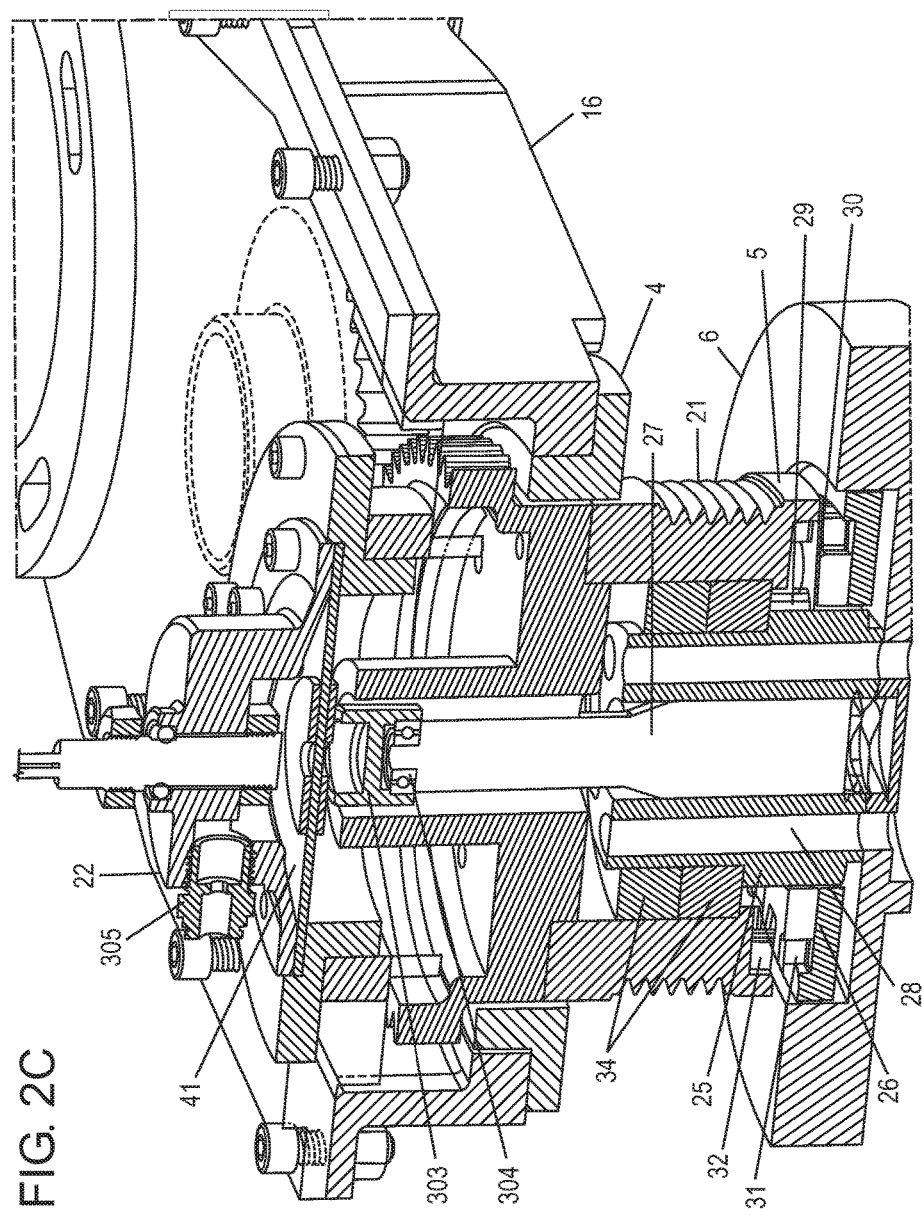

FIGS. 2A-2C show cross-section views of an embodiment of the clutch-pulley-damper unit 19 and of an assembled configuration of FEMG system hardware with this clutch-pulley-damper embodiment. In this embodiment the gearbox 16 containing reduction gears 4 receives the motor-generator 3 at a motor-generator end of the gearbox. The motor-generator 3 is secured to the housing of gearbox 16 with fasteners such as bolts (not illustrated). A rotor shaft 18 of the motor-generator 3 engages a corresponding central bore of the adjacent co-axially-located gear of the reduction gears 4 to permit transfer of torque between the motor-generator 3 and the reduction gears 4.

At the crankshaft end of the gearbox 16, the reduction gear 4 which is co-axially-aligned with the clutch-pulley-damper unit 19 is coupled for co-rotation to pulley side of the clutch-pulley-damper unit 19, in this embodiment by bolts (not shown) passing through the co-axial reduction gear 4. The engine-side portion of the coupling (the portion having the crankshaft damper 6) is configured to be coupled to the front end of the engine crankshaft by fasteners or other suitable connections that ensure co-rotation of the engine-side portion 6 with the crankshaft. As described further below, the gearbox 16 is separately mounted to a structure that maintains the clutch-pulley-damper unit 19 co-axially aligned with the front end of the engine crankshaft.

The cross-section view in FIG. 2B is a view from above the FEMG front end hardware, and the oblique cross-section view in FIG. 2C is a view at the crankshaft end of the gearbox 16. In this embodiment, the gearbox, motor-generator and clutch-pulley-damper unit assembly is arranged with the motor-generator 3 being located on the left side of the engine crankshaft and on the front side of the gearbox 16 (the side away from the front of the engine), where the motor-generator 3 may be located either in a space below or directly behind the vehicle's engine coolant radiator 20. Alternatively, in order to accommodate different vehicle arrangements the gearbox 16 may be mounted with the motor-generator 3 to the rear of the gearbox 16, preferably in a space laterally to the left side of the engine crankshaft (for example, adjacent to the oil pan at the bottom of the engine). The gearbox 16 further may be provided with dual-sided motor-generator mounting features, such that a common gearbox design may be used both in vehicle applications with a front-mounted motor-generator and vehicle applications with the motor-generator mounted to the rear side of the gearbox.

FEMG Clutch-Pulley-Damper Unit Embodiments.

Figure 3A:
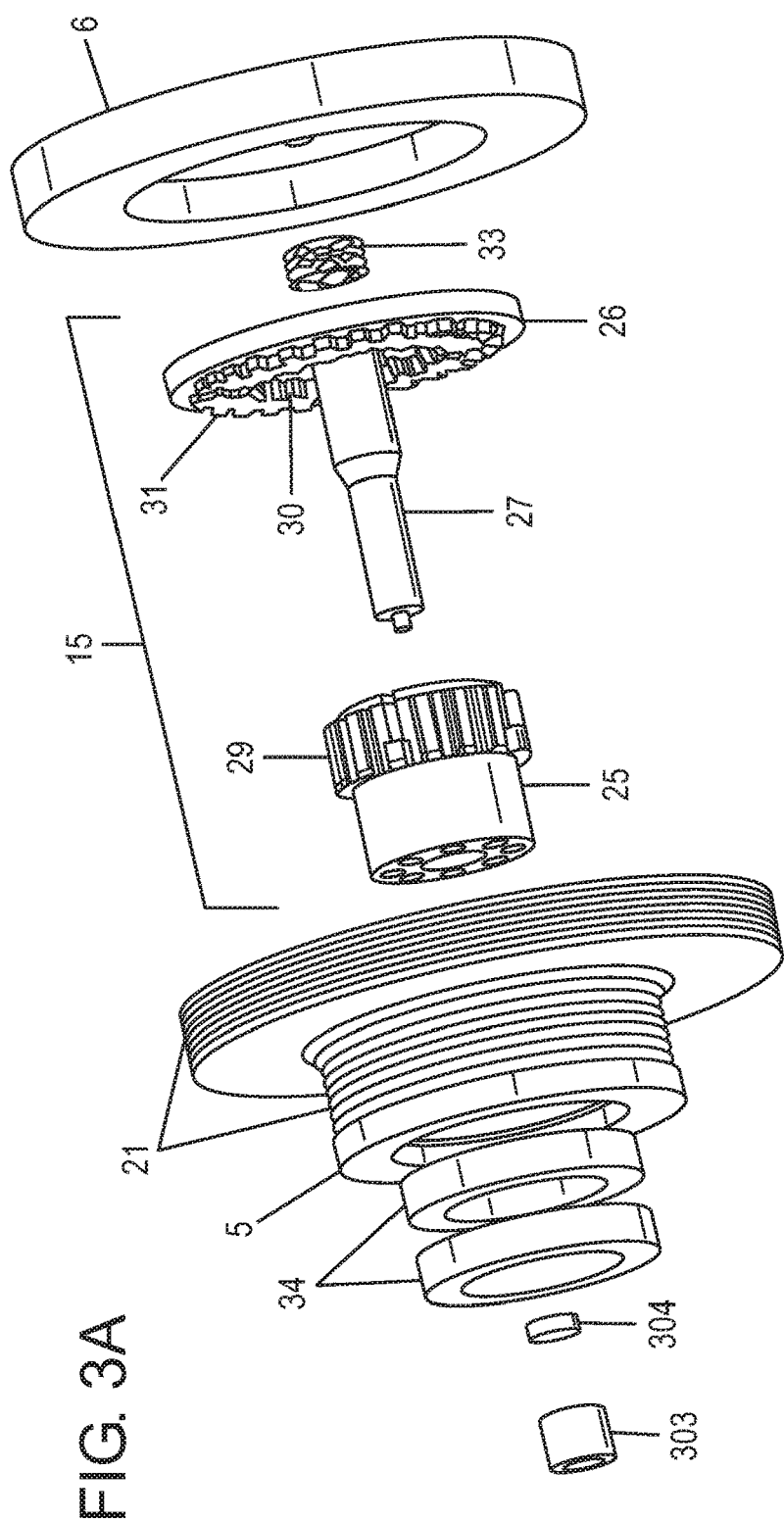
FIGS. 3A-3C are views of the components of the FIGS. 2A-2C clutch-pulley-damper unit.
Figure 3B:
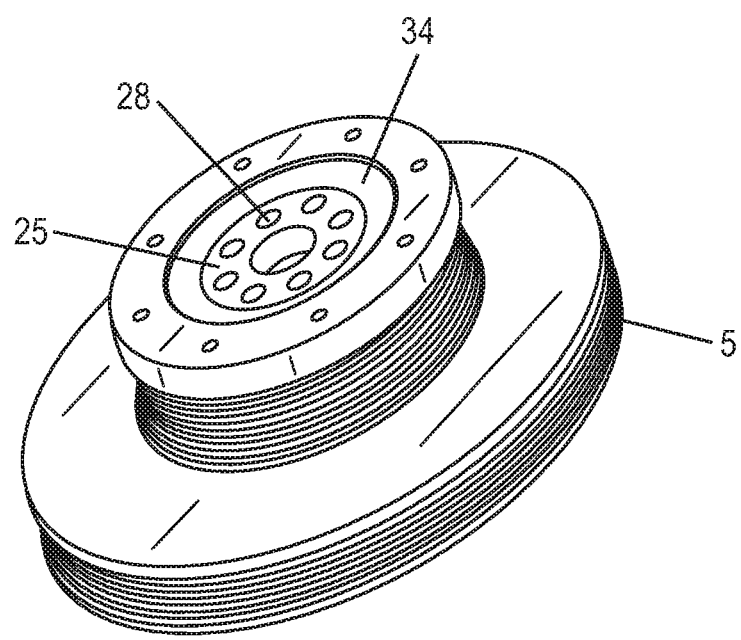
Figure 3C:
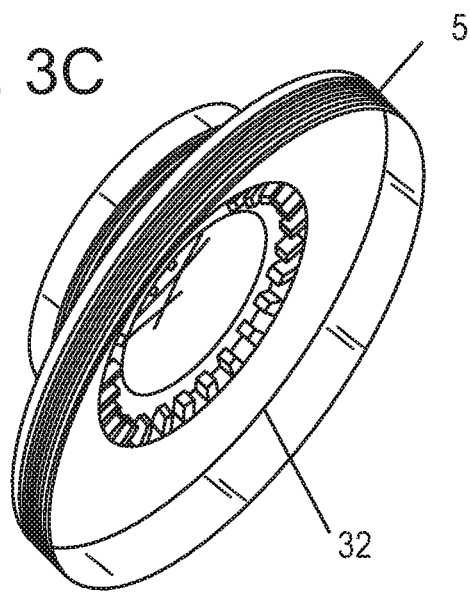

FIGS. 3A-3C are views of the components of the clutch-pulley-damper unit 19 of FIGS. 2A-2C. When assembled, the unit is unusually narrow in the axial direction due to the substantial axial overlapping of the pulley 5, engine-side portion 6 (hereafter, damper 6) and clutch 15. In this embodiment the pulley 5 has two belt drive portions 21 configured to drive accessory drive belts (not illustrated), for example, one portion arranged to drive the engine cooling fan 7 surrounding the clutch 15, and another portion arranged to drive other engine accessories such as the air compressor 1. The drive belt portions 21 in this example concentrically surround the damper 6 and the clutch 15 (the belt drive portion 21 surrounding the damper 6 is omitted in FIGS. 2B and 2C for clarity).

Within the clutch-pulley-damper unit 19 the clutch 15 includes two axially-engaging dog clutch elements 25, 26. As shown in the FIGS. 2A-2C cross-section views, the central core dog clutch element 25 is fixed for rotation with the damper 6, in this embodiment by bolts extending through axial bolt holes 28 from the FEMG gearbox side of the clutch-pulley-damper unit 19. The pulley 5 is rotationally supported on the central core element 25 by bearings 34.

An engine-side portion of the outer circumference of the central core dog clutch element 25 includes external splines 29 arranged to engage corresponding internal splines 30 at an inner circumference of the axially-movable dog clutch element 26. The external splines 29 and internal splines 30 are in constant engagement, such that the movable dog clutch element 26 rotates with the damper 6 while being movable axially along the damper rotation axis.

The movable dog clutch element 26 is also provided with axially forward-facing dogs 31 distributed circumferentially about the gearbox side of the element 26 (the side facing away from the engine). These dogs 31 are configured to engage spaces between corresponding dogs 32 on an engine-facing side of the pulley 5, as shown in FIG. 3C. The movable dog clutch element 26 is biased in the clutch-pulley-damper unit in an engaged position by a spring 33 located between the damper 6 and the movable dog clutch element 26, as shown in FIG. 2A. FIGS. 2B and 2C show the clutch disengaged position, in which the spring 33 is compressed as the movable dog clutch element 26 is axially displaced toward the damper 6.

In this embodiment a clutch throw-out rod 27 is located concentrically within the central core dog clutch element 25. The engine-side end of the throw-out rod 27 is arranged to apply an axial clutch disengagement force that overcomes the bias of spring 33 to axially displace the dog clutch element 26 toward the damper 6, thereby disengaging its forward-facing dogs 31 from the corresponding dogs 32 at the engine-facing side of the pulley 5. In this embodiment, the gearbox end of the clutch throw-out rod 27 is provided with a bushing 303 and a bearing 304 which enables the bushing to remain stationary while the throw-out rod 27 rotates.

The clutch throw-out rod 27 is axially displaced to disengage and engage the dog clutch 15 by a clutch actuator 22. In this embodiment the clutch actuator 22 is pneumatically-actuated, with compressed air entering fitting 305 over clutch actuator diaphragm 41 and thereby urging the center portion of the diaphragm 41 into contact with the throw-out rod bushing 303 to axially displace the clutch throw-out rod 27 toward the engine to disengage the clutch 15. When compressed air pressure is removed from the clutch actuator the diaphragm 41 retracts away from the engine, allowing the biasing spring 33 to axially displace the throw-out rod 27 and the dog clutch element 26 toward the pulley 5 to reengage the clutch dogs 31, 32 so that the pulley 5 co-rotates with the damper 6.

Figure 4:
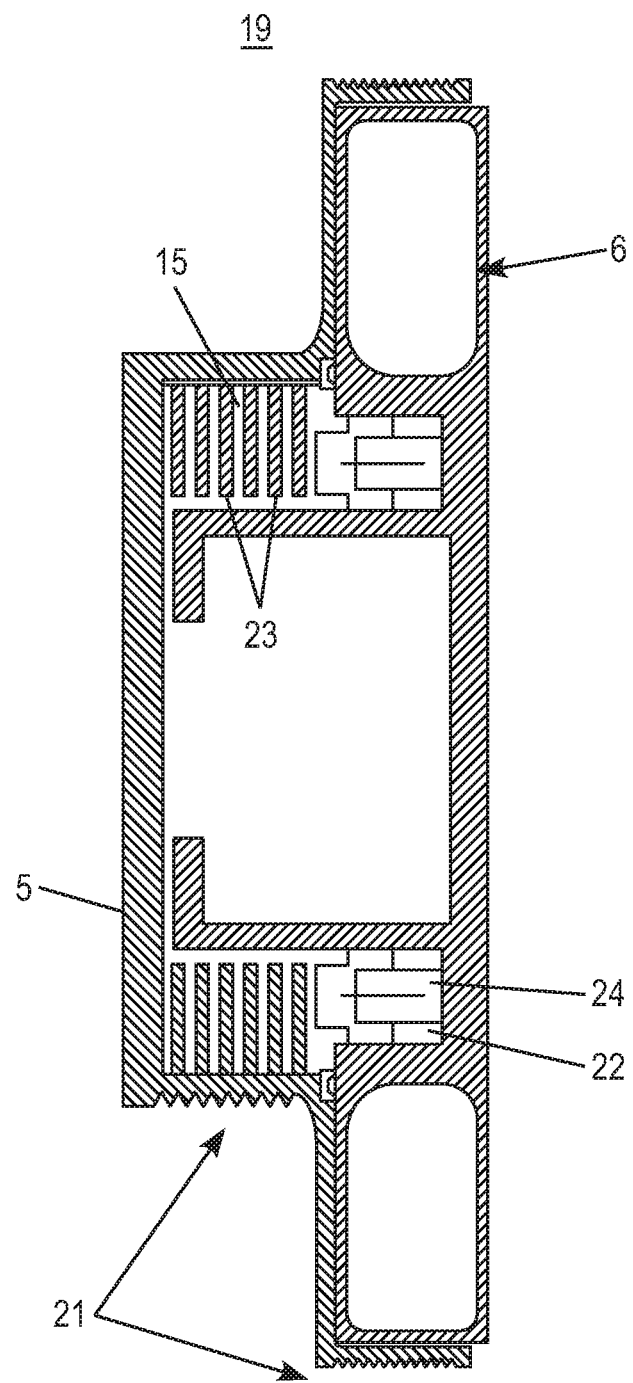
FIG. 4 is a cross-section view of another embodiment of a clutch-pulley-damper unit in accordance with the present invention.

FIG. 4 shows an alternative embodiment of the clutch-pulley-damper unit 19 in which the clutch 15 is a so-called wet multi-plate clutch. The wet multi-plate clutch includes friction and driven plates 23 splined in an alternating manner to an inner circumference of the pulley 5 and an outer circumference of a center portion of the damper 6. The clutch plates 23 are axially biased in compression by springs 24 between the damper 6 and the clutch actuator 22 (in this embodiment a pneumatically-actuated clutch actuation piston). The biasing of the stack of friction and driven plates together by the springs 24 engages the clutch 15 and causes pulley 5 and damper 6 to co-rotate with one another about the rotational axis of the engine crankshaft. When hydraulic pressure is applied to the clutch actuator 22 (on the FEMG gearbox side of the actuator), the springs 24 are compressed, allowing the alternating clutch friction and driven plates 23 to axially separate and thereby place the clutch 15 in a disengaged state, i.e., a state in which pulley 5 and damper 6 rotate independently.

In this embodiment the hydraulic pressure is supplied by oil that is also used to cool and lubricate the gearbox reduction gears and their associated bearings, and cool the wet-multi-plate clutch's friction and driven plates. The application of the hydraulic pressure is controlled by a solenoid valve (not illustrated) in response to commands from the FEMG electronic control unit 13. The clutch 15 is sized to ensure the large amount of torque that can pass between the engine crankshaft and the motor-generator will be accommodated by the clutch without slippage. To this end, due to the axially-overlapping arrangement of the clutch-pulley-damper unit 19, the unit's cooling design should be configured to ensure adequate cooling of the clutch plates during all operations. While in this embodiment cooling is provided by the oil being circulated in the gearbox, other forced or passive cooling arrangements may be provided as long as the expected clutch temperature is maintained below the clutch's operating temperature limit.

FEMG Gearbox Embodiment.

Figure 5:
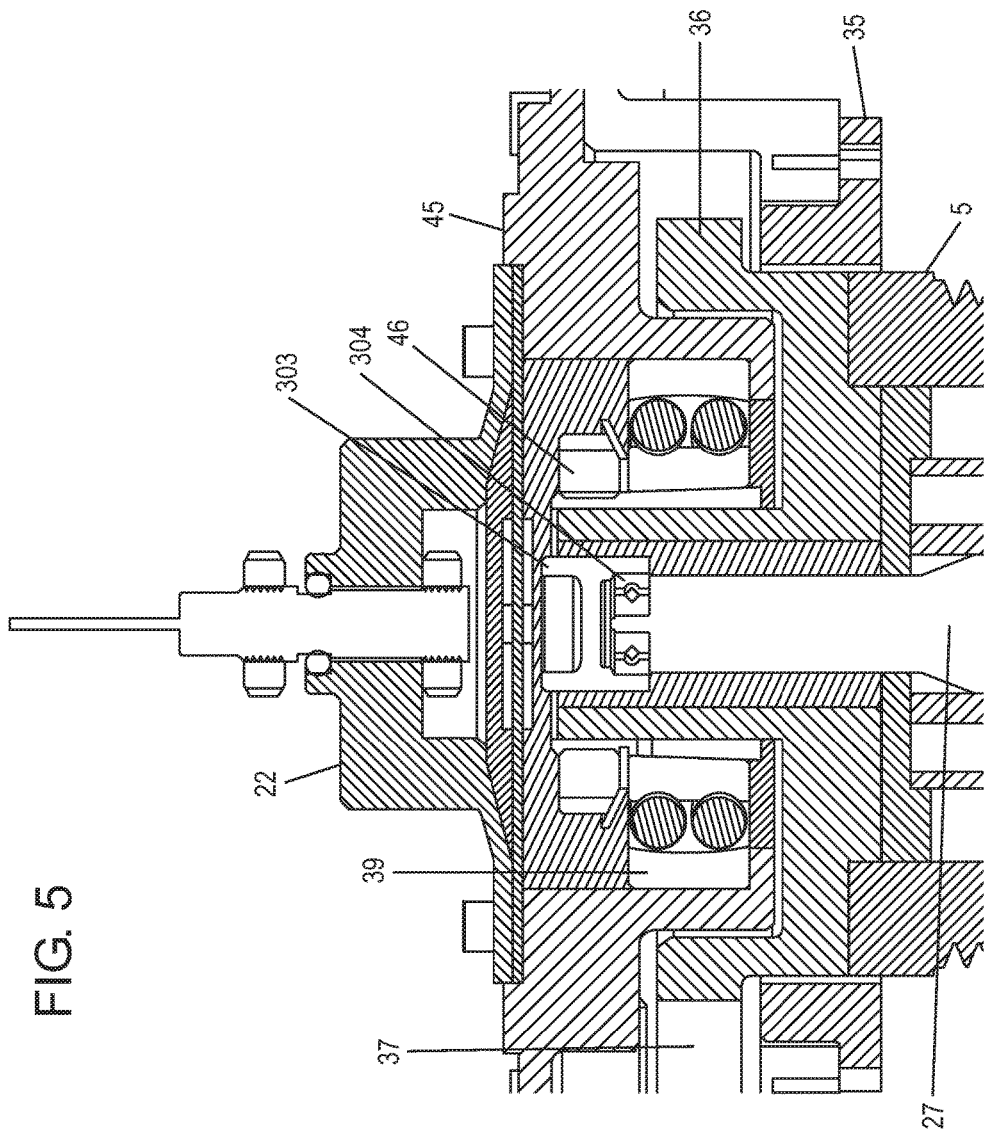
FIG. 5 is detailed cross-section view of a bearing arrangement at the clutch-pulley-damper unit end of an FEMG gearbox in accordance with an embodiment of the present invention.

FIG. 5 is a cross-section detailed view of a bearing arrangement at the crankshaft end of an embodiment of the FEMG gearbox 16. FIGS. 6A-6C and 7 show oblique views of this gearbox embodiment, in which a pair of gearbox clamshell-housing plates 35 enclose reduction gears 4, including a pulley-end gear 36, an idler gear 37 and a motor-generator-end gear 38.

In this application, the gears have a drive ratio of 2:1, although any gear ratio which fits within the available space of a particular engine application while providing a desired ratio of crankshaft speed-to-motor-generator speed may be provided. The gears 36-38 may be spur gears, helical gears or have other gear teeth (such as double-helix herringbone gear teeth) as desired to suit the requirements of the particular FEMG system application. Such requirements include gear noise limitations needed to meet government noise emission or driver comfort limitations that might be met with helical gears, mechanical strength limitations, such as tooth stress limits, or axial thrust limits that might be meet with double-helix herringbone gear teeth which generate equal and opposite axial thrust components.

The gearbox housing rotatably supports each of reduction gears 36-38 with bearings 39. The pulley-end gear 36 includes a plurality of through-holes 40 in a circumferential ring inside its gear teeth corresponding to holes on the front face of the pulley 5 of the clutch-pulley-damper. These holes receive fasteners configured to rotationally fix the pulley-end reduction gear 36 to the pulley 5 for co-rotation when driven by the crankshaft and/or by the motor-generator.

The center of the pulley-end reduction gear 36 has a center aperture through which a pneumatically-powered dog-clutch actuating diaphragm 41 is located on a front face of the gearbox housing. The pneumatic diaphragm 41 axially extends and retracts a piston (not illustrated) arranged to engage the cup 27 on dog clutch element 26 to control engagement and disengagement of the clutch 15 of the clutch-pulley-damper unit 19. The diaphragm 41 is shown in FIG. 5 as covered by the pneumatic clutch actuator 22, while FIGS. 7-8 show a simpler, slim diaphragm cover 42 with a compressed air connection on its face that is suitable for use in particularly space-constrained FEMG applications. Regardless of the diaphragm cover design, the diaphragm 41 is acted on by compressed air in the chamber above the front face of the diaphragm created when the clutch actuator 22 or the cover plate 42 are installed over the diaphragm aperture at the front face of the gearbox housing. The admission and release of compressed air may controlled by solenoid valves (not illustrated) in response to commands from the FEMG control module 13. While the clutch actuation mechanism in this embodiment is a pneumatically-actuated diaphragm, the present invention is not limited to a particular clutch actuator. For example, an electro-mechanical actuator may be used, such as an electrically-powered solenoid configured to extend an actuator rod to disengage the clutch components.

FIGS. 5 and 8 provide further detail of the mounting of this embodiment's pneumatic diaphragm actuator. In this embodiment an engine-side of a diaphragm mounting ring 45 is configured both to support the front-side bearing 39 associated with pulley-end reduction gear 36, and to receive on its front side the diaphragm 41. The bearing 39 may be retained and axially supported by any suitable device, such as a snap ring, or as shown in FIG. 5 by a nut 46. Once the mounting ring is secured in the illustrated large aperture on the front face of the gearbox housing clamshell plate 35, the pulley-end reduction gear 36 and its bearing 39, as well as the diaphragm 41, are axially fixed relative to the housing of gearbox 16.

At the motor-generator end of the gearbox 16, a shaft hole 43 aligned with the rotation axis of the motor-generator-end reduction gear 38 is provided in at least one of the housing clamshell plates 35, as shown in FIGS. 6A-6C and 7. The shaft hole 43 is sized to permit the rotor shaft of the motor-generator 3 (not illustrated in this figure) to enter the gearbox 16 and engage motor-generator-end gear 38 for co-rotation.

The FEMG gearbox may be cooled and lubricated by oil. The oil may be stored in a self-contained oil sump, or alternatively in a remote location, such as an external container or the engine's oil reservoir if the engine and gearbox are sharing the same oil source. The oil may be circulated throughout the gearbox by the motion of the gears or by a pump that distributes pressurized oil, such as an electric pump or a mechanical pump driven by the rotation of the reduction gears, and in addition to lubricating and cooling the gears may cool the clutch plates of a wet-clutch. Further, the gearbox may be provided with an accumulator that ensures a reserve volume of pressurized oil remains available to, for example, actuate the clutch of the clutch-pulley-damper unit when pump-generated pressure is not immediately available. In such an embodiment, a solenoid valve controlled by the FEMG control module could be used to release the pressurized oil to operate the actuator of the hydraulic clutch.

Figure 9:
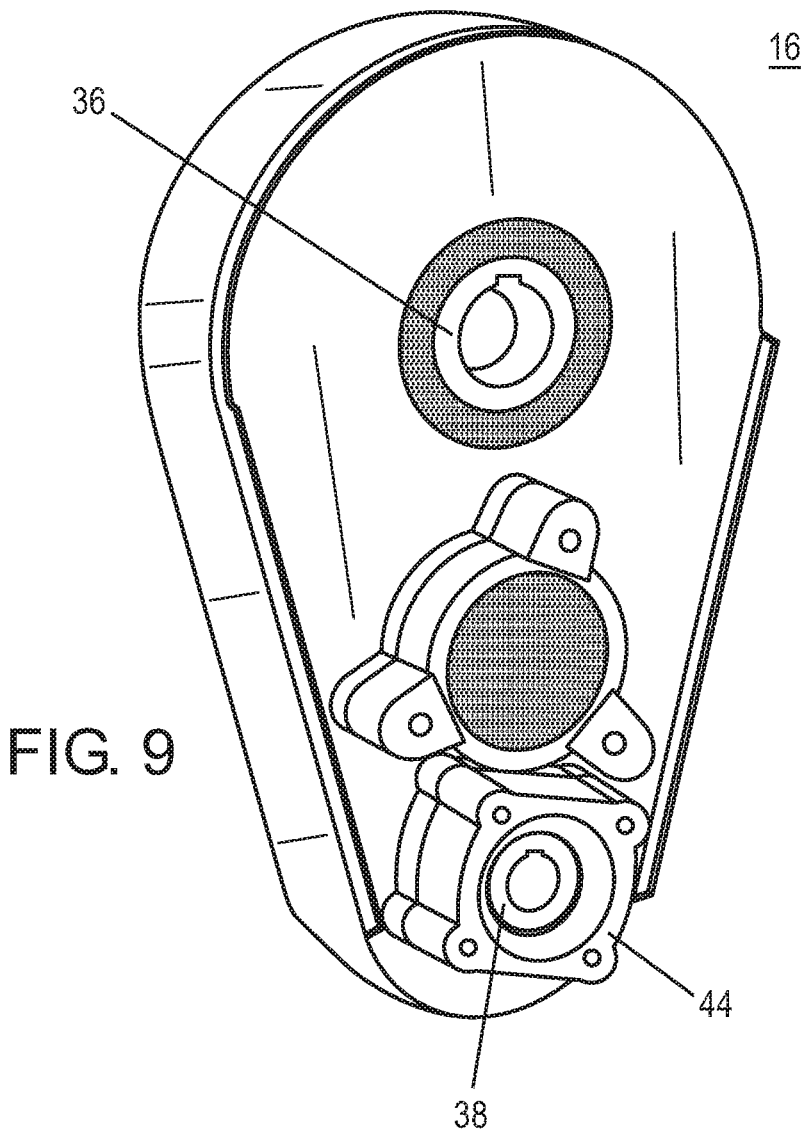
FIG. 9 is an oblique view of another embodiment of an FEMG gearbox in accordance with the present invention.

FIG. 9 shows an example of a commercially-available gearbox showing an alternative motor-generator mounting arrangement in which a motor-generator mounting flange 44 provides the ability to mount the motor-generator to the gearbox with fasteners without the need for fastener penetrations into the gearbox housing.

In the foregoing embodiments the end reduction gears 36, 38 are in constant-mesh engagement via idler gear 37. However, the present invention is not limited to this type of single reduction parallel shaft gearbox. Rather, other torque power transmission arrangements are possible, such as chain or belt drives, or drives with components such as torque transfer shafts aligned at an angle to the switchable coupling's rotation axis (for example, a worm-gear drive with a transfer shaft rotating on an axis perpendicular to the switchable coupling's rotation axis), as long as they can withstand the torque to be transferred without needing to be so large that the axial depth of the gearbox becomes unacceptably large. Such alternative gearbox arrangements may also be used in embodiments in which the motor-generator 3 is not aligned parallel to the rotation axis of the switchable coupling, but instead is positioned on the gearbox 16 and aligned as necessary to facilitate installation in regions of limited space (for example, motor-generator being attached at the end of the gearbox with its rotation axis aligned with a gearbox torque transfer shaft that is not parallel to the switchable coupling's rotation axis).

Nor is the present invention limited to fixed reduction ratio constant-mesh arrangements, as other arrangements may be used, such as variable diameter pulleys (similar to those used in some vehicle constant velocity transmissions) or internally-disengageable gears, as long as the axial depth of the gearbox does not preclude the location of the FEMG system components in the region in front of the engine.

In a preferred embodiment, the reduction ratio of the FEMG gearbox reduction gears 36-38 is 2:1, a ratio selected to better match crankshaft rotation speeds to an efficient operating speed range of the motor-generator 3.

FEMG System Hardware Mounting Embodiments.

Figure 10:
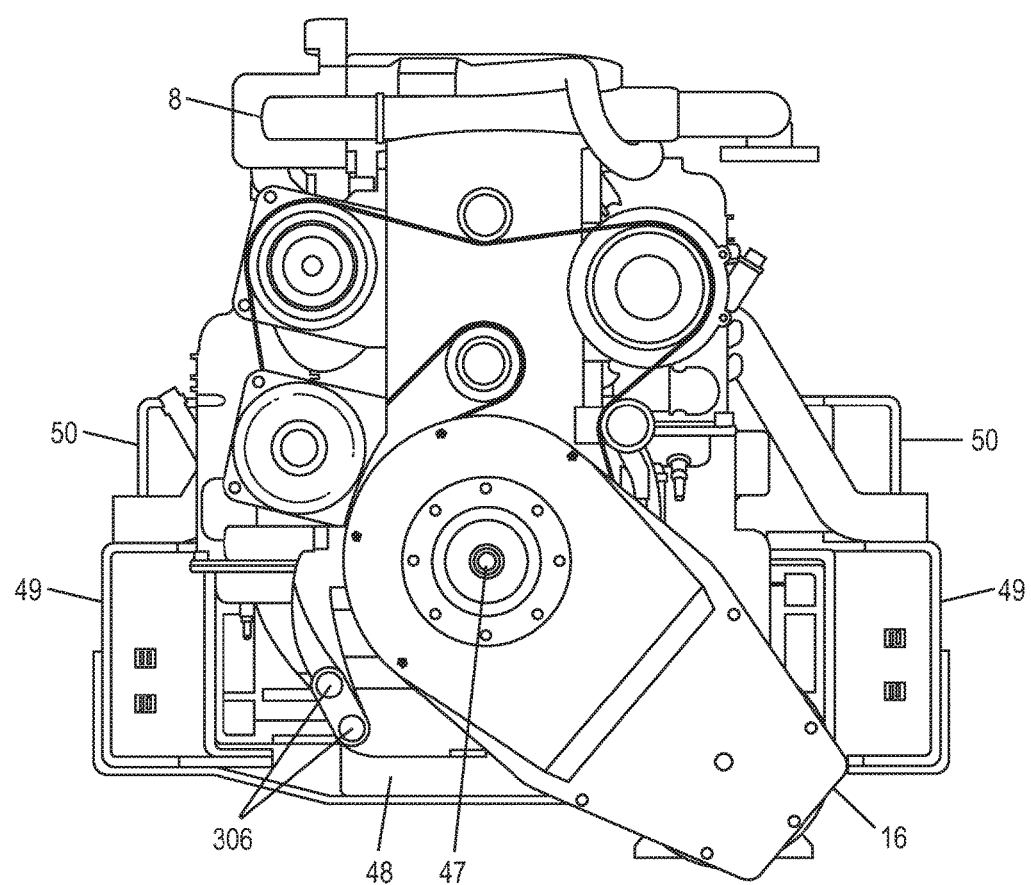
FIG. 10 is a schematic illustration of an FEMG gearbox mounting arrangement in accordance with an embodiment of the present invention.

As noted above, the FEMG assembly is preferably positioned such that the motor-generator 3 is located in a region of the engine compartment that is offset below and to a lateral side of the vehicle chassis rails supporting the engine. FIG. 10 illustrates such an arrangement, viewed from the front of the vehicle toward the rear. This figure shows the relationships in this embodiment between the motor-generator 3 and engine 8's crankshaft 47 (located axially behind the gearbox 16), oil pan 48, longitudinal chassis rails 49 and transverse engine mount 50.

In the above FEMG arrangements the crankshaft 47, clutch-pulley-damper unit 19 and engine-end reduction gear 36 are located on the same rotation axis. In order to ensure this relationship is maintained, the FEMG gearbox should be located in front of the engine in a manner that ensures there is no relative movement between the engine and the gearbox, either transverse to the rotation axis of the crankshaft or around the crankshaft axis.

While it would be possible to mount the FEMG gearbox in a manner that does not directly connect the gearbox to the engine (for example, by suspending the FEMG gearbox from a bracket connected to the chassis rails holding the engine), it is preferable to directly couple the gearbox to either an adjacent vehicle frame member or to the engine block. Examples of FEMG gearbox-to-engine mounting bracket and corresponding arrangement of mounting holes in the gearbox is shown in FIGS. 10-14.

Figure 11:
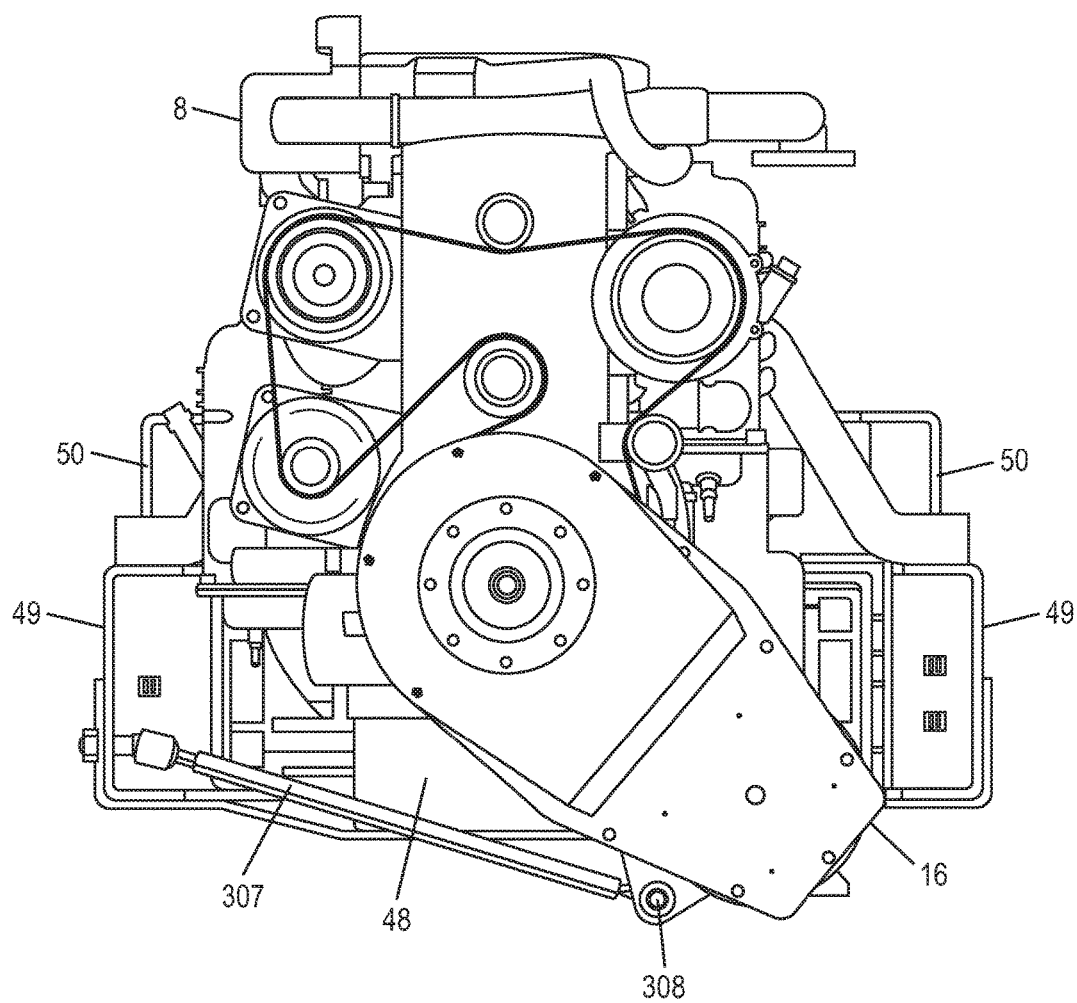
FIG. 11 is a schematic illustration of an FEMG gearbox mounting arrangement in accordance with an embodiment of the present invention.

In FIG. 10, the FEMG gearbox 16 is secured against rotation or transverse motion relative to the engine 8 by fasteners 306 to directly to the engine 8. FIG. 11 shows an alternative approach in which a torque arm 307 (aka tie-rod) is attached at one end to an anchor point 308 of the FEMG gearbox 16, and at the opposite end to the adjacent frame rail 49, thereby providing non-rotation support of the gearbox 16.

Figure 12:
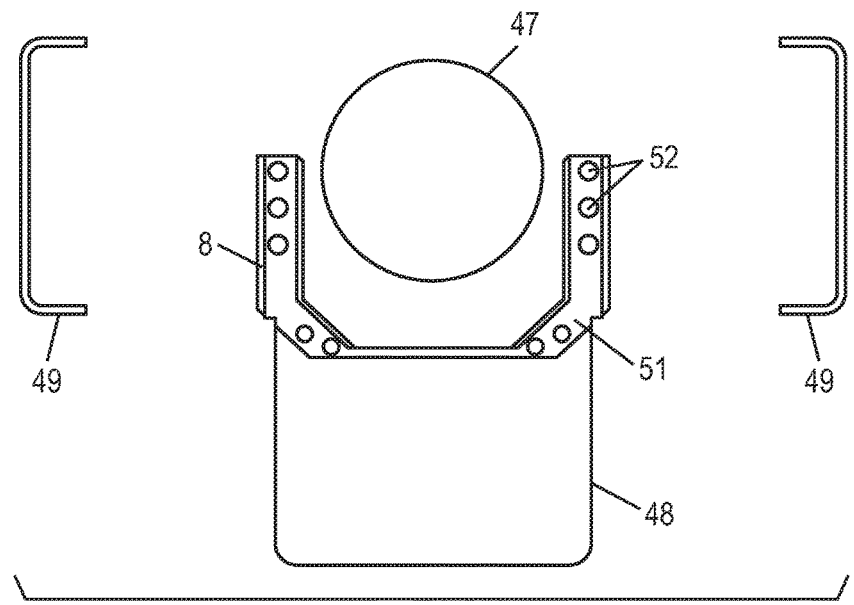
FIG. 12 is a schematic illustration of relationships between an engine and an FEMG gearbox mounting bracket in accordance with an embodiment of the present invention.

A further alternative FEMG mounting approach is shown in FIG. 12. In this embodiment a mounting bracket 51 is provided with bolt holes 52 arranged around the bracket to align with corresponding holes in the engine block 8 which receive fasteners to provide an engine-centric fixed support for the FEMG gearbox. In this example, the flat bottom of the mounting bracket 51 is arranged to be positioned on top of elastomeric engine mounts, as are often used in commercial vehicle engine installations. The engine-side portion of the mounting bracket 51 is a portion of a bracket that must extend under and/or around the clutch-pulley damper unit to reach an FEMG gearbox mounting bracket portion to which the gearbox may be coupled, while ensuring there is sufficient clearance available within the bracket to allow the clutch-pulley-damper unit to rotate therein.

Figure 13:
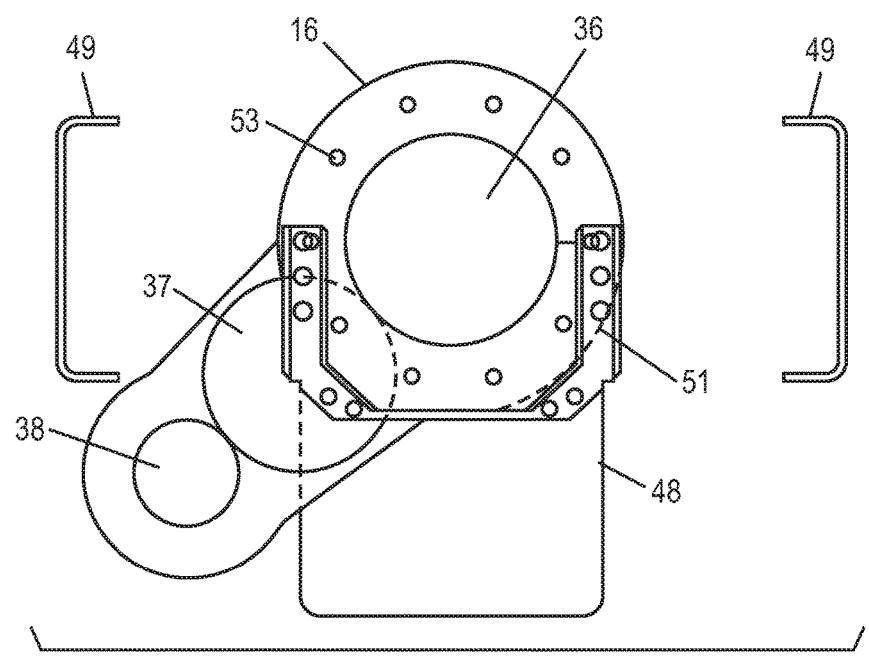
FIG. 13 is a schematic illustration of relationships between an engine, FEMG gearbox and an FEMG gearbox mounting bracket in accordance with an embodiment of the present invention.
Figure 14:
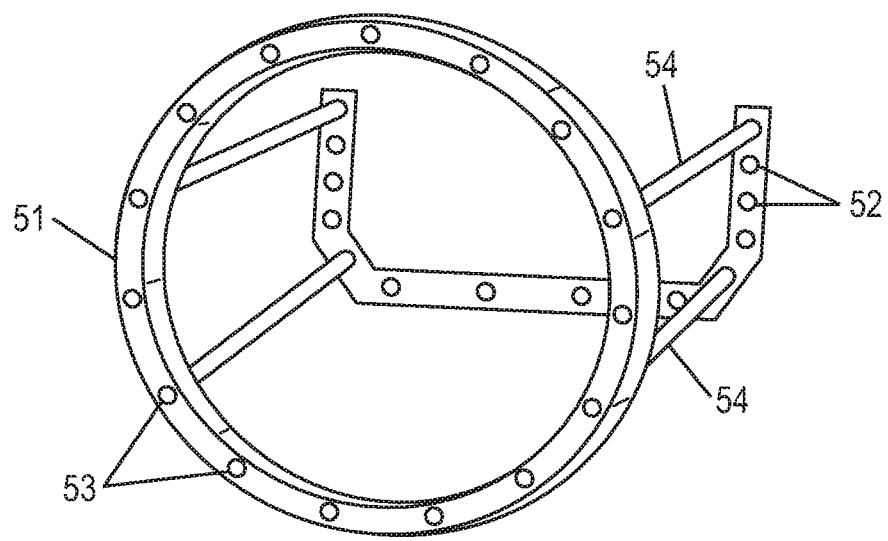
FIG. 14 is an oblique view of an FEMG gearbox mounting bracket as in FIGS. 12-13.

FIGS. 13 and 14 schematically illustrate the location of an FEMG gearbox 16 on a such a bracket and the corresponding distribution of fastener holes around the FEMG reduction gear 36 and the FEMG-side of the mounting bracket 51. FIGS. 13 and 14 both show circumferential arrangement of the corresponding fastener holes 53 on the FEMG gearbox 16 and on the FEMG gearbox-side of the FEMG mounting bracket 51. In FIG. 14, the engine-side portion and the FEMG gearbox-side portion of the mounting bracket 51 are linked by arms 54 extending parallel to the engine crankshaft axis in spaces clear of the rotating clutch-pulley-damper unit 19 (not illustrated in these figures for clarity). The schematically-illustrated arms 54 are intended to convey the mounting bracket arrangement concept, with the understanding that the connection between the engine-side and FEMG gearbox-side of the mounting bracket may be any configuration which links the front and rear sides of the bracket in a manner that secures the FEMG gearbox against motion relative to the engine crankshaft. For example, the arms 54 may be rods welded or bolted to the front and/or rear sides of the bracket, or the arms may be portions of an integrally-cast part that extends around the clutch-pulley-damper unit 19. Preferably, the mounting bracket 51 is designed such that its FEMG gearbox-side portion has a fastener hole pattern that facilitates rotation of the FEMG gearbox relative to the bracket ("clocking") as needed to index the gearbox at various angles to adapt the FEMG components to various engine configurations, for example in retrofitting an FEMG system to a variety of existing vehicle or stationary engine applications.

FEMG System Motor-Generator and Electronic Controls Embodiments.

Figure 15:
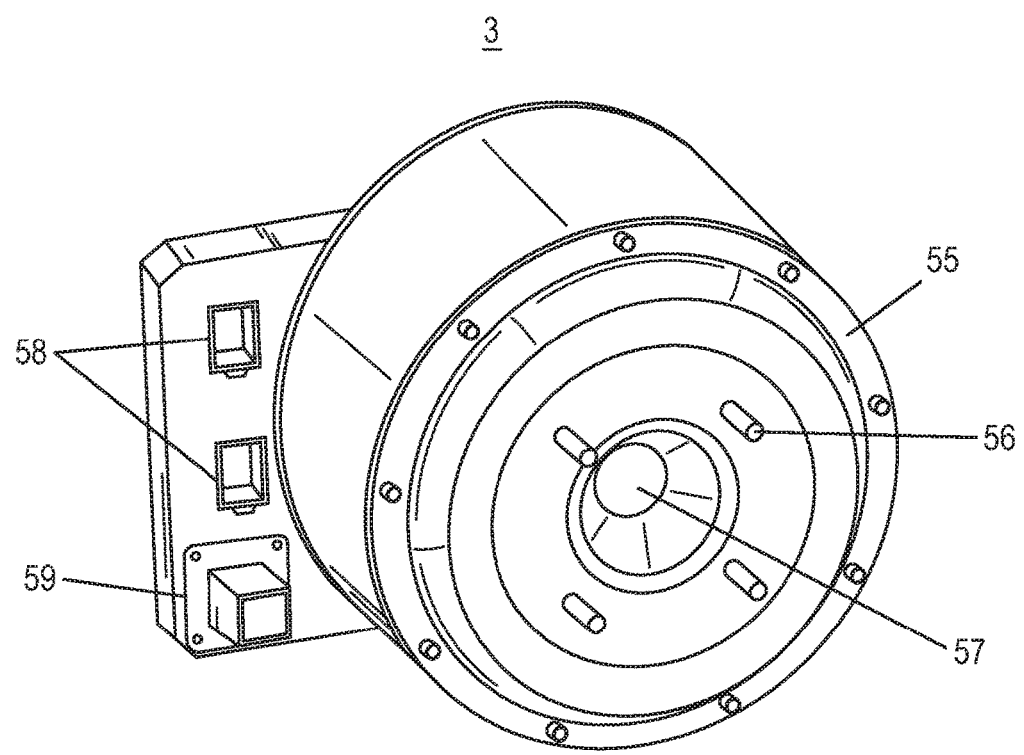
FIG. 15 is an oblique view of a motor-generator in accordance with an embodiment of the present invention.

An example of a motor-generator which is suitable for attachment to the motor-generator end of an FEMG gearbox is shown in FIG. 15. In this embodiment an FEMG gearbox-side 55 of the motor-generator 3 includes a plurality of studs 56 configured to engage corresponding holes in a mounting flange on the gearbox, such as the mounting flange 44 shown on the exemplary gearbox 16 in FIG. 9. In order to transfer torque between the rotor of the motor-generator 3 and the motor-generator-end reduction gear 38, a rotor bore 57 receives a shaft (not illustrated) extending into a corresponding bore in reduction gear 38. The shaft between the reduction gear 38 and the rotor of the motor-generator 3 may be a separate component, or may be integrally formed with either the rotor or the reduction gear. The shaft also may pressed into one or both of the rotor and the reduction gear, or may be readily separable by use of a displaceable connection, such as axial splines or a threaded connection.

The motor-generator 3 in this embodiment also houses several of the electronic components of the FEMG system, discussed further below, as well as low-voltage connections 58 and high voltage connection 59 which serve as the electrical interfaces between the motor-generator 3 and the control and energy storage components of the FEMG system.

Figure 16:
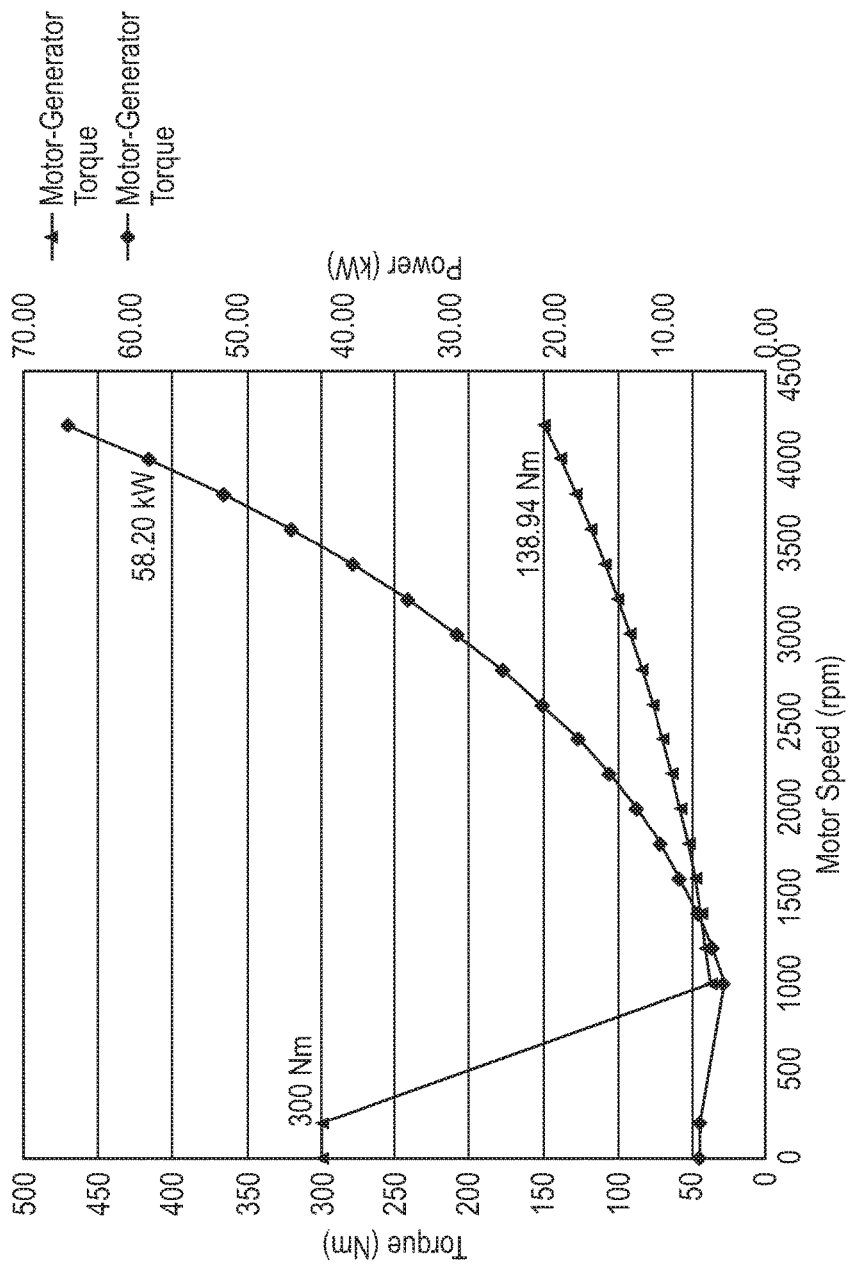
FIG. 16 is a graph of power and torque generated by an example motor-generator in accordance with an embodiment of the present invention.

Preferably the motor-generator 3 is sized to provide at least engine start, hybrid electrical power generation and engine accessory drive capabilities. In one embodiment, a motor generator having a size on the order of 220 mm in diameter and 180 mm in longitudinal depth would, as shown in the graph of FIG. 16, provide approximately 300 Nm of torque at zero rpm for engine starting, and up to approximately 100 Nm near 4000 rpm for operating engine accessories and/or providing supplemental torque to the engine crankshaft to assist in propelling the vehicle. With a 2:1 reduction ratio of the FEMG gearbox, this motor-generator speed range is well-matched to a typical commercial vehicle engine's speed range of zero to approximately 2000 rpm.

Figure 17:
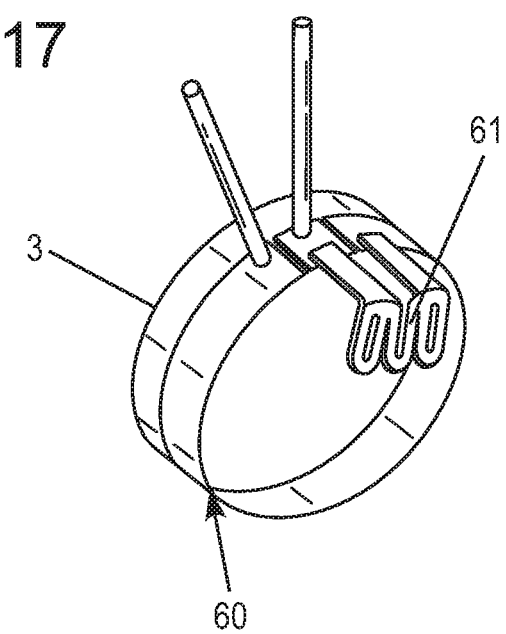
FIG. 17 is an oblique phantom view of a cooling arrangement of a motor-generator in accordance with an embodiment of the present invention.

The FEMG motor-generator design is constrained by thermal, mechanical and electrical considerations. For example, while temperature rise of the motor generator during starting is relatively limited by the relatively short duration of the starting operation, when the motor-generator alone is driving one or more demanding engine accessories such as the engine cooling fan, the required torque output from the motor can be in the range of 50 Nm to 100 Nm. In the absence of adequate motor-generator cooling the temperature rise during sustained high-torque output conditions could be significant. For example, at current density J in the motor-generator windings of 15 A/mm$^2$, an adiabatic temperature rise could be on the order of 30° C. For this reason, it is preferred that the FEMG motor-generator be provided with forced cooling such as the example shown in FIG. 17 in which engine coolant or cooling oil (such as oil from the gearbox oil circuit) circulates through a cooling fluid passage 60 in the motor-generator. It is particularly preferable that a portion 61 of the cooling passage 60 is also routed to provide cooling to the FEMG system electronic components mounted on the motor-generator 3.

The type of electric machine selected may also introduce limitations or provide specific advantages. For example, in an induction-type electric motor, the breakdown torque may be increased 10-20% using an inverter (with a corresponding increase in flux), and the breakdown torque is typically high, e.g., 2-3 times the machine's rating. On the other hand, if a permanent magnet-type machine is selected, excessive stator excitement current must be avoided to minimize the potential for demagnetization of the permanent magnets. While physical arrangement and operating temperature can influence the point at which demagnetization is problematic, typically current values greater than two times the rated current must be experienced before significant demagnification is noted.

With such factors in mind, a preferred embodiment of the motor-generator 3 would have the capability of operating at 150% of its nominal operating range. For example, the motor-generator may have a rated speed of 4000 rpm, with a 6000 rpm maximum speed rating (corresponding to a maximum engine speed of 3000 rpm) and a capacity on the order of 60 KW at 4000 rpm. Such a motor-generator, operating at a nominal voltage of 400 V, would be expected to provide a continuous torque output of approximately 100 Nm, an engine cranking torque of 150 Nm for a short duration such as 20 seconds, and a peak starting torque at zero rpm of 300 Nm.

The FEMG motor-generator 3, as well as the other components of the FEMG system, in this embodiment are controlled by the central FEMG control module 13, an electronic controller ("ECU"). With respect to the motor-generator, the FEMG control module: (i) controls the operating mode of the motor-generator, including a torque output mode in which the motor-generator outputs torque to be transferred to the engine accessories and/or the engine crankshaft via the clutch-pulley-damper unit, a generating mode in which the motor-generator generates electrical energy for storage, an idle mode in which the motor-generator generates neither torque or electrical energy, and a shutdown mode in which the speed of the motor-generator is set to zero (a mode made possible when there is no engine accessory operating demand and the clutch of the clutch-pulley-damper unit is disengaged); and (ii) controls the engagement stated of the clutch-pulley-damper unit (via components such as solenoid valves and/or relays as required by the type of clutch actuator being employed).

The FEMG control module 13 controls the motor-generator 3 and the clutch-pulley-damper unit 19 based on a variety of sensor inputs and predetermined operating criteria, as discussed further below, such as the state of charge of the energy store 11, the temperature level of the high voltage battery pack within the energy store, and the present or anticipated torque demand on the motor-generator 3 (for example, the torque required to achieve desired engine accessory rotation speeds to obtain desired levels of engine accessory operating efficiency). The FEMG control module 13 also monitors motor-generator- and engine crankshaft-related speed signals to minimize the potential for damaging the clutch components by ensuring the crankshaft-side and pulley-side portions of the clutch are speed-matched before signaling the clutch actuator to engage the clutch.

The FEMG control module 13 communicates using digital and/or analog signals with other vehicle electronic modules, both to obtain data used in its motor-generator and clutch-pulley-damper control algorithms, and to cooperate with other vehicle controllers to determine the optimum combination of overall system operations. In one embodiment, for example, the FEMG control module 13 is configured to receive from a brake controller a signal to operate the motor-generator in generating mode to provide regenerative braking in lieu of applying the vehicle's mechanical brakes in response to a relatively low braking demand from the driver. The FEMG control module 13 is programmed to, upon receipt of such a signal, evaluate the current vehicle operating state and provide the brake controller with a signal indicating that regenerative braking is being initiated, or alternatively that electrical energy generation is not desirable and the brake controller should command actuation of the vehicle's mechanical brakes or retarder.

Figure 18:
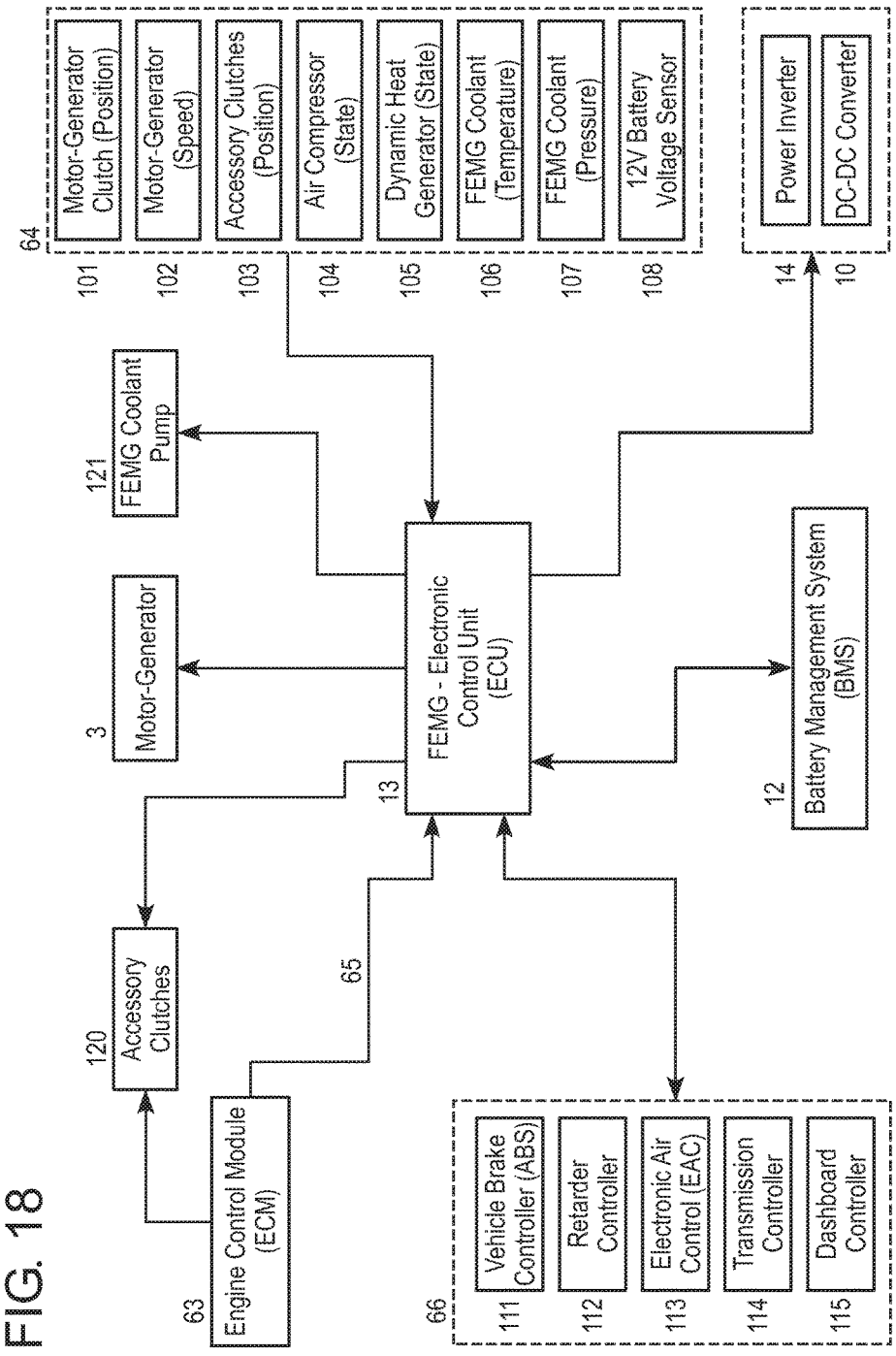
FIG. 18 is a block diagram of FEMG system control and signal exchange arrangements in accordance with an embodiment of the present invention.

FIG. 18 provides an example of the integration of electronic controls in an FEMG system. In this embodiment the FEMG control module 13 receives and outputs signals, communicating bi-directionally over the vehicle's CAN bus with sensors, actuators and other vehicle controllers. In this example the FEMG control module 13 communicates with the battery management system 12 which monitors the state of charge of the energy store 11 and other related energy management parameters, with an engine control unit 63 which monitors engine sensors and controls operation of the internal combustion engine, and with the FEMG system's electrical energy management components, including the power inverter 14 which handles AC/DC conversion between the AC motor-generator 3 and the DC portion of the electrical bus between the vehicle's DC energy storage and electrical consumers (not illustrated in this figure). The FEMG control module 13 further communicates with the vehicle's DC-DC converter 10 which manages the distribution of electrical energy at voltages suitable for the consuming device, for example, conversion of 400 V power from the energy store 11 to 12 V required by the vehicle's 12 V battery 9 and the vehicle's various 12 V equipment, such as lighting, radio, power seats, etc.

FIG. 18 also illustrates the communication of data as inputs into the FEMG system control algorithms from sensors 64 associated with the motor-generator 3, the clutch-pulley-damper unit 19's clutch, the various engine accessories 1 and the 12 V battery 9 (for example, a motor-generator clutch position sensor 101, a motor-generator speed sensor 102, engine accessory clutch positions 103, air compressor state sensors 104, dynamic heat generator state sensors 105, an FEMG coolant temperature sensor 106, an FEMG coolant pressure sensor 107, and a 12 V battery voltage sensor 108).

Many of the signals the FEMG control module 13 receives and exchanges are transmitted over the vehicle's SAE J1939 standard-compliant communications and diagnostic bus 65 to/from other vehicle equipment 66 (for example, brake controller 111, retarder controller 112, electronic air control (EAC) controller 113, transmission controller 114, and dashboard controller 115). Examples of the types of sensor and operational signals and variables exchanged, and their respective sources, are provided in Table 1.

TABLE 1

| Signals/Variables to monitor | Source of the signal |
|---|---|
| High voltage battery: state of charge (SOC) | Coming from the Battery Management System BMS |
| High voltage battery: temperature | Coming from the BMS |
| Vehicle speed | J1939 message: Wheel-Based Vehicle Speed |
| Engine torque | J1939 message: Driver's Demand Engine - Percent Torque |
| Engine speed | J1939 message: Engine Speed |
| Brake application status | J1939 message: Brake Application Pressure High Range. Each axle |
| Cooling fan clutch | J1939 message: Requested Percent Fan Speed |
| A/C compressor clutch | J1939 message: Cab A/C Refrigerant Compressor Outlet Pressure |
| Air compressor clutch | J1939 message: Intelligent Air Governor (IAG) |
| Neutral Gear | J1939 message: Transmission Current Gear |
| Transmission Clutch | J1939 message: Transmission Clutch Actuator |
| Door open | J1939 message: Open Status of Door 1/Open Status of Door 2 |
| Temperature of the cabin | J1939 message: Cab Interior Temperature |
| Air brake system pressure | J1939 message: Brake Primary Pressure |
| FEMG coolant temperature | Temperature sensor mounted inside the gearbox. |
| Engine oil temperature | J1939 message: Engine Oil Temperature 2 |
| Engine coolant temperature | J1939: Engine Coolant Temperature |
| Intake manifold temperature | J1939 message: Engine Intake Manifold 1 Air Temperature (High Resolution) |
| MG rotating speed | Encoder mounted on the Gearbox or the MG |

Outputs from the FEMG control module 13 include commands to control the generation of electrical energy or torque output from the motor-generator 3, commands for engaging and disengaging of the clutch of the clutch-pulley-damper unit 19, commands for engaging and disengaging the clutches 120 of individual engine accessories 1 (discussed further below), and commands for operation of an FEMG coolant pump 121.

FEMG Control Module System Control of FEMG System Components.

In addition to controlling the motor-generator and its clutched connection to the engine crankshaft, in this embodiment the FEMG control module has the ability to control the engagement state of any or all of the individual clutches connecting engine accessories to the accessory drive belt driven by pulley 5, thereby permitting the FEMG control module to selectively connect and disconnect different engine accessories (such as the air conditioner compressor 2 or the vehicle's compressed air compressor 1) to the accessory drive according to the vehicle's operating state. For example, when operating conditions permit, the FEMG control module's algorithms may prioritize electrical energy generation and determine that some of the engine accessories need not operate. Alternatively, the FEMG control module is programmed to operate an engine accessory in response to a priority situation which requires operation of the accessory, even if doing so would not result in high overall vehicle operating efficiency. An example of the latter would be receipt of a compressed air storage tank low pressure signal, necessitating engagement of the air compressor's clutch and operation of the pulley 5 at a high enough speed to ensure sufficient compressed air is stored to meet the vehicle's safety needs (e.g., sufficient compressed air for pneumatic brake operation). Another example would be commanding the motor-generator and the engine cooling fan clutch to operate the engine cooling fan at a speed high enough to ensure adequate engine cooling to prevent engine damage.

Preferably, the FEMG control module is provided with engine accessory operating performance data, for example in the form of stored look-up tables. With engine accessory operating efficiency information, the ability to variably control the operating speed of the motor-generator to virtually any desired speed when the clutch-pulley-damper unit clutch is disengaged, and knowledge of the vehicle's operating state received from sensors and the vehicle's communications network, the FEMG control module 13 is programmed to determine and command a preferred motor-generator speed and a combination of engine accessory clutch engagement states that results in a high level of overall vehicle system efficiency for the given operating conditions.

While overall system efficiency may be improved by the presence of a large number of individual engine accessory clutches (including on/off, multi-stage or variable-slip clutches), even in the absence of individual accessory clutches the FEMG control module 13 may use engine accessory performance information to determine a preferred motor-generator operating speed that causes the pulley 5 to rotate at a speed that satisfies the current system priority, whether that priority is enhancing system efficiency, ensuring the heaviest engine accessory demand is met, or another priority such as starting to charge the energy store 11 at a predetermined time sufficiently before an anticipated event to ensure sufficient electrical energy is stored before the vehicle is stopped. For example, the FEMG control module in this embodiment is programmed to determine the current state of charge of the energy storage 11 and the amount of time available before an anticipated driver rest period, and initiate motor-generator charging of the energy store 11 at a rate that will result in enough energy being present at engine-shut-off to support vehicle system operation (such as sleeper compartment air conditioning) over the anticipated duration of the reset period (e.g., an 8-hour overnight rest period).

A similar rationale applies regardless of the number individual engine accessory clutches present, i.e., the FEMG control module may be programmed to operate the motor-generator 3 and the clutch-pulley-damper unit clutch 15 in a manner that meets the priorities established in the algorithms, regardless of whether a few, many or no individual engine accessory clutches are present. Similarly, a variety of prioritization schemes may be programmed into the FEMG control module to suit the particular vehicle application. For example, in a preferred embodiment, an energy efficiency priority algorithm may go beyond a simple analysis of what configuration of pulley speed and individual engine accessory clutch engagement provides an optimum operating efficiency for the highest priority engine accessory, but may also determine whether the operation of a combination of engine accessories at a compromise pulley speed will result in a greater overall system efficiency while still meeting the priority accessory's demand, i.e., operating each of the individual engine accessories at speeds that are offset from their respective maximum efficiency operating points if there is a pulley speed which maximizes overall vehicle efficiency while still meeting the vehicle system demands.

FEMG Electric Energy Generation, Storage and Voltage Conversion Embodiments.

Figure 19:
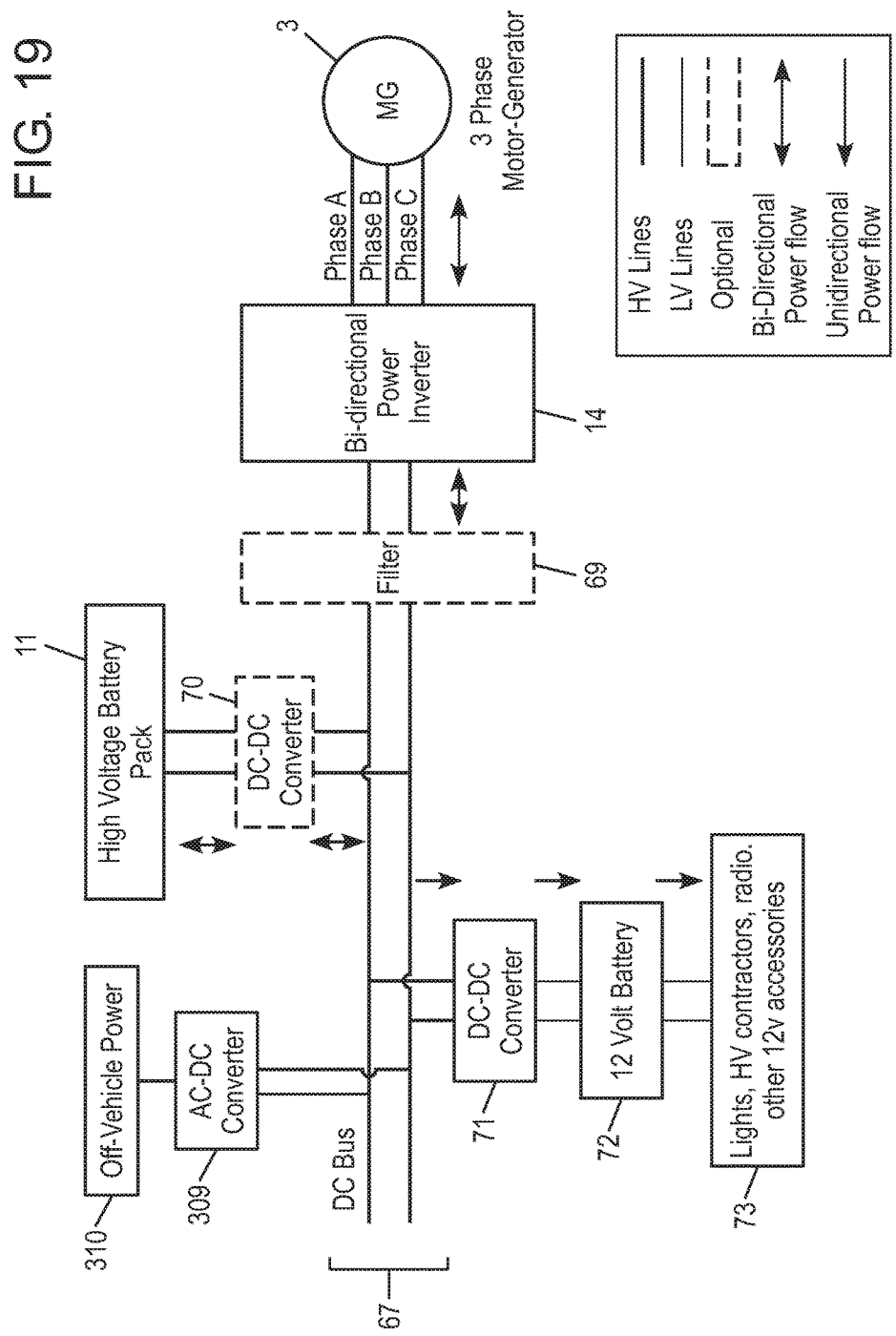
FIG. 19 is a schematic illustration of AC and DC portions of the electrical network of an FEMG system in accordance with an embodiment of the present invention.

The relationship between the power electronics and current distribution in the present embodiment is shown in greater detail in FIG. 19. The three phases of the alternating current motor-generator 3 are connected to the AD/DC power inverter 14 via high voltage connections. Electrical energy generated by the motor-generator 3 is converted to high voltage DC current to be distributed on a DC bus network 67. Conversely, DC current may be supplied to the bi-directional power inverter 14 for conversion to AC current to drive the motor-generator 3 as a torque-generating electric motor.

Figure 20:
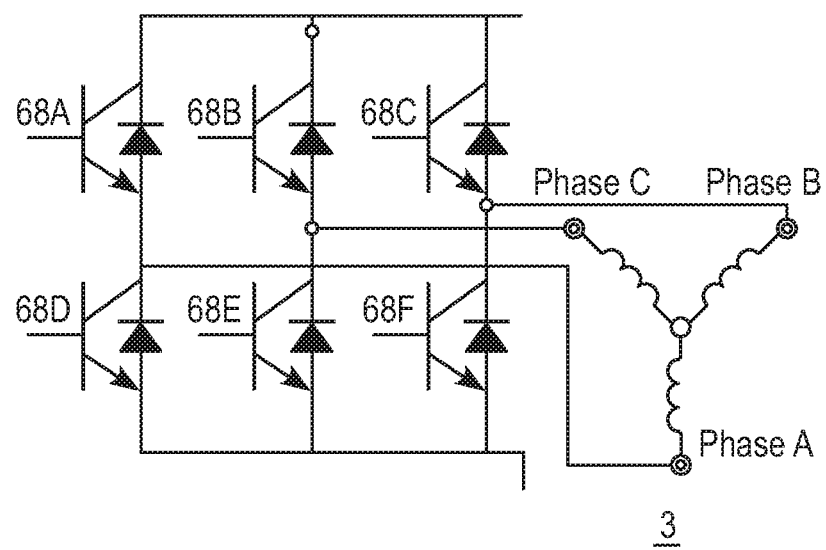
FIG. 20 is a schematic illustration of an FEMG system-controlled power transistor arrangement for AC and DC conversion in accordance with an embodiment of the present invention.

A known embodiment of a bi-directional AC/DC power inverter such as inverter 14 as shown in FIG. 20. This arrangement includes a six IGBT power transistor configuration, with switching signals provided from a controller (such as from the FEMG control module 13) to control lines 68A-68F based on a vector control strategy. Preferably, the control module for the power inverter 14 is located no more than 15 cm away from the power inverter's IGBT board. If desired to minimize electrical noise on the DC bus 67, a filter 69 may be inserted between the power inverter and the rest of the DC bus.

FIG. 19 also shows two primary DC bus connections, the high voltage lines between the power inverter 14 and the energy store 11. The bi-directional arrows in this figure indicate that DC current may pass from the power inverter 14 to the energy store 11 to increase its state of charge, or may flow from the energy store to the DC bus 67 for distribution to the power inverter 14 to drive the motor-generator 3 or to other DC voltage consumers connected to the DC bus. In this embodiment, a DC/DC voltage converter 70 is provided between the DC bus and the energy store 11 to adapt the DC voltage on the DC bus generated by the motor-generator 3 to the preferred operating voltage of the energy store. FIG. 19 also shows that the DC bus 67 also may be connected to an appropriate voltage converter, such as AC-DC voltage converter 309 that converts electric energy from an off-vehicle power source 310, such as a stationary charging station, to the voltage on DC bus 67 to permit charging of the energy store independent from the motor-generator 3 when the vehicle is parked.

Figure 21:
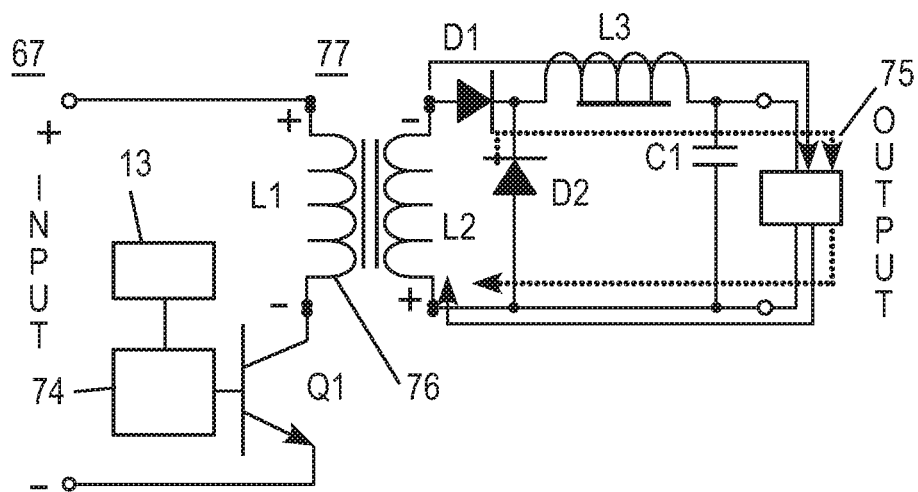
FIG. 21 is a schematic illustration of an FEMG system-controlled forward DC voltage converter arrangement in accordance with an embodiment of the present invention.

In addition to the bi-directional flow of DC current to and from the energy store 11, the DC bus 67 supplies high voltage DC current to vehicle electrical consumers, such as vehicle lights, radios and other typically 12 V-powered devices, as well as to 120 V AC current devices such as a driver sleeper compartment air conditioner and/or a refrigerator or cooking surface. In both cases an appropriate voltage converter is provided to convert the high voltage on the DC bus 67 to the appropriate DC or AC current at the appropriate voltage. In the embodiment shown in FIG. 19, a DC/DC converter 71 converts DC current at a nominal voltage on the order of 400 V to 12 V DC current to charge one or more conventional 12 V batteries 72. The vehicle's usual 12 V loads 73 thus are provided with the required amount of 12 V power as needed, without the need to equip the engine with a separate engine-driven 12 V alternator, further saving weight and cost while increasing overall vehicle efficiency. FIG. 21 illustrates a known embodiment of a forward DC/DC converter such as DC/DC converter 71, in which the FEMG control module 13 controls the conversion of high DC voltage from the DC bus 67 to the 12 V output 75 of the convertor by providing FEMG control signals to a transistor drive circuit 74 to manage the flow of current through the primary winding 76 of the DC/DC converter's transformer 77.

Figures 22, 23:
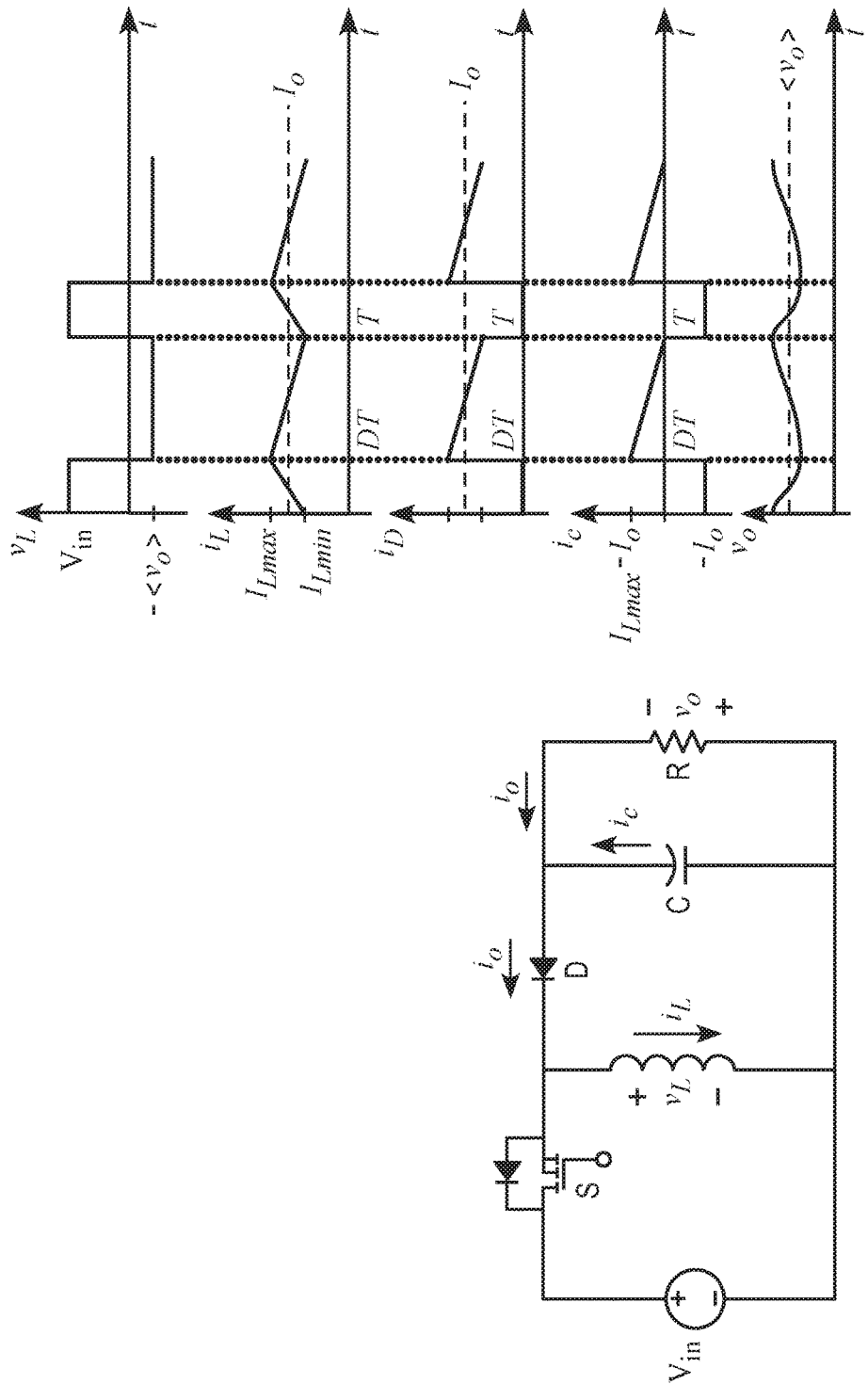
FIG. 22 is a schematic illustration of a high voltage bi-directional DC/DC converter in accordance with an embodiment of the present invention.
FIG. 23 is a graphical illustration of voltage and current responses across the bi-directional DC/DC converter of FIG. 22.

The bi-directional high voltage DC/DC converter 70 is a so-called "buck plus boost" type of voltage converter, such as the known electrical arrangement as shown in FIG. 22. FIG. 23 shows how, when the electronically controlled switch S in FIG. 22 is actuated, an input voltage $V_{in}$ drives in a pulsed manner a corresponding current oscillation across the inductor L and capacitance C, resulting in a continuous output voltage $v_o$, oscillating smoothly about a baseline voltage $<v_o>$.

Figure 24:
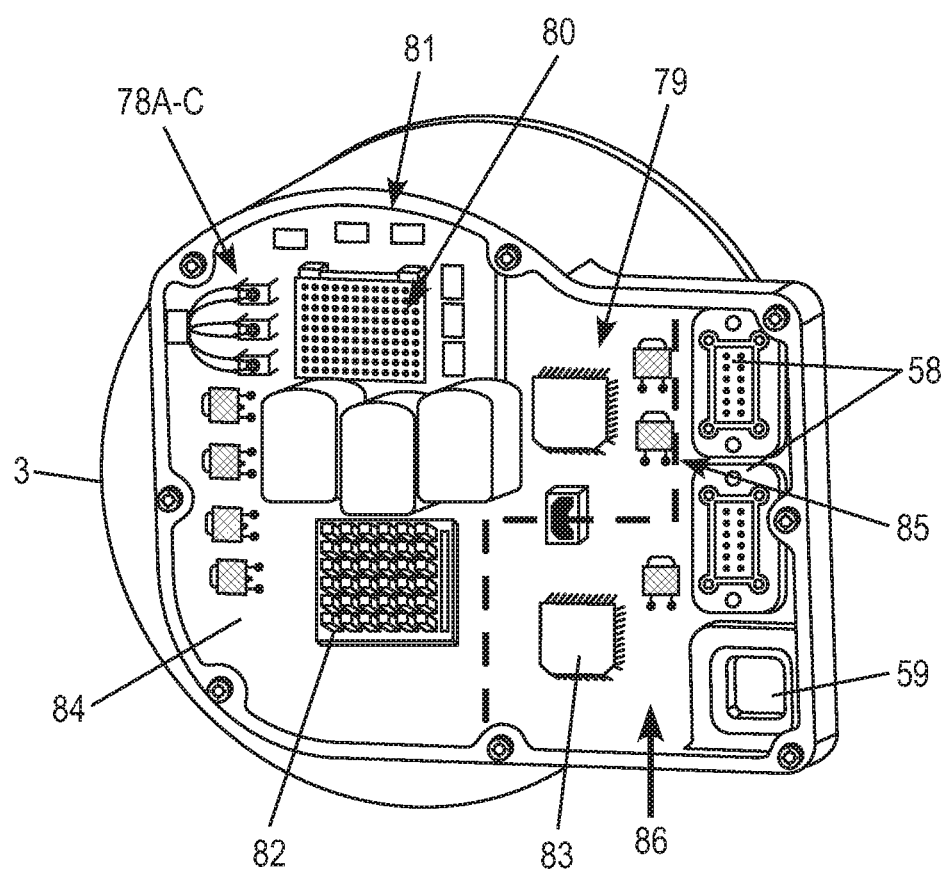
FIG. 24 is an oblique view of a power electronics arrangement integrated into a motor-generator in accordance with an embodiment of the present invention.

The desire to keep short the distance between the power inverter 14 and the motor-generator's three AC phase lines may be satisfied by integrating several electronic components into the housing of a motor-generator, as shown in FIG. 24. On the side of the motor-generator opposite the side which would face the gearbox 16, wires for the three AC phases 78A-78C emerge and are connected to a high voltage portion 79 of a circuit board 84 (in FIG. 24 the portion of the circuit board 84 to the left of the dashed line). To the right of the AC phase connections the power inverter is integrated into the circuit board 84, with the IGBT pack 80 being located under the IGBT driver circuits 81.

Also co-located on the circuit board 84 is a section 82 containing electrical noise-suppressing electromagnetic interference (EMI) filter and DC power capacitors, as well as embedded micro controllers 83 of the FEMG ECU. The dashed line represents an electrical isolation 85 of the high voltage portion 79 from the low-voltage portion 86 which communicates with the rest of the FEMG system and vehicle components via electrical connectors 58. The high voltage and high current either generated by the motor-generator 3 or received by the motor-generator 3 from the energy store 11 passes from the high voltage portion 79 of the circuit board 84 to the high voltage connection 59 via circuit paths (not illustrated) behind the outer surface of the circuit board.

Among the advantages of this high degree of motor-generator and power electronics integration are simplified and lower cost installation, minimizing of electrical losses over longer-distance connections between the motor-generator and the power electronics, and the ability to provide cooling to the power electronics from the motor-generator's already-present forced cooling without the need for additional dedicated electronics cooling arrangements.

FEMG System Energy Store and Battery Management Controller Embodiment.

The storage cells used in the energy store 11 in this embodiment are Lithium-chemistry based, specifically Li-Ion batteries. Li-Ion has several advantages over conventional battery chemistries such as Lead-acid, including lighter weight, better tolerance of "fast-charging" charge rates, high power density, high energy storage and return efficiency, and long cycling life.

The energy store 11 is sized to be able to receive and supply very large current flow from/to the motor-generator 3, as a crankshaft-driven motor-generator can generate kilowatts of electrical power, and an energy-store-powered motor-generator can require 300 peak amperes of high voltage current to start a diesel engine, in addition to requiring enough high voltage current to generate upwards of 100 Nm of torque to drive engine accessories when the clutch-pulley-damper unit is disengaged from the engine crankshaft.

While the super capacitors are capable of handling the peak current demands of the FEMG system, the battery portion of the energy store 11 is sized to be able to provide sustained current discharge rates and total energy output to meet the most demanding current demand. Based on experience with commercial vehicle operation, the battery portion of the energy store 11 in this embodiment is sized to ensure satisfactory operation at the equivalent of 58 KW for ten minutes each hour (a power demand corresponding to operation of the engine cooling fan at its maximum speed solely by the motor-generator at regular intervals, as well as concurrent air conditioning and air compressor use). Calculations have shown that a discharge of 58 KW for 10 minutes per hour, assuming an operating efficiency of the power inverter 14 of 95%, would require withdrawal of 10 KWh (kilowatt-hours) of energy from the energy store 11. With a system voltage of 400 V, this amount of discharge requires the energy store batteries to have a storage capacity of approximately 15 Ah (ampere-hours).

In addition to calculating the minimum battery capacity to meet the expected greatest vehicle demand, the design of the battery portion of the energy store 11 takes into account baseline operational needs. For example, there is an operational desire to not completely discharge the energy store batteries, both to avoid encountering a situation in which the energy store cannot meet an immediate vehicle need (such as not being able to start the engine when the motor-generator is operated as an engine starting device) and to avoid potential battery cell damage from discharge to levels well below the battery cell manufacturer's minimum recommended cell operating voltage (for a 3.8 V-4.2 V Lithium-based battery cell, typically not below 1.5-2 V/cell). The design of the present embodiment's energy store therefore includes the requirement that the greatest discharge demand not discharge the battery portion of the energy store below 50% capacity. This requirement results in energy store 11 having a battery capacity of 30 Ah.

With a design target of 30 Ah and using Li-Ion battery cells each having an individual nominal voltage of 3.8 V and a discharge capacity of 33 Ah at a 0.3 C discharge rate (such a battery cell having a weight of 0.8 Kg (kilograms) and rectangular dimensions of 290 mm×216 mm×7.1 mm), it was determined that the desired energy store capacity (30 Ah at 400 V) could be provided by packaging 4 individual battery cells in series to produce a 33 Ah battery module having a nominal voltage of 15.2 V, and then connecting 28 of these battery modules in series to provide a battery pack with a 33 Ah capacity at a nominal voltage of 15.2 V/module×28 modules=425 V (actual operating voltage typically at or below 400V). This battery pack has a weight (without housing) of approximately 90 Kg and a volume of approximately 50 liters, a weight and size readily accommodated alongside a chassis rail of a commercial vehicle.

The energy store 11 is provided with a battery management system (BMS) 12. The BMS control module monitors the state of charge of the battery pack and temperatures, handles battery maintenance tasks such as cell balancing (the monitoring and adjusting of charge states of individual cells or groups of cells), and communicates battery pack status information to the FEMG control module 13. The battery management system 12 may be co-located with the FEMG control module 13 or at another location remote from the battery pack in energy store 11; however, installation of the battery management system 12 with the energy store 11 permits modular energy storage system deployment and replacement.

Another design consideration with energy store 11 receiving and discharging large amounts of high voltage current is the need for cooling. In the present embodiment, among the FEMG components requiring cooling, the energy store 11, the motor-generator 3, the power inverter 14, the gearbox 16 and the clutch 15 of the clutch-pulley-damper unit 19, the battery store 11 has the greatest need for cooling to avoid damage from over-temperature conditions. The preferred temperature operating range of Li-Ion batteries is −20° C. to 55° C. These temperatures compare to operating temperature limits on the order of 150° C. for the motor-generator 3, 125° C. for the power inverter 14, and 130° C. for the gearbox 16 (as well as the clutch 15 if the clutch is an oil-bath wet clutch). In this embodiment, significant savings in complexity and cost are realized by having all of the primary FEMG components being cooled by the oil that is circulated in the gearbox for lubrication and cooling. This is possible if the energy store 11 battery pack receives the cooling oil as the first component downstream of the air/oil radiator which dissipates heat from the oil, i.e., before the cooled oil is recirculated and absorbs heat from other FEMG components in the oil cooling circuit. This arrangement ensures the battery pack receives the cooling oil flow at a temperature that allows the battery pack to remain below 55° C., prior to the oil encountering higher-temperatures in the motor-generator, power inverter and gearbox.

FEMG System Energy Store State of Charge Determination Algorithm Embodiments.

Figure 25:
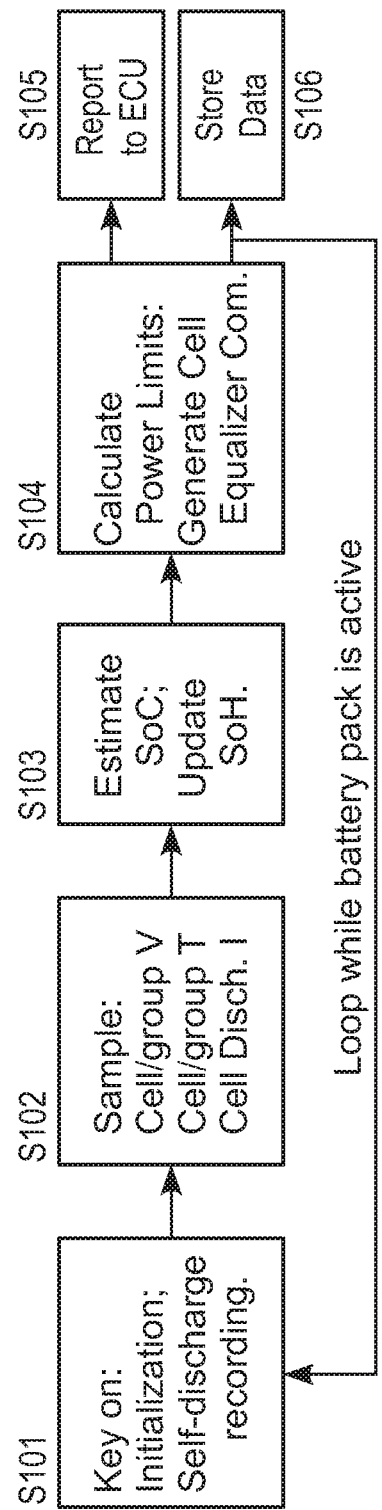
FIG. 25 is a battery management system state of charge estimation control loop in accordance with an embodiment of the present invention.

The state of charge of the energy store battery may be determined in a variety of ways. FIG. 25 is an example of a known battery management system state of charge estimation control algorithm usable in the present invention. In a first step S101 the battery management system 12 initializes at start-up ("key on"). Step S102 symbolizes the BMS's estimation of the state of charge of the battery cells by the so-called "Coulomb counting" method, here, by sampling cell and group voltages (V, T) and temperatures to establish an estimated baseline charge level, and from this an initial point tracking the amount of current introduced into the battery pack and withdrawn from the battery pack (I).

However, while this approach to tracking state of charge has the advantage of providing real-time, very accurate current flow monitoring with relatively inexpensive technologies, it does not provide a reliable indication of the amount of charge lost from the battery cells due to the battery cell self-discharging phenomena resulting from undesired chemical reactions. Because this phenomena is strongly temperature dependent and may result in substantial charge loss not detected in step S102, in this embodiment the battery management system also executes an additional state of charge estimation step S103, a so-called "prior in the loop" approach. In this state of charge estimation approach, the open circuit voltage of the battery cells is measured and this voltage is compared to stored voltage/charge state values to provide an estimate of the battery charge level which inherently accounts for previous self-discharge losses. In addition, by comparison with previously stored information a rate of self-discharge may be estimated, and from this self-discharge rate a state of health of the battery may be estimated (i.e., a high self-discharge rate indicating that the health of the battery cells is degraded as compared to when new).

A disadvantage of the "prior in the loop approach is that it cannot be easily used in real time, as the energy store 11's battery pack is in use to receive and discharge high voltage current as needed to support ongoing vehicle operation. As a result, the open-voltage-based state of charge and state of health estimations in step S103 are only performed when the energy store's battery is in a state in which no current is being received by or discharged from the battery pack. If the step S103 estimations cannot be made, this battery management system routine proceeds to step S104, and the most recent step S103 estimates of battery state of charge and state of health are used in the subsequent calculations.

Based on the cell and group voltages, temperatures, current input and outputs from step S102 and the most recent step S103 correction factors to account for self-discharge effects, in step S104 the battery management system calculates appropriate charging and discharging power limits available for operation of the energy store 11 within the FEMG system, and executes a cell balancing algorithm to identify battery cells requiring charge equalization and apply appropriate selective cell charging and/or discharging to equalize the cell voltages within the 4-cell modules and between the 28 modules. Cell balancing is of particular importance when Li-Ion battery cells are in use, as such cells can age and self-discharge at different rates from one another. As a result, over time the individual battery cells can develop different abilities to accept a charge, a condition that can result in one or more of the cells in a module (or between different modules) being overcharged and others undercharged. In either case, significantly over- or under-charged battery cells may be irreparably damaged.

In step S105 the battery management system 12 communicates battery pack status information to the FEMG control module 13, including information on the power limits required for the current charge state and temperature of the battery cells. In parallel in step S106 battery cell data is stored in memory for use in future cell monitoring iterations. Upon completion of the battery pack status determination and cell balancing routines, control returns to the beginning of the charge estimation control loop, with self-discharge rate data being made available at the start of the loop for use in the subsequent steps.

FEMG System Operating Modes and Control Algorithm Embodiments.

In this embodiment, the FEMG system operates in several modes, including generator mode, motor mode, idle mode, off mode and stop/start mode. The mode selected for the current operating conditions is based at least in part on the current state of charge of the energy store 11, where the FEMG control module 13 is programmed to recognize based on data received from the battery management system 12 a minimum charge level, in this embodiment 20% of charge capacity, an intermediate charge level of 40%, and a maximum charge level of 80% (a level selected to ensure the energy store is protected against overcharging of cells, particularly in the event that individual cell self-discharge has created a cell imbalance condition).

In the generator mode, the clutch 15 is engaged and the motor-generator 3 is driven to generate electrical energy for storage whenever the energy store state of charge is below the minimum charge level, and the clutch will stay engaged until the intermediate charge state level is reached. Once the intermediate charge state level is reached, the FEMG control module 13 switches between the generator, motor, idle and off modes as needed. For example, if the motor-generator 3 is being operated with the clutch 15 disengaged to drive the engine accessories, the FEMG control module commands a switch to generator mode and engage the clutch 15 to charge the energy store 11 when braking, deceleration or negative torque events occur (so long as the energy store 11 state of charge remains below the maximum charge state level).

When in the motor mode with the clutch 15 disengaged, the FEMG control module 13 modulates the amplitude and frequency of the current being delivered by the inverter 14 to the motor-generator 3 in order to provide infinitely-variable speed control. This capability permits the motor-generator 3 to be operated in a manner that drives the pulley 5, and hence the engine accessories driven by the pulley 5, at a speed and torque output level that meets the demands of the current operating conditions without waste of energy due to operating at unnecessarily high speed and torque output levels. The FEMG system's variable output control over the motor-generator 3 has the additional benefit of minimizing the amount of stored electrical energy that must be delivered from the energy store 11, reducing energy store charging needs and extending the length of time the energy store 11 can supply high voltage current before reaching the minimum state of charge.

If the level of charge in the energy store 11 is above the minimum level, there are no braking, deceleration, or negative torque conditions present, and the engine accessories are not demanding torque from the motor-generator 3, the FEMG control module 13 initiates the idle mode, in which the clutch 15 of the clutch-pulley-damper 19 is disengaged and the motor-generator "turned off," i.e., not operated to either generate electrical energy for storage or generate torque for driving the engine accessories.

In any of the generator, motor or off modes, the FEMG control module may command the clutch 15 be engaged if the engine requires torque output assistance from the motor-generator, and simultaneously command supply of electrical energy from the energy store 11 to the motor-generator to convert into supplemental torque to be transferred to the engine crankshaft.

The FEMG control module is additionally programmed to protect against unintended over-discharge of the energy store 11. For example, in this embodiment when the torque and speed demand of engine cooling fan 7 is above 90% of its design maximum demand, the clutch 15 of the clutch-pulley-damper 19 is engaged to mechanically drive the engine cooling fan 7 (and as consequence also the other engaged engine accessories) from the engine crankshaft. This permits the motor-generator 3 to be operated in the idle or generator modes in order to avoid a potentially damaging deep discharge of the energy store 11, as well as avoiding a state of charge condition in which the stored energy is not sufficient to support engine-off loads (for example, engine starting or sleeper compartment support during engine-off rest periods).

An additional operating mode is a starting mode, used for initially starting a cold engine and start-stop functionality (i.e., shut-down of the engine after a stop and re-start when travel is resumed). In this embodiment the start-stop function is controlled by the FEMG control module 13. When appropriate conditions exist (e.g., energy store 11 charge state above a minimum threshold for engine starting, vehicle speed of zero for a sufficient period, transmission in neutral or transmission clutch disengaged, vehicle doors closed, etc.), the FEMG control module signals the engine control module to shut down the engine, thereby minimizing fuel consumption and undesired engine idling noise. When the vehicle is to resume motion, as indicated by a signal such as release of the brake pedal or operation of the transmission clutch, the FEMG control module 13 commands engagement of clutch 15 and supply of energy from the energy store 11 to operate the motor-generator 3 to produce a large amount of torque for engine starting. The delivery of engine starting torque occurs from a motor-generator initial rotational speed of zero in the case whether there was no engine accessory operation demand during the engine-off period (in which case there would be no need for pulley-crankshaft speed matching, as both sides of the clutch would be at zero speed). Alternatively, if the motor-generator 3 had been driving pulley 5 to power engine accessories during the engine shut down period, the motor-generator 3 would be commanded to slow to below a rotational speed at when clutch damage would occur when the clutch 15 is engaged. In the case of a dog clutch, this may be at or near zero speed, whereas a wet multi-plate clutch could better tolerate some relative motion between the pulley-side and stationary crankshaft-side of the clutch.

The FEMG system further can store sufficient energy to permit operation of a dynamic heat generator to pre-heat a cold engine prior to a cold start, significantly reducing the resistance a cold engine would present to the motor-generator during a cold start. The use of a dynamic heat generator also creates the opportunity to decrease the size, weight and cost of the motor-generator by reducing the peak cold-starting torque demand that the motor-generator much be designed to provide over the vehicle's expected operating conditions.

The peak cold-starting torque demand that the motor-generator much be designed to provide over the vehicle's expected operating conditions also may be reduced by other assistance devices. For example, the size of the motor-generator may be reduced if engine starting torque is supplemented by a pneumatic starter motor powered by the vehicle's compressed air storage. The size of a pneumatic starter motor may be minimized to ensure that it can be located with the FEMG components at the front of the engine because the pneumatic starter motor need not be sized to be able to start the engine by itself. Such a cold-starting assist would be lower cost and lower weight than the option of retaining a conventional electric engine starter motor to rotate the engine flywheel, and would have negligible effect on the system energy efficiency improvements obtainable by the FEMG system.

FEMG System Engine Accessory Operating Speed and Motor-Generator Operating Speed Determination Algorithms.

Figure 26:
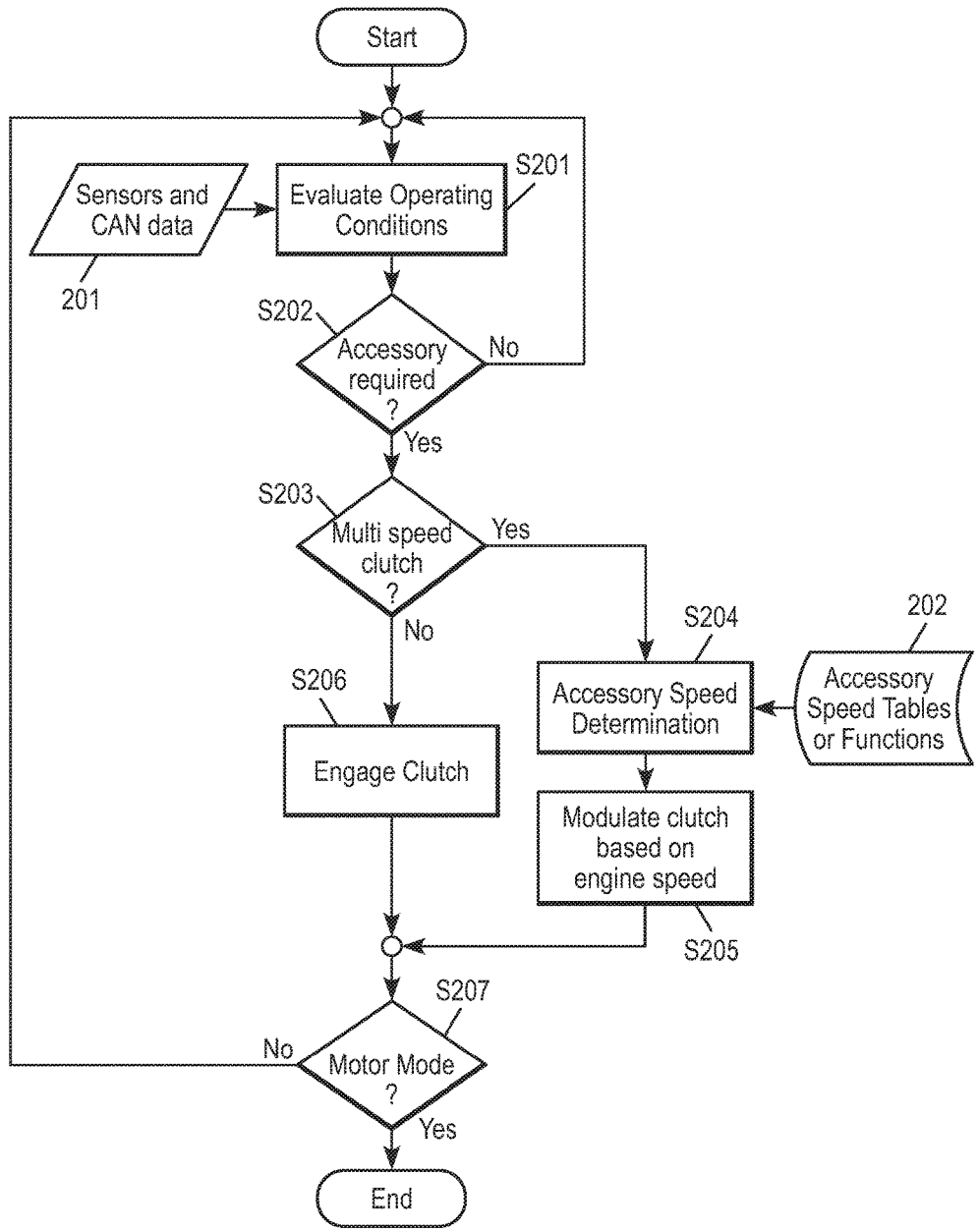
FIG. 26 is a flow chart of accessory operating speed selection in accordance with an embodiment of the present invention.
Figure 27:
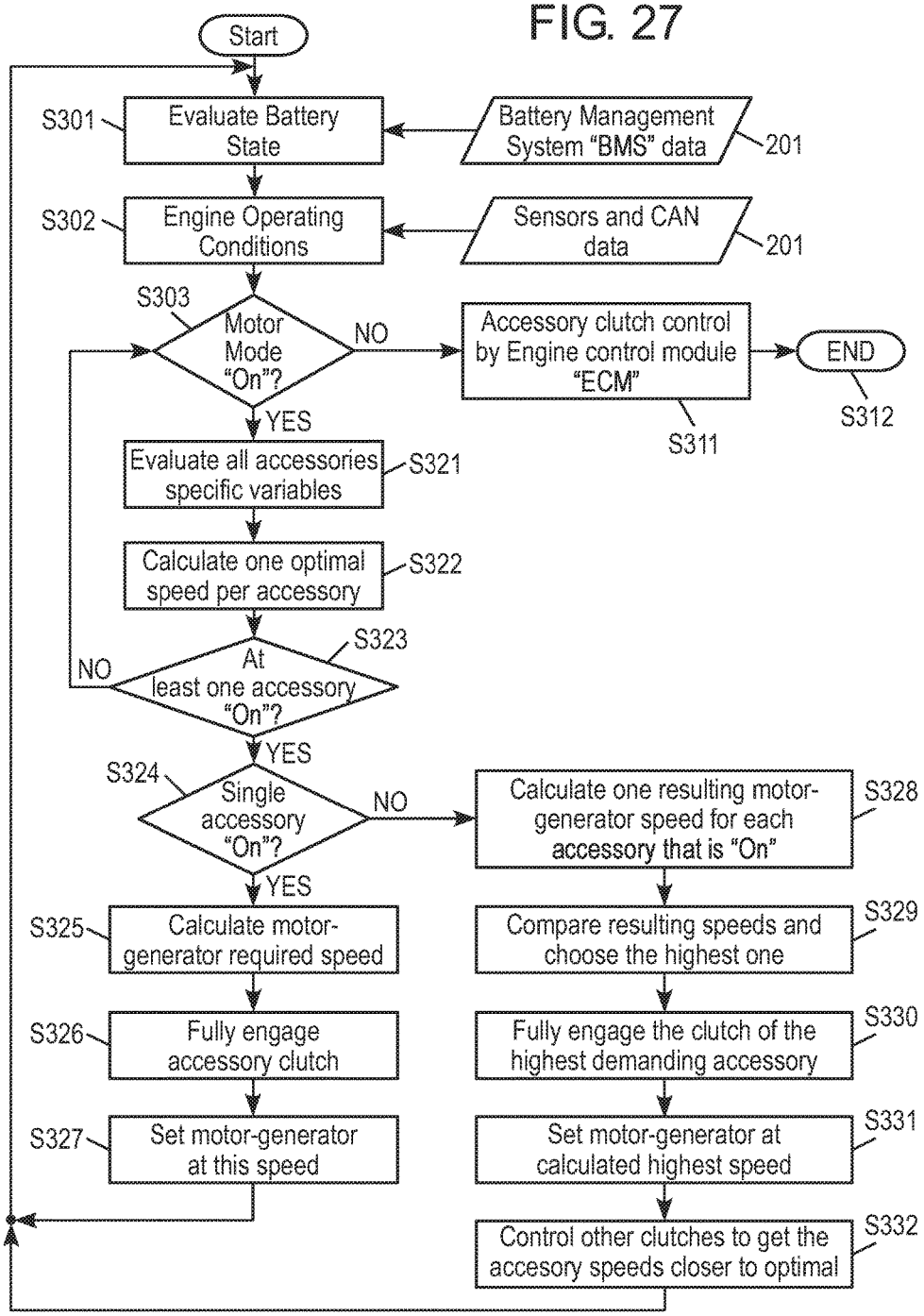
FIG. 27 is a flow chart of a control strategy for operation of a motor generator and engine accessories independently of an engine in accordance with an embodiment of the present invention.

An embodiment of an FEMG system control strategy is explained with the assistance of the flow charts of FIGS. 26 and 27, following a brief discussion of the underlying bases of the strategy.

As a general matter, higher fuel savings may be obtained by maximizing the amount of time engine accessories and other components are electrically driven, rather than by the traditionally-provided engine mechanical power. A control strategy which improves electrical energy deployment is an essential part of obtaining these improvements. An approach of the present invention is to maximize the number of components that can be driven electrically while minimizing the number of electric machines required to drive the accessories. Thus, rather than providing most or all of the vehicle's power-demanding components with their own electric motors, in the present invention a single electric motor (such as motor-generator 3) provides both mechanical torque output and electric energy generation. This single motor-generator approach is coupled with a control strategy that ensures the needs of the most demanding or highest priority engine accessory or other component is met, while at the same time minimizing inefficient operation of other accessories or components by adapting their operation to the extent practical to the conditions that have been set to meet the greatest demand. In the control strategy discussed below, individual engine accessories are provided with clutches which, depending on the accessory, permits them to be selectively turned off, driven at a speed dictated by the accessory having the greatest demand or highest priority, or driven at a reduced speed using a variable-engagement clutch.

When the engine accessories are being driven by the engine crankshaft, i.e., when the clutch 15 is engaged, each engine accessory is mechanically driven under a "baseline" or "original" control strategy (OCS) corresponding to how these accessories would be operated in a convention engine application without an FEMG system. In such a strategy the accessories having individual clutches are operated according to their individual baseline control schemes, with their clutches being fully engaged, partially engaged or disengaged in the same manner as in a non-hybrid internal combustion engine application.

In contrast, when the clutch-pulley-damper unit clutch 15 is disengaged and the engine accessories begin to be powered by the motor-generator 3 using energy from the energy store 11, the FEMG control module variably controls the speed of the pulley 5, and hence the engine accessory drive belt in a manner that meets the current vehicle needs without providing more accessory drive torque than is required in the current operating conditions. Under such a variable speed control (VSC) strategy, the FEMG control module 13 uses stored data regarding the operating characteristics of the individual engine accessories to simultaneously control the various accessories in a manner that further minimizes the amount of electrical energy required to drive the motor-generator 3 in motor mode (the FEMG control module 13 may directly control the accessories, or issue signals to other modules such as the engine control module to command execution of the desired accessory operations). Moreover, despite the fact that the most efficient or desirable operating speed has been mapped for each accessory, because the motor-generator 3 drives all of the engine accessories on the same belt at one belt speed, when one accessory is operated at its optimum the others may be operating at suboptimal operating points. For this reason the FEMG control module 13 compares the preferred operating speeds of each of the accessories to their speeds when driven by the motor-generator 3 at a speed sufficient to meet the greatest accessory demand, and determines whether the accessories' individual clutches can be actuated to produce an individual accessory speed closer to the individual accessory's preferred operating speed. If possible, the FEMG control module will override the usual accessory clutch control strategy and activate the accessory clutches as needed to deliver individual accessory speeds that provide improved efficiency.

Selection of appropriate engine accessory speeds begins with determination of a desired ideal operating speed of each accessory for the current operating conditions, using a control logic such as that shown in FIG. 26.

Upon starting the accessory speed determination algorithm, in step S201 the FEMG control module 13 retrieves from its memory 201 data regarding the current vehicle operating conditions obtained from the vehicle's sensors and other controllers, the majority of which is provided to the FEMG control module 13 via CAN bus in accordance with the SAE J1939 network protocol, and determines the current operating conditions. This operation is a predicate to determining in step S202 whether the current operating conditions require operation of a particular accessory, such as the engine cooling fan. If the accessory is to be turned on, the routine proceeds to step S203 to determine whether the accessory is coupled to the accessory drive via an individual accessory multi-speed clutch.

If at step S203 the FEMG control module 13 determines such an accessory clutch is present, the routine proceeds to step S204 for a determination of what would be the desired accessory operating speed for the determined operating condition. In the course of performing step S204, the FEMG control module 13 accesses information 202, for example in the form of look-up tables, characteristic curves or mathematical functions, from which it can ascertain an accessory operating speed at which the accessory operates efficiently in the current operating conditions. At step S205, the FEMG control module 13 compares the determined desired accessory operating speed to the speed of the accessory when its clutch is fully engaged, and modulates the accessory clutch to set an appropriate corresponding clutch operating state (e.g., a degree of clutch slip in a variable slip clutch or a particular reduction ratio in a clutch with discrete multiple speeds such as a 3-speed clutch). After modulating the accessory clutch as appropriate for the conditions, the FEMG control module 13 in step S207 checks to see whether the FEMG system motor mode has ended (i.e., determining whether the motor-generator 3 is to continue driving the accessory drive via pulley 5). If the system is still operating in the motor mode, control returns to the beginning of the accessory speed determination process to continue to assess accessory speed needs in view of the ongoing operating conditions. If the motor mode is determined in step S207 to have ended, the FIG. 26 routine ends.

If at step S203 the FEMG control module 13 determines a multi-speed accessory clutch is not present (i.e., the accessory speed cannot be modulated relative to the engine speed), the routine proceeds directly to step S206 to command the accessory's clutch to fully couple the accessory to the accessory drive. Control then shifts to step S207, where the motor mode evaluation described above is performed.

The FIG. 26 algorithm is a component of the overall engine accessory control strategy of the present embodiment shown in FIG. 27. At the start of the FEMG system algorithm the FEMG control module 13 in step S301 retrieves from its memory 201 data received from the battery management system 12 to determine the state of charge of the energy store 11. Next, in step S302 the FEMG control module 13 retrieves from memory 201 data regarding the current vehicle operating conditions obtained from the vehicle's sensors and other controllers to determine the current operating condition in which the engine is operating (in this embodiment the evaluation in step S302 provides the information required in step S201 of the FIG. 26 accessory speed determination algorithm, and thus need not be repeated in step S322, below).

After determining the current operating conditions, the FEMG control module 13 determines the mode in which the FEMG system should operate and commands engagement or disengagement of the clutch 15 of the clutch-pulley-damper unit 19 accordingly (step S303). If the clutch 15 is to be in an engaged state in which the pulley 5 is coupled to the damper 6 (and hence to the engine crankshaft), the determination of how the accessories are to be operated with the engine driving pulley 5 may be performed by the FEMG control module 13, or another accessory control module. In FIG. 27, the FEMG control module 13 at step S311 passes control of the engine accessory clutches to the vehicle's engine control module (ECM), which can determine engine accessory speeds in a manner comparable to the original control strategy (OCS). After hand-off of accessory control in step S311, processing ends at step S312.

If at step S303 it is determined that motor-generator 3 is to electrically drive the accessories (i.e., the "motor mode"

in which the clutch 15 of the clutch-pulley-damper unit 19 is in a disengaged state in which the pulley 5 is decoupled from the damper 6 and hence the crankshaft), in this embodiment the motor-generator 3 is controlled using the variable speed control (VSC) strategy.

The VSC strategy is implemented here by first determining for each accessory a preferred accessory operating speed in step S322, taking into account information on all of the accessories' characteristics and variables evaluated in step S321.

At step S323 the FEMG control module 13 determines whether at least one accessory that could be driven by the motor-generator 3 is in "on," i.e., in a state in which it is to be driven via pulley 5 by motor-generator 3. If there is no accessory operation demand under the current conditions, control is returned to step S303.

If it is determined in step S323 that there is at least one accessory in an "on" state, the FEMG control algorithm in step S324 determines whether more than one accessory needs to be driven by the motor-generator 3 (i.e., more than one accessory "on"). If there is only a single accessory with a torque demand the control process proceeds with a subroutine that is focused solely on the operation of that one "on" accessory. Thus, at step S325 the motor-generator speed needed to drive the single accessory at its preferred operating speed is calculated, the accessory's individual drive clutch is commanded to fully engage in step S326, and the motor-generator 3 in step S327 is commanded to operate at the speed determined in step S325. Because the motor-generator's speed is variably-controlled in this embodiment, the pulley speed 5 may be set at precisely the level required to drive the highest-demand engine accessory. Control is then returned to the start of the control algorithm.

If at step S324 it is determined that more than one accessory needs to be driven by the motor-generator 3, in accordance with the VSC strategy at step S328 the FEMG control module 13 determines for each accessory what motor-generator speed would be needed to drive the accessory at its individual preferred accessory operating speed. The calculated speeds are then compared in step S329 to identify the highest motor-generator speed demand from the "on" accessories. The FEMG control module 13 then commands the individual clutch of the accessory needing the highest motor-generator speed to fully engage in step S330, in step S331 commands the motor-generator 3 to operate that the needed highest motor-generator speed. As a part of the VSC strategy, in step S332 the FEMG control module controls the operation of individual accessory clutches of the remaining "on" accessories equipped with individual clutches to adapt these accessories' operation to the needed highest motor-generator speed set in step S329. For example, because the set motor-generator speed (the speed needed to serve the accessory needing the highest motor-generator speed) is higher than the speed needed by a remaining accessories to operate at their preferred speeds, if an accessory is equipped with an individual clutch that can be partially engaged (e.g., "slipped"), that clutch may be commanded to allow enough slip to let its accessory's speed be closer to its preferred operating speed (as determined in step S322). Control is then returned to the start of the control algorithm.

The following provides an example of the execution of the foregoing method for the case of a vehicle with three accessories driven from the crankshaft pulley, an engine cooling fan, an air conditioning compressor and an air compressor.

In this example the engine cooling fan is equipped with a fan clutch with multiple speed capability, such as a three speed or variable speed clutch (e.g., a viscous fan clutch). The air conditioner and air compressors have individual "on/off" clutches with only engaged and disengaged states. The FEMG control module 13 controls the operating state of each of the accessory clutches. The final speed of each accessory is a function of the belt pulley drive ratio, the motor-generator speed and the nature of the accessory's clutch (i.e., "on/off," variable slip or multiple reduction ratio steps).

In this simplified example, for a given set of vehicle operating conditions, the preferred operating point of each accessory and the corresponding motor-generator speed to obtain the preferred operating point are: engine cooling fan operating at 1050 rpm (a fan speed which requires a motor-generator speed of 1050 rpm/1.1 ratio between fan pulley and pulley 5, times 2:1 gearbox reduction ratio=1909 rpm); air conditioning compressor operating at 1100 rpm (corresponding to a motor-generator speed of 1294 rpm); and air compressor operating at 2000 rpm (corresponding to a motor-generator speed of 2667 rpm).

If the FEMG control module 13 determines operation of the air compressor is the highest priority in the given conditions (for example, when stored compressed air amount is approaching minimum safety levels for pneumatic brake operation), the FEMG control module 13 will command the motor-generator 3 to run at the 2667 rpm required to support the air compressor's 2000 rpm speed requirement. However, this motor-generator speed is substantially higher than the speeds required by the engine cooling fan or the air conditioning compressor (at the 2667 rpm motor-generator speed, the engine cooling fan speed and air conditioning compressor speed would be 1467 rpm and 2267 rpm, respectively). The FEMG control module 13, having access to the engine accessory operating curves and depending on the nature of the other accessories' clutches, could then adjust the clutches' engagements to operate the other accessories closer to their preferred operating speeds. For example, if the fan was equipped with a variable slip clutch, the FEMG control module could command an amount of fan clutch slip to provide the preferred engine cooling fan speed of 1100 rpm. Similarly, while the air conditioning compressor may only have an "on/off" clutch and thus would be driven at 1467 rpm when its clutch is engaged (rather than the preferred speed of 1050 rpm), the FEMG control module could control operation of the "on/off" clutch of the air conditioning compressor to reduce the duty cycle of the air conditioning compressor to a point that the current air conditioning demand could be met by only periodically operating the air conditioner at 1467 rpm. This approach provides the FEMG control module the ability to meet the needs of the currently-most demanding engine accessory while reducing waste of energy by driving other accessories at higher speeds than necessary or at an unnecessarily high duty cycle (e.g., 100%).

In a further example, the engine may be equipped with accessories that cannot be disconnected from a drive belt driven by the pulley 5. In such a case, the FEMG control module 13 may determine upon consideration of the operating curves that the greatest overall system energy efficiency may be obtained by compromise. For example, assume the air compressor is currently presenting the greatest demand and it would be preferable to operate the air compressor at the 2000 rpm speed at which the compressor is most efficient. If the FEMG control module then determines that an engine coolant pump being driven at the 2667 rpm motor generator speed would be operating at an undesirably low efficiency (i.e., operating at a pump speed that significantly increases the pump's energy consumption) and the vehicle conditions allow the air compressor to be operated at a lower speed (for example, where the current need is "topping off" the compressed air storage tanks, rather than meeting an urgent, safety-related compressed air demand), the FEMG control module can command a lower motor-generator speed at which the engine coolant pump operates at a higher level of efficiency (e.g., 2400 rpm), even though the air compressor operates at a slight decreased efficiency at this speed, with the result that the overall combined engine coolant pump and air compressor operation increases overall system efficiency as compared to operating these accessories at a motor-generator speed of 2667 rpm.

The foregoing disclosure has been set forth merely to illustrate the invention and is not intended to be limiting. Because such modifications of the disclosed embodiments incorporating the spirit and substance of the invention may occur to persons skilled in the art, the invention should be construed to include everything within the scope of the appended claims and equivalents thereof.

LISTING OF REFERENCE LABELS 1 air compressor
2 air conditioning compressor
3 motor-generator
4 drive unit gears
5 pulley
6 damper
7 engine cooling fan
8 engine
9 vehicle batteries
10 DC/DC converter
11 energy store
12 battery management system
13 FEMG electronic control unit
14 AC/DC power inverter
15 clutch
16 gearbox
17 flange shaft
18 rotor shaft
19 clutch-pulley-damper unit
20 engine coolant radiator
21 belt drive portions
22 clutch actuator
23 clutch plates
24 clutch spring
25, 26 dog clutch elements
27 clutch throw-out rod
28 bolt holes
29 external splines
30 internal splines
31, 32 dogs
33 spring
34 bearings
35 gearbox housing clamshell
36 pulley-end reduction gear
37 middle reduction gear
38 motor-generator-end reduction gear
39 bearings
40 holes
41 diaphragm
42 cover
43 shaft hole
44 mounting flange
45 mounting ring
46 nut
47 crankshaft
48 oil pan
49 chassis rail
50 engine mount
51 mounting bracket
52 holes
53 holes
54 bracket arms
55 motor-generator gearbox side
56 mounting studs
57 rotor shaft bore
58 low-voltage connection
59 high-voltage connection
60 coolant passage
61 electronics cooling passage portion
62 engine control unit
64 sensors
65 SAE J1939 bus
66 vehicle equipment
67 DC bus
68A-68F control lines
69 transistor control line
70 DC/DC voltage converter
71 DC/DC converter
72 12 V battery
73 12 V loads
74 DC/DC converter transistor drive circuit
75 DC/DC converter output
76 transformer primary winding
77 transformer
78 AC phase connection
79 circuit board
80 IGBT pack
81 IGBT driver circuits
82 EMI filter and DC capacitors
83 FEMG control module micro controller
101 motor-generator clutch position sensor
102 motor-generator speed sensor
103 engine accessory clutch positions
104 air compressor state sensors
105 dynamic heat generator state sensors
106 FEMG coolant temperature sensor
107 FEMG coolant pressure sensor
108 12V battery voltage sensor
111 brake controller
112 retarder controller
113 EAC controller
114 transmission controller
115 dashboard controller
120 individual engine accessory clutches
121 FEMG coolant pump
201 FEMG control module memory
202 FEMG control module operating parameter storage
303 clutch throw-out rod bushing
304 busing bearing
305 compressed air fitting
306 fastener
307 torque arm
308 anchor point
309 AC-DC converter
310 off-vehicle power

What is claimed is:

1. A hybrid electric front end motor-generator system, comprising:

an internal combustion engine including an engine crankshaft having a front end opposite a rear end at which an engine flywheel is located, the engine being configured to transfer torque from the rear end of the crankshaft to a torque consumer;

a motor-generator;

a torque transfer segment having a motor-generator end configured to receive the motor-generator and to transfer torque between the motor-generator end and a coupling end of the torque transfer segment; and an integrated switchable coupling having a coupling rotation axis arranged co-axially with a crankshaft rotation axis, the integrated switchable coupling being located between the coupling end of the torque transfer segment and the front end of the engine crankshaft in a region adjacent to a front end of the engine, the integrated switchable coupling including
an engine-side portion coupled to the engine crankshaft,
a drive-side portion coupled to the torque transfer segment coupling end, and
an engagement actuator configured to selectively engage the engine-side portion with the drive-side portion, at least a portion of the engagement actuator being concentrically surrounded by the drive portion along the coupling rotation axis;

an engine accessory drive arranged to be driven by the drive-side portion of the integrated switchable coupling and to drive at least one engine accessory;

an energy storage system, the energy storage system including
an energy store configured to store electrical energy generated by the motor-generator and to deliver stored electrical energy to the motor-generator to generate torque output from the motor-generator to the integrated switchable coupling, and
an electrical energy conversion and distribution network configured to convert a current type of the electrical energy transferred between the motor-generator and the energy store between alternating current and direct current when the electrical energy is transferred from the motor-generator to the energy store and between direct current and alternating current when the electrical energy is transferred from the energy store to the motor-generator; and a front end motor-generator system controller configured to switch the integrated switchable coupling actuator between engaged and disengaged states and control operation of the electrical energy conversion and distribution network during transfer of electrical energy between the motor-generator and the energy store, wherein the integrated switchable coupling is a clutch-pulley-damper unit in which
the engine-side portion of the integrated switchable coupling is a damper configured to damp vibrations of the crankshaft,
the drive-side portion of the switchable coupling is a pulley configured to drive the engine accessory drive, and
the engagement actuator of the integrated switchable coupling is a clutch.

2. The hybrid electric front end motor-generator system of claim 1, wherein
the motor-generator has a motor-generator rotation axis parallel to and laterally offset from the crankshaft rotation axis.

3. The hybrid electric front end motor-generator system of claim 1, wherein
the torque consumer is a driveline arranged to propel a vehicle,
the vehicle includes a plurality of system sensors and a plurality of system controllers,
front end motor-generator system controller is configured to
communicate with at least one of the plurality of system sensors, at least one of the system controllers and the energy storage system to obtain operating state information,
select based on the operating state information which of a plurality of motor-generator operating modes the motor-generator is to be operated, and
command operation of the integrated switchable coupling to an engaged stated or a disengaged state in accordance with the selected motor-generator operating mode, and
the plurality of motor-generator operating modes includes
a generation mode in which the integrated switchable coupling is engaged and the motor-generator receives torque from the crankshaft to generate electrical energy, and
an engine accessory drive mode in which integrated switchable coupling is disengaged and the motor-generator generates torque for delivery to the drive-side portion of the integrated switchable coupling to drive the engine accessory drive.

4. The hybrid electric front end motor-generator system of claim 3, wherein
the plurality of motor-generator operating modes includes an engine torque output supplementing mode in which the integrated switchable coupling is engaged and the motor-generator generates torque transferable via the torque transfer segment and the integrated switchable coupling to the crankshaft.

5. The hybrid electric front end motor-generator system of claim 3, wherein
electrical energy conversion and distribution network includes a direct current-to-direct current voltage converter configured to convert a voltage of electrical energy received from the energy store to a voltage compatible with electrically-powered equipment of the vehicle or the stationary engine.

6. The hybrid electric front end motor-generator system of claim 5, wherein
the electrically-powered equipment includes at least one of lighting, an engine controller, a brake system controller, and a vehicle occupant compartment climate control system.

7. The hybrid electric front end motor-generator system of claim 1, wherein
the drive-side portion of the integrated switchable coupling is configured to drive the engine accessory drive in a region axially between the torque transfer segment and an engine side of the engine-side of the integrated switchable coupling.

8. The hybrid electric front end motor-generator system of claim 1, further comprising:
a torque transfer segment anti-rotation mounting member configured to rotationally fix the torque transfer segment relative to the engine when the hybrid electric arrangement is in an installed position at the front end of the engine.

9. The hybrid electric front end motor-generator system of claim 8, wherein the anti-rotation mounting member includes at least one of a mount coupling a housing of the torque transfer segment to the engine and a torque arm between the torque transfer segment housing and an engine support structure coupled to the engine.

10. The hybrid electric front end motor-generator system of claim 1, wherein
the drive-side portion of the integrated switchable coupling includes an outer circumference configured to drive at least one drive belt of the engine accessory drive.

11. The hybrid electric front end motor-generator system of claim 10, wherein
an outer circumference of the engine-side portion of the integrated switchable coupling includes a further accessory drive surface.

12. The hybrid electric front end motor-generator system of claim 1, wherein
the clutch is a dog clutch.

13. The hybrid electric front end motor-generator system of claim 1, wherein
the clutch is a plate clutch.

14. The hybrid electric front end motor-generator system of claim 13, wherein
the plate clutch is a multi-plate clutch.

15. The hybrid electric front end motor-generator system of claim 1, further comprising:
a clutch actuator configured to axially displace at least one of the clutch engine-side portion and the clutch drive-side portion into and out of engagement with the other of the at least one of the clutch engine-side portion and the clutch drive-side portion in response to commands generated by the front end motor-generator system controller.

16. The hybrid electric front end motor-generator system of claim 15, wherein
the torque transfer segment is a gearbox including a torque transfer drive, and
the torque transfer drive includes at least a first gear arranged coaxially with the coupling rotation axis and a second gear arranged coaxially with the motor-generator rotation axis, the torque transfer drive being configured such that rotation of one of the first or second gears results in rotation of the other of the first and second gears.

17. The hybrid electric front end motor-generator system of claim 1, wherein
at least one of the at least one engine accessories includes an accessory coupling driven by the engine accessory drive and configured to be selectively switched by the front end motor-generator controller between engaged and disengaged states.

18. The hybrid electric front end motor-generator system of claim 17, wherein
the accessory coupling is switchable by the front end motor-generator controller into a partially-engaged state.

19. The hybrid electric front end motor-generator system of claim 1, wherein
the front end motor-generator controller is configured to
receive information on an operating state of an environment in which the engine is installed, the installation environment including an on-road vehicle, an off-road vehicle or a stationary engine installation, from at least one of sensors and control modules of the installation environment,
select based on the operating state information which of a plurality of motor-generator operating modes the motor-generator is to be operated, and
command operation of the clutch-pulley-damper unit clutch to an engaged stated or a disengaged state in accordance with the selected motor-generator operating mode, and
the plurality of motor-generator operating modes includes
a generation mode in which clutch-pulley-damper unit clutch is engaged and the motor-generator receives torque from the crankshaft to generate electrical energy; and
an engine accessory drive mode in which clutch-pulley-damper unit clutch is disengaged and the motor-generator generates torque for delivery to the clutch-pulley-damper unit pulley to drive the engine accessory drive.

20. The hybrid electric front end motor-generator system of claim 19, wherein
the plurality of motor-generator operating modes includes an engine torque output supplementing mode in which the clutch-pulley-damper clutch is engaged and the motor-generator generates torque transferable via the torque transfer segment and the clutch-pulley-damper to the crankshaft.

21. The hybrid electric front end motor-generator system of claim 1, wherein
the torque consumer is a load of a stationary engine,
the stationary engine includes a plurality of system sensors and a plurality of system controllers,
front end motor-generator system controller is configured to
communicate with at least one of the plurality of system sensors, at least one of the system controllers and the energy storage system to obtain operating state information,
select based on the operating state information which of a plurality of motor-generator operating modes the motor-generator is to be operated, and
command operation of the integrated switchable coupling to an engaged stated or a disengaged state in accordance with the selected motor-generator operating mode, and
the plurality of motor-generator operating modes includes
a generation mode in which the integrated switchable coupling is engaged and the motor-generator receives torque from the crankshaft to generate electrical energy, and
an engine accessory drive mode in which integrated switchable coupling is disengaged and the motor-generator generates torque for delivery to the drive-side portion of the integrated switchable coupling to drive the engine accessory drive.

22. A hybrid electric front end motor-generator system, comprising:
an internal combustion engine including an engine crankshaft having a front end opposite a rear end at which an engine flywheel is located, the engine being configured to transfer torque from the rear end of the crankshaft to a torque consumer;
a motor-generator;
a torque transfer segment having a motor-generator end configured to receive the motor-generator and to transfer torque between the motor-generator end and a coupling end of the torque transfer segment; and
an integrated switchable coupling having a coupling rotation axis arranged co-axially with a crankshaft rotation axis, the integrated switchable coupling being located between the coupling end of the torque transfer segment and the front end of the engine crankshaft in a region adjacent to a front end of the engine, the integrated switchable coupling including
an engine-side portion coupled to the engine crankshaft,
a drive-side portion coupled to the torque transfer segment coupling end, and
an engagement actuator configured to selectively engage the engine-side portion with the drive-side portion, at least a portion of the engagement actuator being concentrically surrounded by the drive portion along the coupling rotation axis;
an engine accessory drive arranged to be driven by the drive-side portion of the integrated switchable coupling and to drive at least one engine accessory;
an energy storage system, the energy storage system including
an energy store configured to store electrical energy generated by the motor-generator and to deliver stored electrical energy to the motor-generator to generate torque output from the motor-generator to the integrated switchable coupling, and
an electrical energy conversion and distribution network configured to convert a current type of the electrical energy transferred between the motor-generator and the energy store between alternating current and direct current when the electrical energy is transferred from the motor-generator to the energy store and between direct current and alternating current when the electrical energy is transferred from the energy store to the motor-generator; and
a front end motor-generator system controller configured to switch the integrated switchable coupling actuator between engaged and disengaged states and control operation of the electrical energy conversion and distribution network during transfer of electrical energy between the motor-generator and the energy store,
wherein
the torque transfer segment is a gearbox including a torque transfer drive, and
the torque transfer drive includes at least a first gear arranged coaxially with the coupling rotation axis and a second gear arranged coaxially with the motor-generator rotation axis, the torque transfer drive being configured such that rotation of one of the first or second gears results in rotation of the other of the first and second gears.

23. The hybrid electric front end motor-generator system of claim 22, wherein
the torque transfer drive includes at least one intermediate gear between the first and second gears.

* * * * *